United States Patent [19]
Yamada et al.

[11] Patent Number: 5,254,068
[45] Date of Patent: Oct. 19, 1993

[54] AUTOMATIC SETUP APPARATUS

[75] Inventors: Kazuo Yamada, Gifu; Sumiaki Inami, Aichi; Shigemitsu Ito, Aichi; Tomio Tajima, Aichi, all of Japan

[73] Assignee: Yamazaki Mazak Kabushiki Kaisha, Japan

[21] Appl. No.: 745,949

[22] Filed: Aug. 16, 1991

[30] Foreign Application Priority Data

Aug. 17, 1990 [JP] Japan .................. 2-216695

[51] Int. Cl.$^5$ .............................. B23Q 3/155
[52] U.S. Cl. ..................... 483/14; 29/27 R; 483/22; 483/42
[58] Field of Search ............ 483/17, 22, 15, 23, 483/24, 42, 14, 8; 29/27 R, 27 C

[56] References Cited

U.S. PATENT DOCUMENTS

| | | | |
|---|---|---|---|
| 3,543,392 | 12/1970 | Perry et al. | 483/42 |
| 3,576,540 | 4/1971 | Fair et al. | 483/15 |
| 3,744,124 | 7/1973 | Gardner | 483/8 |
| 4,369,563 | 1/1983 | Williamson | 483/15 |
| 4,404,727 | 9/1983 | Zankl | 483/22 |
| 4,608,747 | 9/1986 | Link et al. | 483/22 |
| 4,777,713 | 10/1988 | Kitamura | 483/22 |

FOREIGN PATENT DOCUMENTS

| | | | |
|---|---|---|---|
| 3409682 | 9/1985 | Fed. Rep. of Germany | 483/22 |
| 3913137 | 11/1989 | Fed. Rep. of Germany | 483/22 |
| 10404 | 1/1983 | Japan . | |
| 176701 | 5/1983 | Japan | 29/27 R |
| 232754 | 12/1984 | Japan . | |
| 67005 | 4/1985 | Japan . | |
| 201806 | 10/1985 | Japan . | |
| 242943 | 12/1985 | Japan . | |
| 103746 | 5/1986 | Japan . | |
| 44363 | 2/1987 | Japan . | |
| 54606 | 3/1987 | Japan . | |
| 99041 | 5/1987 | Japan . | |
| 102857 | 5/1988 | Japan . | |
| 105860 | 5/1988 | Japan . | |
| 105876 | 5/1988 | Japan . | |
| 180451 | 7/1988 | Japan . | |
| 159154 | 6/1989 | Japan . | |
| 206896 | 8/1990 | Japan . | |
| 269545 | 11/1990 | Japan . | |
| 35962 | 2/1991 | Japan . | |
| 66552 | 3/1991 | Japan . | |
| 8910223 | 4/1989 | World Int. Prop. O. | 29/27 R |

*Primary Examiner*—William Briggs
*Attorney, Agent, or Firm*—Eckert Seamans Cherin & Mellott

[57] ABSTRACT

Each tool, each chuck jaw, and each hand are provided with a characteristic data storing element. Characteristic data concerning tools, chuck jaws and hands are stored in each characteristic data element. The characteristic data concerning each tool, each chuck jaw and each hand are read out of the characteristic data storing element. Tools to be installed on a tool rest and chuck jaws to be installed on a spindle chuck are discriminated according to kinds of machinings. A predetermined hand is selected from a stocker on the basis of the read out characteristic data so as to install on a carrier robot. A workpiece is picked out of a pallet so as to carry to a spindle chuck by a carrier robot. A predetermined tool is selected from the stocker on the basis of the read out characteristic data so as to carry to the tool rest by a carrier robot. A predetermined chuck jaw is selected from the stocker on the basis of the read out characteristic data so as to carry to the spindle chuck by a carrier robot.

9 Claims, 70 Drawing Sheets

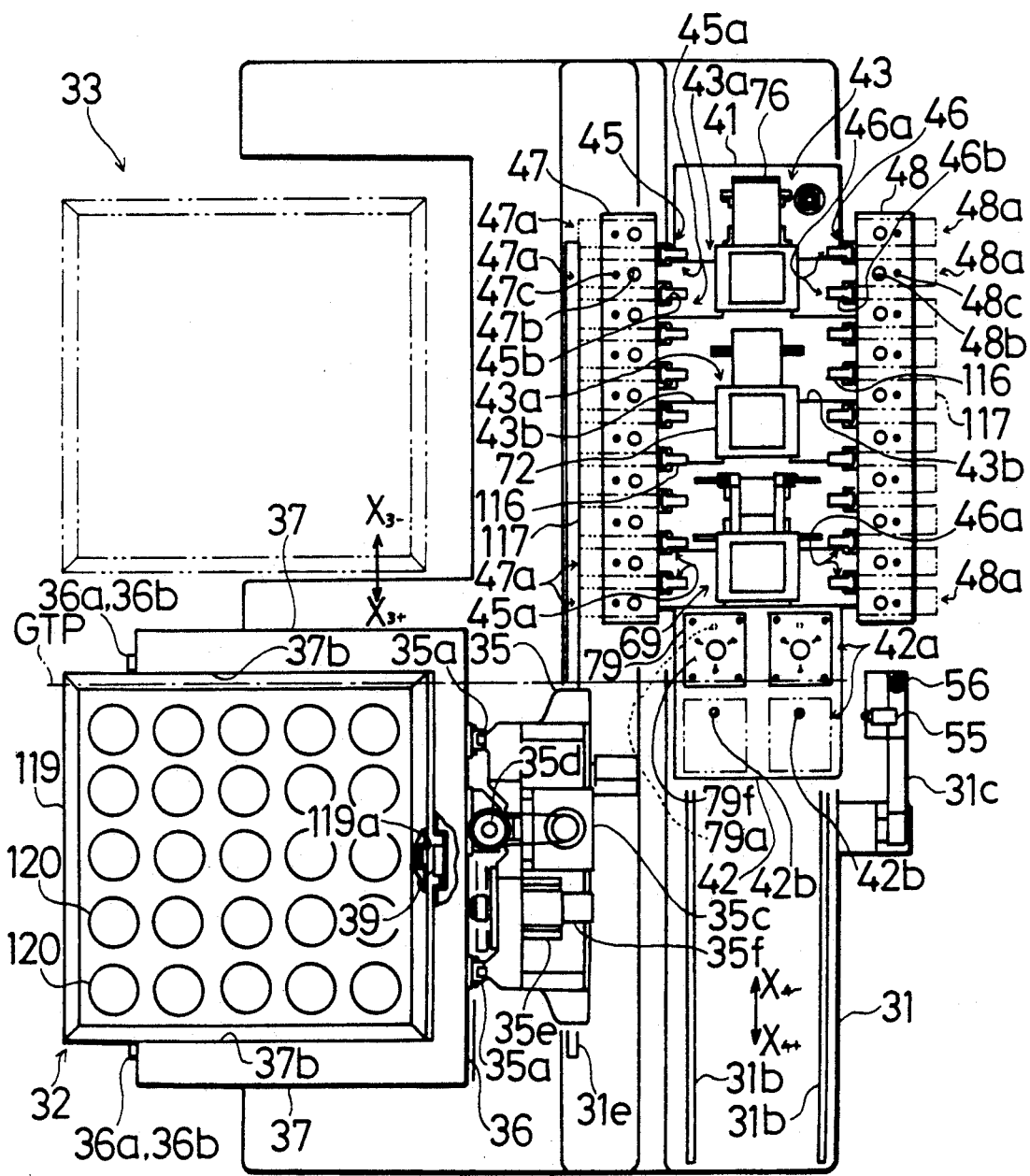

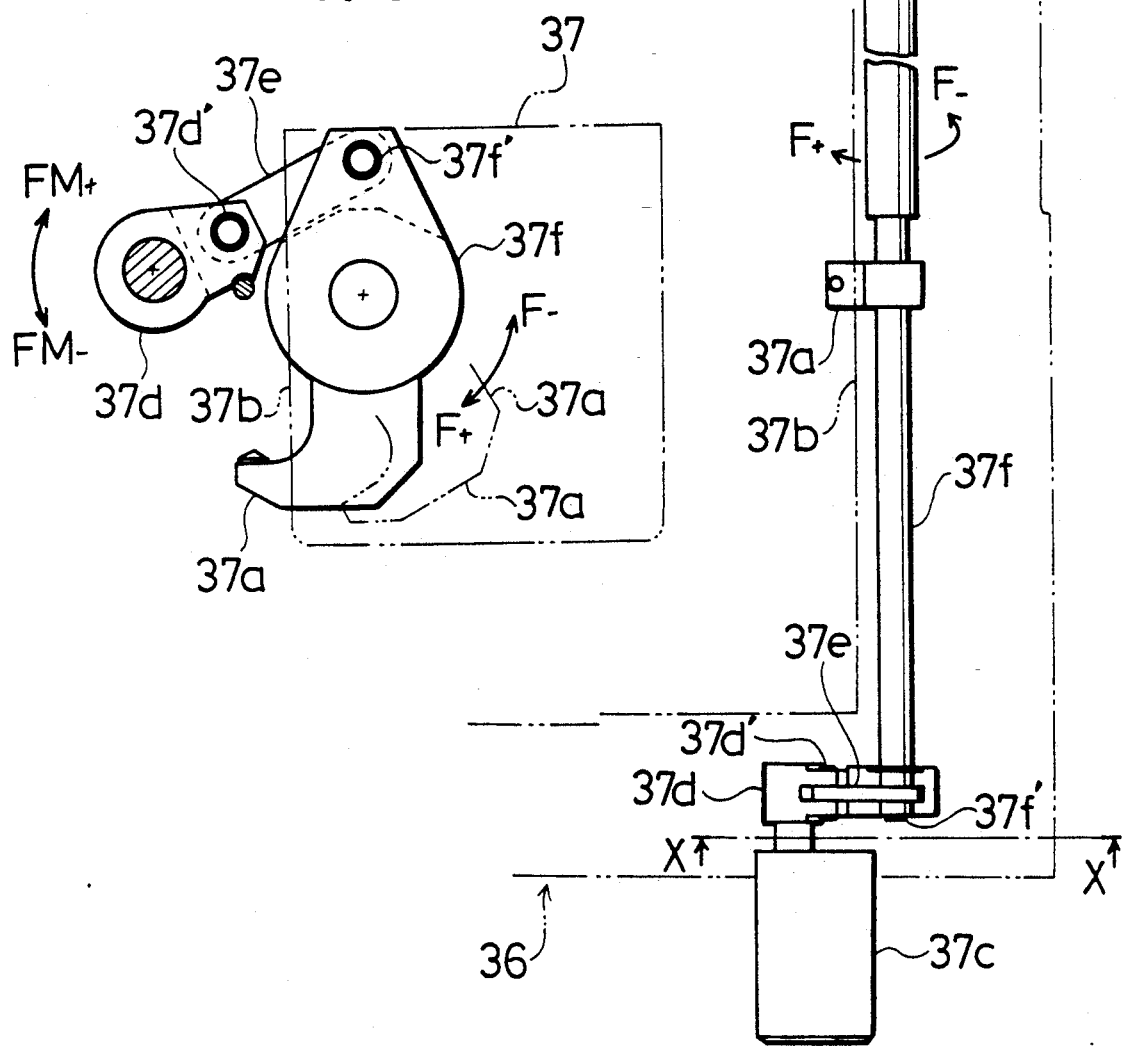

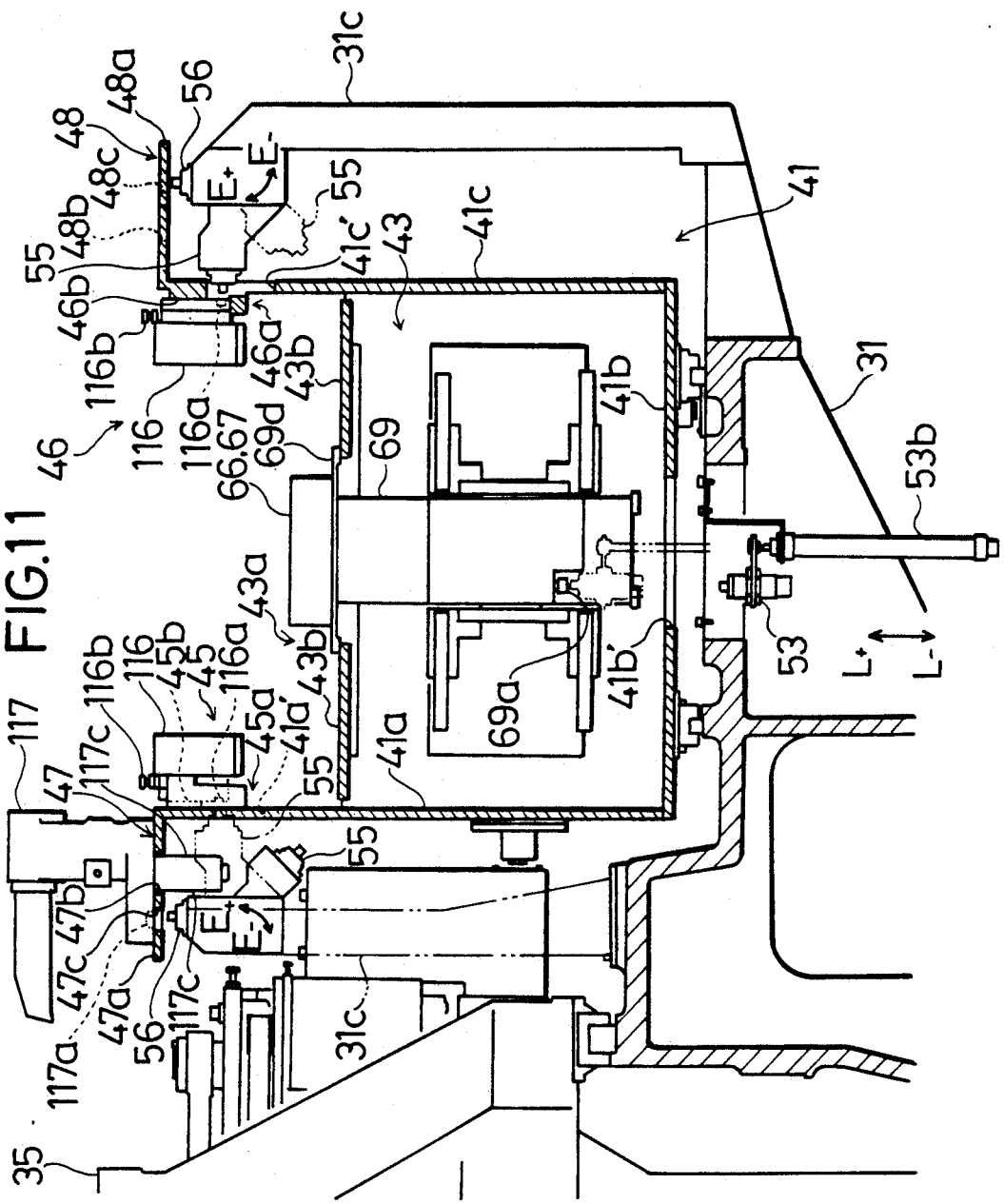

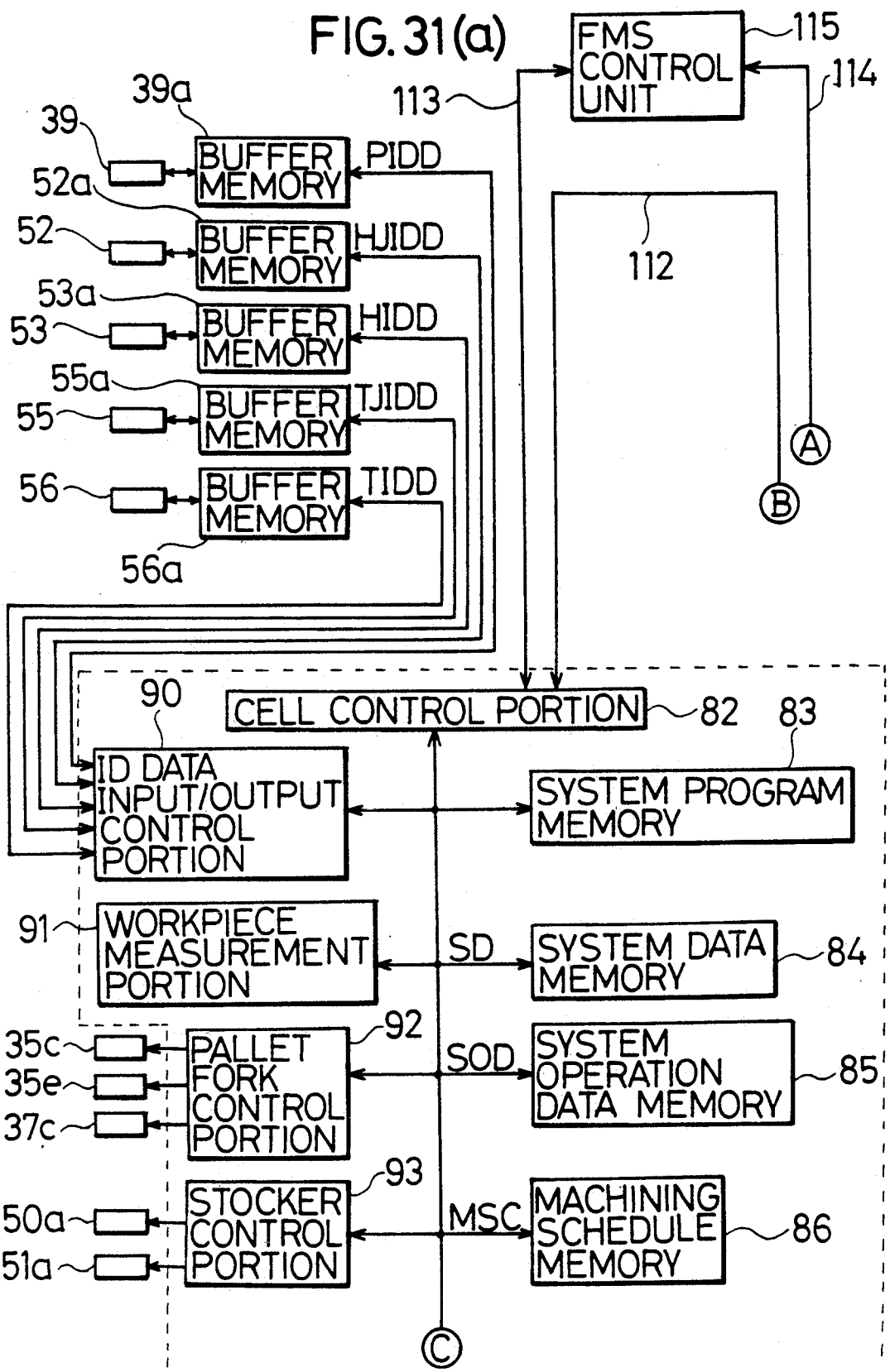

FIG.31(b)
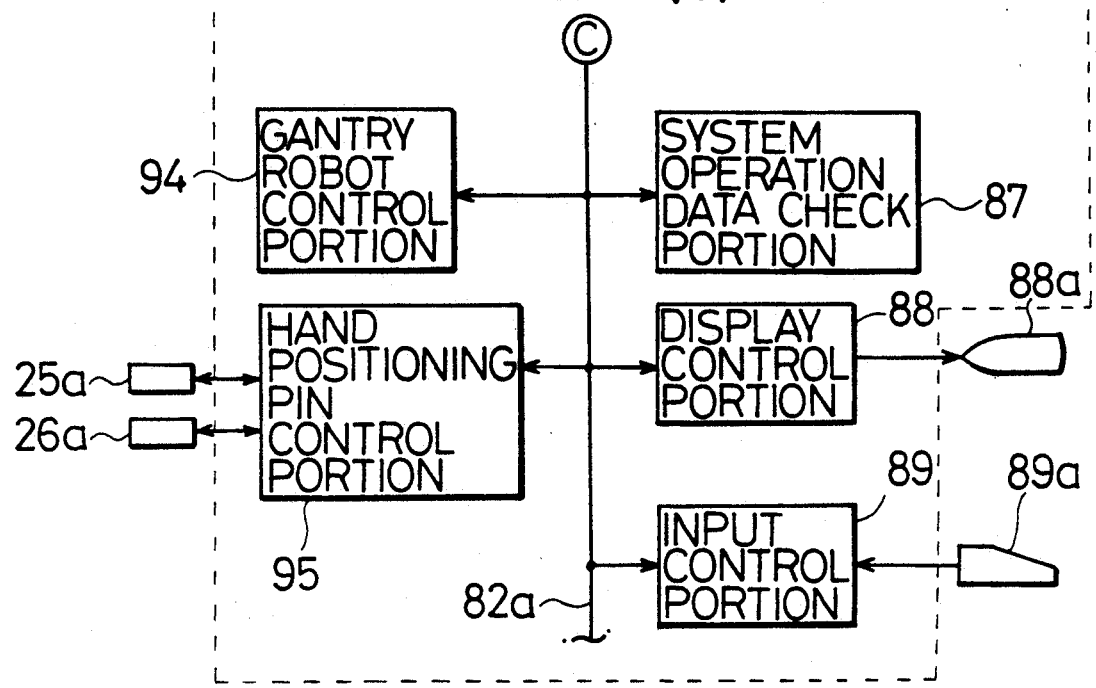
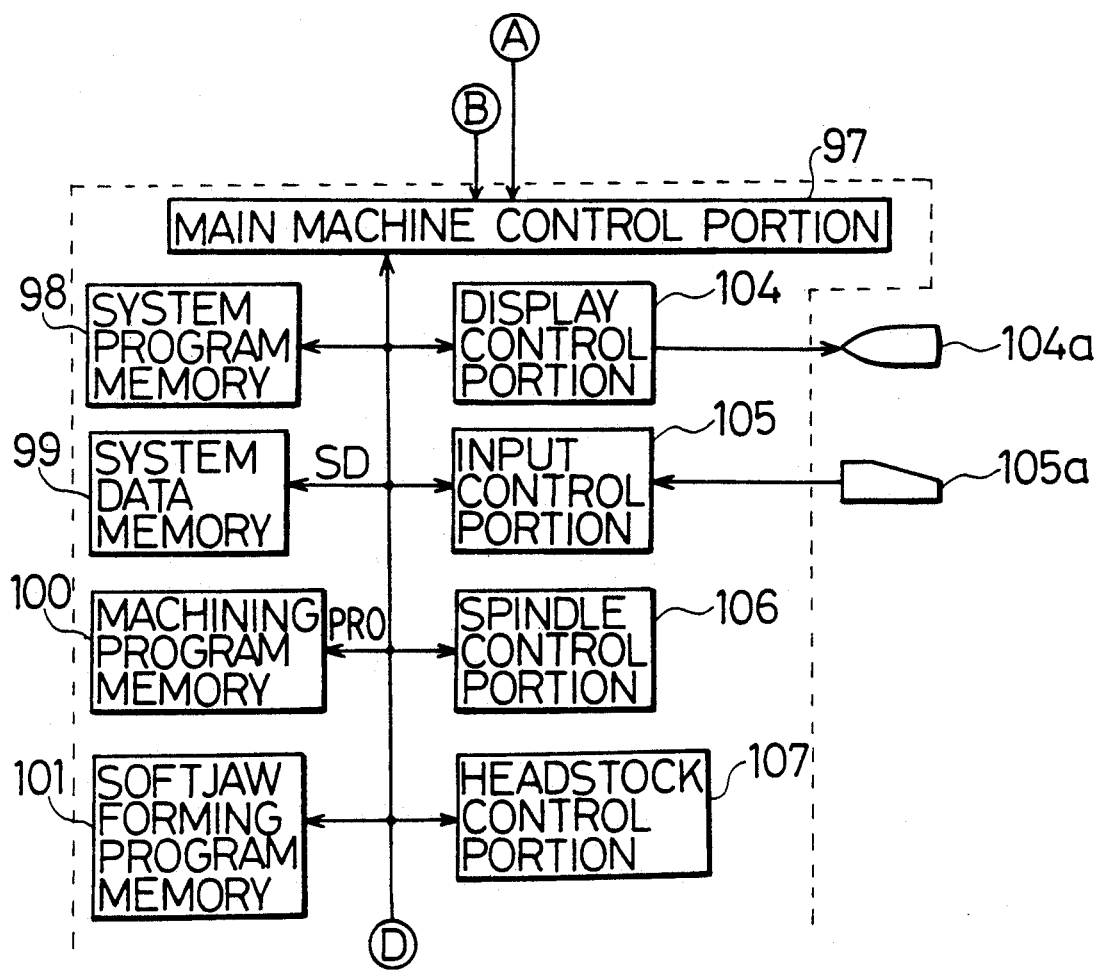

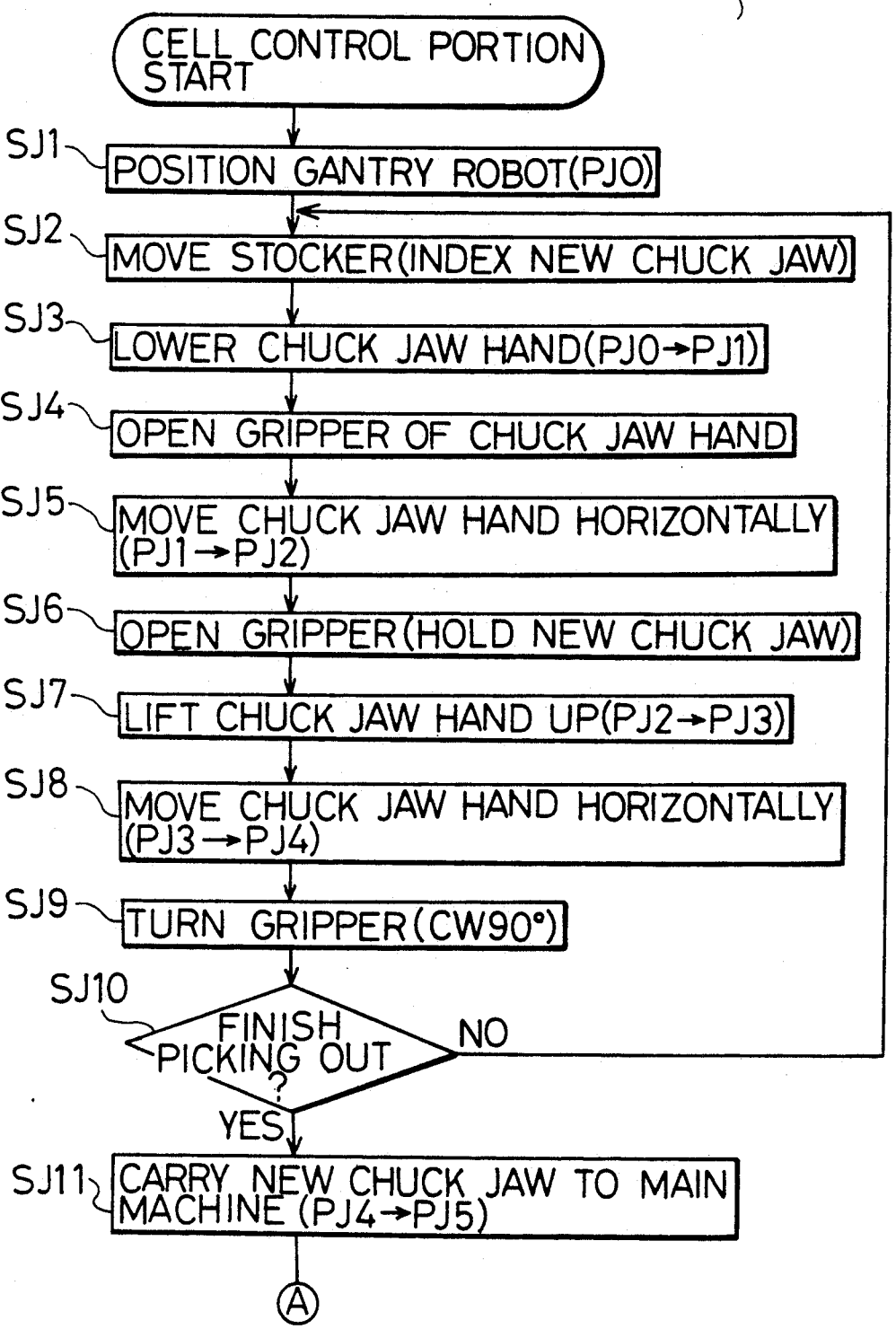

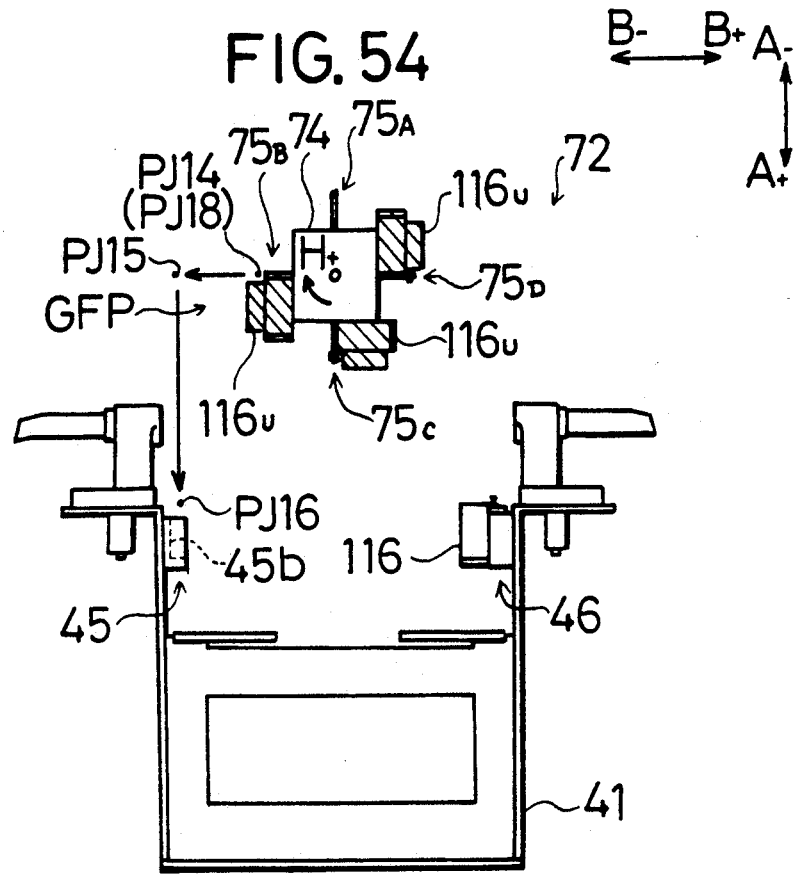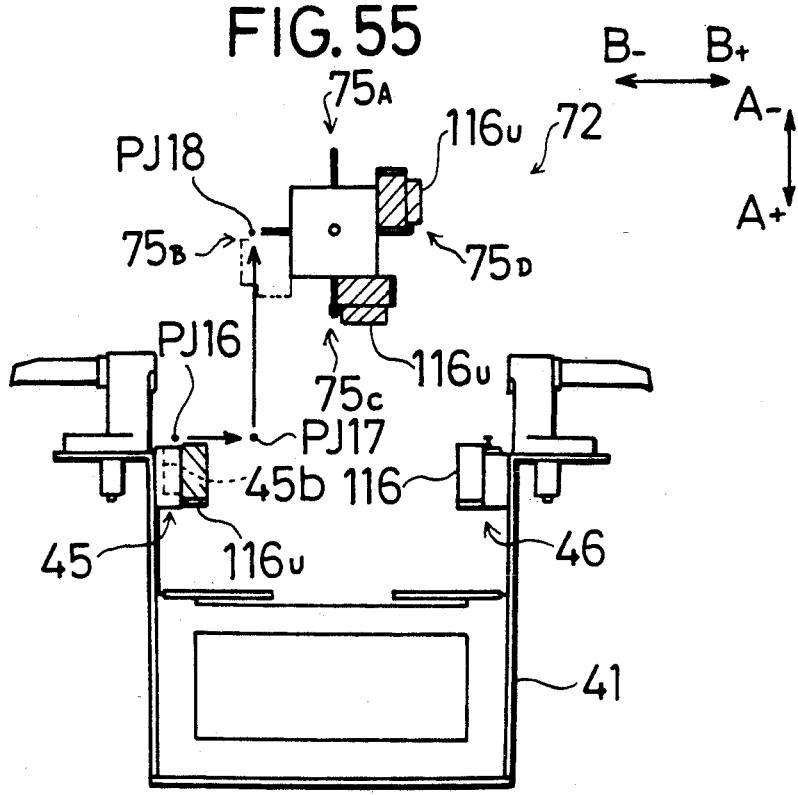

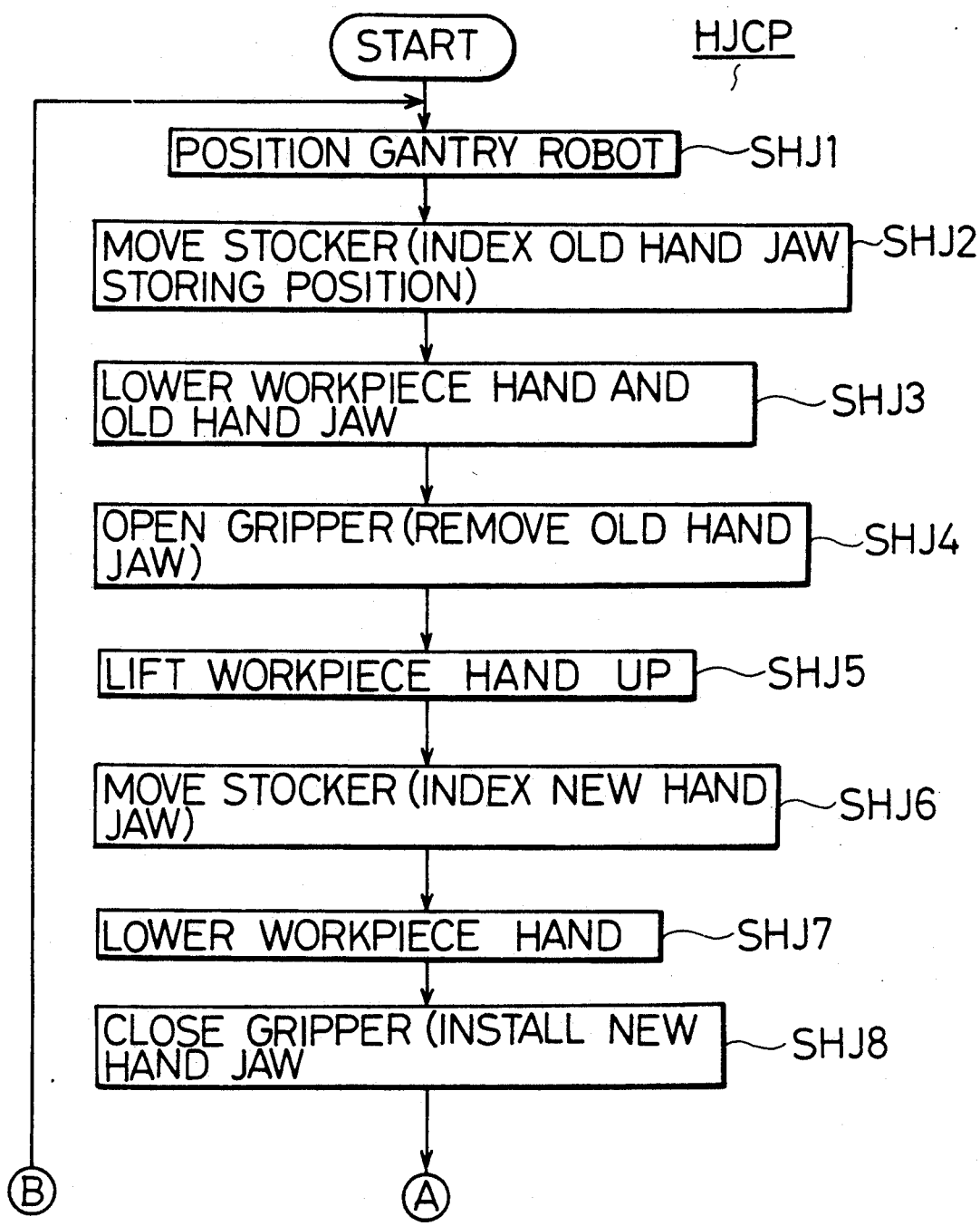

FIG.59

| WORK-PIECE NUMBER | CARRIER PROGRAM NUMBER | NUMBER OF TOOL TO BE USED | | | | | NUMBER OF CHUCK JAW TO BE USED | | | | | NUMBER OF HAND TO BE USED | NUMBER OF HAND JAW TO BE USED |
|---|---|---|---|---|---|---|---|---|---|---|---|---|---|
| | | | 1 | 2 | ... | 12 | | 1 | 2 | 3 | | |
| 1 | TPNO | HD1 | TNO | TNO | ... | TNO | HD1 | TJNO | TJNO | TJNO | HNO | HJNO |
| | | HD2 | TNO | TNO | ... | TNO | HD2 | TJNO | TJNO | TJNO | | |
| 2 | TPNO | HD1 | TNO | TNO | ... | TNO | HD1 | TJNO | TJNO | TJNO | HNO | HJNO |
| | | HD2 | TNO | TNO | ... | TNO | HD2 | TJNO | TJNO | TJNO | | |
| 3 | TPNO | HD1 | TNO | TNO | ... | TNO | HD1 | TJNO | TJNO | TJNO | HNO | HJNO |
| | | HD2 | TNO | TNO | ... | TNO | HD2 | TJNO | TJNO | TJNO | | |
| ... | ... | ... | ... | ... | ... | ... | ... | ... | ... | ... | ... | ... |
| 15 | TPNO | HD1 | TNO | TNO | ... | TNO | HD1 | TJNO | TJNO | TJNO | HNO | HJNO |
| | | HD2 | TNO | TNO | ... | TNO | HD2 | TJNO | TJNO | TJNO | | |
| 16 | TPNO | HD1 | TNO | TNO | ... | TNO | HD1 | TJNO | TJNO | TJNO | HNO | HJNO |
| | | HD2 | TNO | TNO | ... | TNO | HD2 | TJNO | TJNO | TJNO | | |
| 17 | TPNO | HD1 | TNO | TNO | ... | TNO | HD1 | TJNO | TJNO | TJNO | HNO | HJNO |
| | | HD2 | TNO | TNO | ... | TNO | HD2 | TJNO | TJNO | TJNO | | |

ASOD

SOD (rows 15-17)

|  | PALLET NO. | WORKPIECE NAME | MACHINING PROGRAM NO. | ROBOT PROGRAM NO. | NUMBERS |
|---|---|---|---|---|---|
| NO 1 | 99 | 123456 | FRANGE 9999 | 999 | 10 |
| 2 | : | : | : | : | : |
| 3 | : | : | : | : | : |
| 4 | : | : | : | : | : |

MSC

WNO  PRN  QAT

FIG.62

TIDD

| |
|---|
| TOOL NO. ← TNO |
| TOOL NAME |
| ROTATION DIRECTION (RIGHT ROTATION(FOR FIRST HEADSTOCK)) (LEFT ROTATION(FOR SECOND HEADSTOCK)) |
| SPARE TOOL, GROUP NO. |
| FORM |
| FREQUENCY OF LIFE OF TOOL(PRESET) |
| TIME OF LIFE OF TOOL(PRESET) |
| USING FREQUENCY(COUNTER) |
| USING TIME(COUNTER) |
| TOOL SET VALUE(X,Z) |
| ABRASION COMPENSATION VALUE(X,Z) |
| ABRASION LOSS MAXIMUM SET VALUE |
| NOSE RADIUS(FIXED) |
| DEPTH OF CUT(MAXIMUM) |
| TOOL WIDTH FOR SETTING BARRIER |
| TOOL LENGTH FOR SETTING BARRIER |
| MANUFACTURE DATE |
| ID WRITING TIMES |

FIG.63

TJIDD

| | |
|---|---|
| TJNO → | JAW NUMBER |
| | POSITION OF JAW |
| | OUTER JAW/INNER JAW |
| SFDD → | JAW EACH PORTION DIMENSION |
| | CHUCK BARRIER YES/NO |
| | GRASP DIAMETER |
| | JAW FORMING YES/NO |
| | SOFT-JAW FORMING YES/NO |
| SJFPN → | SOFT-JAW FORMING PROGRAM NO. |
| | SOFT-JAW USING TIME |
| | TIME OF LIFE OF SOFT-JAW |
| | MANUFACTURE DATE |
| | ID WRITING TIMES |

FIG. 64

HIDD

HNO → | HAND NO. |
| --- |
| KIND OF HAND |
| CORRESPONDING WORKPIECE |
| CORE COMPENSATION DATA |
| MANUFACTURE DATA |
| ID WRITING TIMES |

FIG. 65

HJIDD

HJNO → | HAND JAW NO. |
| --- |
| CORRESPONDING WORKPIECE NO. |
| INNER FASTENING/OUTER FASTENING |
| MANUFACTURE DATE |
| ID WRITING TIMES |

FIG. 66

PIDD

| | |
|---|---|
| PLNO → | PALLET NUMBER |
| WPI { | KIND OF WORKPIECE (CHUCK WORKPIECE / SHAFT-SHAPED WORKPIECE / BAR-SHAPED WORKPIECE) |
| | NUMBERS OF STACKED WORKPIECES |
| | WORKPIECE STANDARD POSITION DIMENSION |
| | NUMBERS OF WORKPIECES ON PALLET |
| | WORKPIECE INTERVAL |
| | WORKPIECE DIMENSION |
| WNO (PRN) → | WORKPIECE NUMBER (MACHINING PROGRAM NO. / ROBOT PROGRAM NO.) |
| PPHT → | HEIGHT OF PALLET PIN |
| HNO → | CORRESPONDING WORKPIECE HAND NO. |
| HJNO → | CORRESPONDING HAND JAW NO. |
| TNO → | CORRESPONDING TOOL NO. |
| | TOOL HAND NO. |
| TJNO → | CORRESPONDING CHUCK JAW NO. |
| | CHUCK JAW HAND NO. |
| | MANUFACTURE DATE |
| | ID WRITING TIMES (FOR CUMULATIVE TOTALIZATION) |

FIG.67

SJFP

```
PHo.MAT  OD  ID   LENGTH  RPM  FIN-X  FIN-Z  WORK FACE
0 JAW    UA  #2            0.2   0.1
         └──SFDD──┘ UB

PNo. MODE  #  DPT-X  DPT-Z  RPS  FPS  RFD   RD   RT   FT
1 BAR  IN  0   #2     0      91  140  0.16  3.5  ○○△  ○○△

SEQ FIG S-CNR SPT-X SPT-Z FPT-X FPT-Z F-CNR/$ RAD R/ANG RGH
1 TPR C 0.5    #1     0   #3-K33                         ▼▼▼⊏
2 LIN                      #3     $1                     ▼▼▼⊏

PNo. MODE CNT RET WORK NO. CON TM SFT
2 END
```

TNO

AUTOMATIC SETUP APPARATUS

BACKGROUND OF THE INVENTION

This invention relates to an automatic setup apparatus in a numerical control machine tool, such as an opposed spindle lathe, having arranged apparatus, such as tool rests, spindle chucks, on which setup change members, such as tools and chuck jaws, are installed free to exchange according to kinds of workpieces or machinings.

In a conventional numerical control machine tool, a workpiece can automatically carried and exchanged with a carrier robot. Therefore, successive machining can be automatically executed on a lot of workpieces by setting up necessary kinds of tools and chuck jaws, for machining, in advance.

However, setup operations of a numerical control machine tool prior to automatic operation are complicated and need a longer time. Besides, it is necessary for an operator to judge tools and chuck jaws, necessary for machining. By doing this, necessary tools and chuck jaws may not set up because of judgement mistake by an operator. Automatic operation in a conventional numerical control machine tool can be executed with respect to only a single kind of workpiece. In case where kinds of workpieces are different from each other, it is necessary for an operator to stop a machine and to change setup of tools or chuck jaws. This is a big obstacle for unmanned machining.

In case of successive machining on a plurality of workpieces with a conventional numerical control machine tool, an operator composes a machining schedule indicating the order of machining of workpieces. A control unit of a machine tool deems that a plurality of workpieces are carried and supplied in order as shown in a machining schedule and executes the control of various kinds of machine operations, such as machining operations.

However, in case where kinds of workpieces to be machined are many, the operations of composition of a machining schedule are complicated and mistakes by an operator may arise in composition of a machining schedule. This may result in interruption of automatic operation of a numerical control machine tool.

SUMMARY OF THE INVENTION

The object of this invention is to provide an automatic setup apparatus in a numerical control machine tool, capable of machining on various kinds of workpieces for a long time without any assistance by an operator by automating setup or setup change of tools, the chuck jaws and the like in order to eliminate the above-mentioned faults.

The arrangement of the present invention is as follows. In a numerical control machine tool having an arranged apparatus, on which setup change members are exchangeably installed, a setup change member storing means for storing a plurality of kinds of the setup change members is provided, a setup change member information storing means for storing setup change member informations concerning the setup change member is provided at each of the setup change members, a setup change member information reading means for reading the setup change member information out of the setup change member information storing means is provided, a setup change member decision means for deciding the setup change member to be set up to the arranged apparatus on the basis of a machining program is provided, and a setup change member carrying means for selecting the setup change member decided by the setup change member decision means from the setup change member storing means and carrying on the basis of the setup change member information read out with the setup change member information reading means is provided free to move between a position of the setup change member storing means and a position of the arranged apparatus.

With the above-mentioned arrangement, a kind and a position of each setup change member, stored in the setup change member storing means are automatically discriminated. Therefore, it is possible to certainly select a predetermined setup change member from the setup change member storing means and set it up and change setup of it to the arranged apparatus, automatically.

Besides, the arrangement of the present invention is that in a numerical control machine tool having an arranged apparatus, on which setup change members are exchangeably installed, a workpiece storing means for storing workpieces is provided, a workpiece information storing means for storing workpiece informations concerning the workpiece, which is stored in the workpiece storing means is provided at the workpiece storing means, a workpiece information reading means for reading the workpiece informations out of the workpiece information storing means is provided, a workpiece carrying means for picking the workpiece out of the workpiece storing means and carrying is provided being free to move to a position of the workpiece storing means, a setup change member storing means for storing a plurality of kinds of the setup change members is provided, a setup change member information storing means for storing the setup change member informations concerning the setup change member is provided at each of the setup change members, a setup change member information reading means for reading the setup change member informations out of the setup change member information storing means is provided, a setup change member decision means for deciding the setup change member to be set up to the arranged apparatus on the basis of the workpiece informations read out with the workpiece information reading means is provided and a setup change member carrying means for selecting the setup change member, which is decided with the setup change member decision means from the setup change member storing means on the basis of the setup change member information read out with the setup change member information reading means and carrying it is provided being free to move between a position of the setup change member storing means and a position of the arranged apparatus.

With the above-mentioned arrangement, the kinds of workpieces, which are stored in the workpiece storing means are automatically discriminated. Therefore, a setup change member associated with a kind of a workpiece is certainly discriminated so as to set up and change the setup, automatically.

And, in case where the arrangement of the present invention is that a machining program decision means for deciding a machining program to be used for machining on the basis of the workpiece informations read out with the workpiece information reading means is provided and a machining operation control means for controlling machining operations on the basis of the machining program, which is decided with the machining program decision means is provided, a machining program associated with a kind of a workpiece can be certainly selected.

With such an arrangement that a setup change member sufficiency judgement means for judging whether or not the setup change members, necessary for machining on the workpiece stored in the workpiece storing means, are stored in the setup change member storing means by comparing the workpiece information concerning the workpiece, which is read out with the workpiece information reading means with the setup change member information, which is read out with the setup change member information reading means, is provided, whether or not necessary kinds of setup change members are supplied prior to automatic operation of a numerical control machine tool is automatically recognized, whereby interruption of automatic operation owing to a shortage of the setup change members can be saved.

Furthermore, in case where the arrangement of the present invention is that a holding apparatus storing means for storing a plurality of kinds of holding apparatus capable of holding the workpieces or the setup change members is provided, a holding apparatus information storing means for storing the holding apparatus informations concerning the holding apparatus is provided at each of the holding apparatus, a holding apparatus information reading means for reading the holding apparatus informations out of the holding apparatus information storing means is provided, a common carrying means is provided as the workpiece carrying means and the setup change member carrying means being free to move to a position of the holding apparatus storing means so as to exchange the holding apparatus by selecting from the holding apparatus storing means on the basis of the holding apparatus information read out with the holding apparatus information reading means in accordance with the kind of the workpiece or the setup change member, to be carried, a carrier control program decision means for deciding a carrier control program to be used on the basis of the workpiece information, read out with the workpiece information reading means is provided and a carrier control means for driving and controlling the common carrying means on the basis of the carrier control program, decided with the carrier control program decision means is provided, a kind and a position of each holding apparatus, which is stored in the holding apparatus storing means are automatically discriminated. Therefore, it is possible to certainly select a predetermined holding apparatus from the holding apparatus storing means so as to install oh the carrying means and carry various kinds of workpieces and setup change members with the common carrying means.

Furthermore, the arrangement of the present invention is that in a numerical control machine tool having spindle chuck, being formed a jaw installation slot thereon, in which a chuck jaw is attachably and detachably installed, a guide slot for guiding attachment and detachment of the chuck jaw to the jaw installation slot is provided so as to correspond with the jaw installation slot, a jaw storing means for storing a plurality of kinds of the chuck jaws being free to put in and out one by one is provided, a jaw carrying means is provided being free to move between a position of the spindle chuck and a position of the jaw storing means in a first direction, an arm is provided at the jaw carrying means, being free to move in a second direction, in which direction the arm can correspond with the jaw installation slot, a jaw holding apparatus is fixedly provided at the arm so as to approach and depart from the jaw installation slot by movement of the arm and a gripper for holding one chuck jaw is provided at the jaw holding apparatus so as to face the jaw installation slot.

With the above-mentioned arrangement, a lot of chuck jaws can be stored in the jaw storing means, whereby the numerical control machine tool can be applied to many kinds of workpieces. Besides, the chuck jaw can be easily attached to and detached from the jaw installation slot by guiding by the guide slot without precisely positioning the jaw holding apparatus.

In case where the arrangement is that the grippers more than numbers of the chuck jaws, to be installed on the spindle chuck, are provided at the jaw holding apparatus so as to selectively face the chuck installation slot, carriage of the chuck jaws can be performed in the lump and exchange time of the chuck jaws can be shortened.

Furthermore, the arrangement of the present invention is as follows. In a numerical control machine tool having first and second spindles being free to relatively move in a direction of central axes of the spindles disposed so as to face each other and first and second tool rests, exchangeably installing tools thereon, provided being respectively associated with the spindles, a tool storing means for storing a plurality of kinds of tools is provided, a tool carrying means is provided free to move between a position of the tool storing means and a position of the first tool rest and between a position of the tool storing means and a position of the second tool rest, a tool holding apparatus is provided at the tool carrying means, first gripper is provided at the tool holding apparatus so as to face the first tool rest and second gripper is provided at the tool holding apparatus so as to face the second tool rest.

With the above-described arrangement, a lot of tools can be stored in the tool storing means, whereby the numerical control machine tool can be applied to many kinds of workpieces. Besides, the carriage of the tools to the first and second tool rests can be performed in the lump and exchange time of tools can be shortened.

In case where a rolling member is provided at the tool holding apparatus, being free to rotate, a plurality of the first grippers are provided at the rolling member so as to selectively face the first tool rest by the rotation of the rolling member, and a plurality of the second grippers are provided at the rolling member so as to selectively face the second tool rest by the rotation of the rolling member, detachment of unnecessary tools and attachment of new tools to the first tool rest or the second tool rest can be performed successively, whereby exchange time of the tools can be shortened.

Besides, the arrangement of the present invention is that the tool carrying means is provided being free to move in a first direction, an arm is provided at the tool carrying means being free to move in a second direction, the tool holding apparatus is fixedly provided at the arm so as to face the first gripper to the first tool rest and so as to face the second gripper to the second tool rest by movement of the arm and a holding apparatus fixing means for fixing the tool holding apparatus on a bed in such a state that the arm moves to the position, at which the first grippers can face the first tool rest or the second grippers can face the second tool rest, is provided being fixed on the bed so as to engage with and remove from the tool holding apparatus, the tool holding apparatus can be fixed at a predetermined position and the tools can be properly attached to and detached from the first tool rest or the second tool rest even if rigidity of the arm is low.

Furthermore, the arrangement of the present invention is that in a numerical control machine tool, a plurality of workpiece storing means for storing workpieces are provided, a workpiece information storing means for storing workpiece informations concerning the workpiece, stored in the workpiece storing means is provided at each of the workpiece storing means, a workpiece information reading means for reading the workpiece informations out of the workpiece information storing means is provided free to move being relative to each workpiece storing means according to the supply order of the workpiece storing means and a machining schedule composition means for composing a machining schedule concerning machining order of the workpieces, stored in the workpiece storing means on the basis of the contents of the workpiece informations, read out with the workpiece information reading means and the order in which the workpiece informations are read out, is provided.

With the above-mentioned arrangement, the machining schedule can be automatically composed and the machining schedule and the actual supply order of the workpieces can certainly correspond with each other.

BRIEF DESCRIPTION OF THE DRAWINGS

FIG. 8 is a top view of the setup station of FIG. 7;

FIG. 9 is a view showing a driving mechanism of a hook of a pallet fork of FIG. 8;

FIG. 10 is a sectional view along line X—X of the driving mechanism of the hook of the pallet fork of FIG. 9;

FIG. 11 is an enlarged sectional view of a stocker of FIG. 7;

FIGS. 49 through 55 illustrate way of exchange of chuck jaws;

FIG. 59 is a diagrammatic representation of system operation data;

FIG. 61 is a diagrammatic representation of machining schedule;

FIG. 62 is a diagrammatic representation of tool ID data;

FIG. 63 is a diagrammatic representation of chuck jaw ID data;

FIG. 64 is a diagrammatic representation of hand ID data;

FIG. 65 is a diagrammatic representation of hand jaw ID data;

FIG. 66 is a diagrammatic representation of pallet ID data;

FIG. 67 is a diagrammatic representation of an example of a soft-jaw forming program;

DESCRIPTION OF THE PREFERRED EMBODIMENTS

Figure 1:
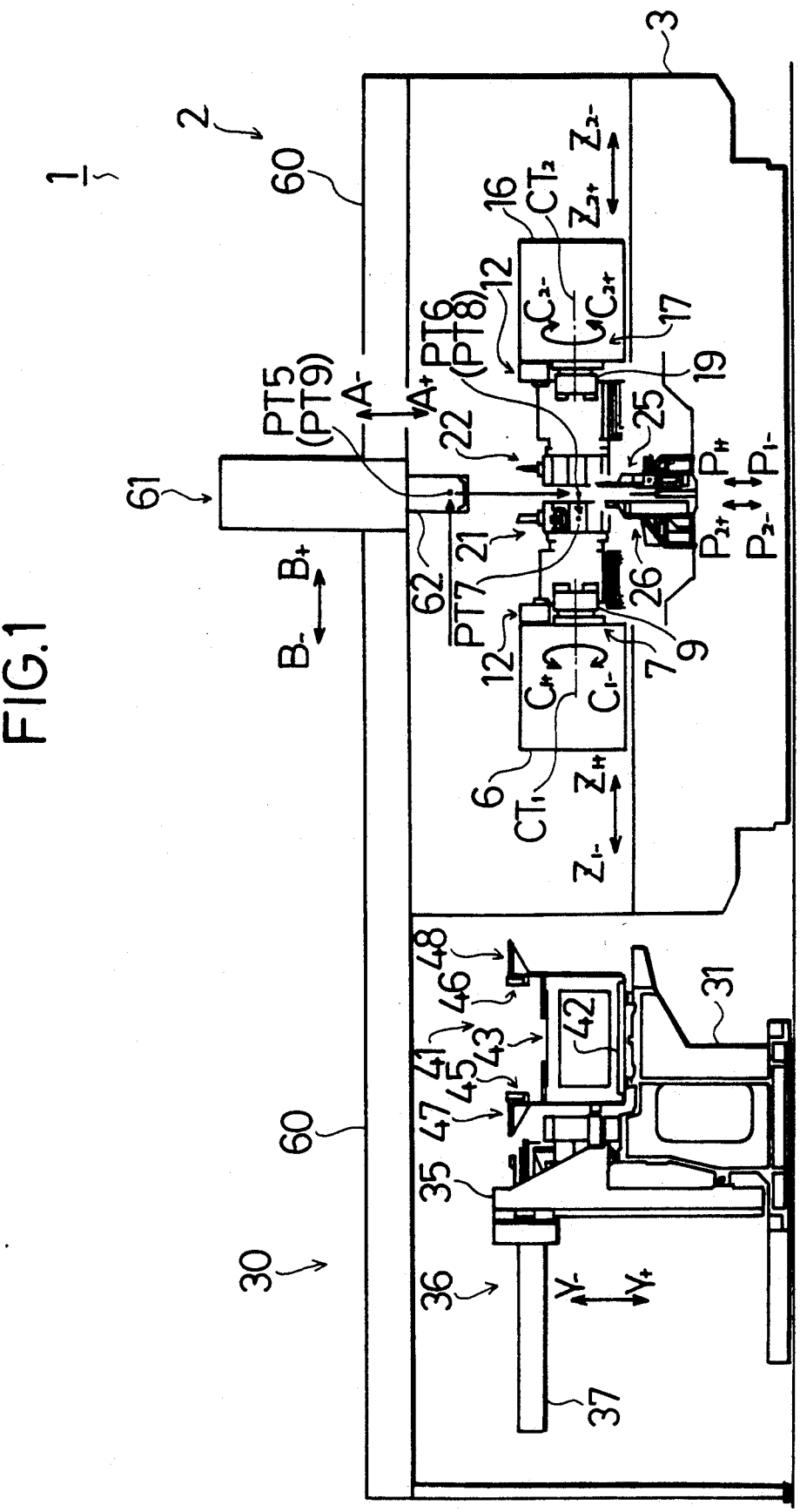
FIG. 1 is a front elevation of a turning cell including an embodiment of an automatic setup apparatus according to the present invention.
Figure 2:
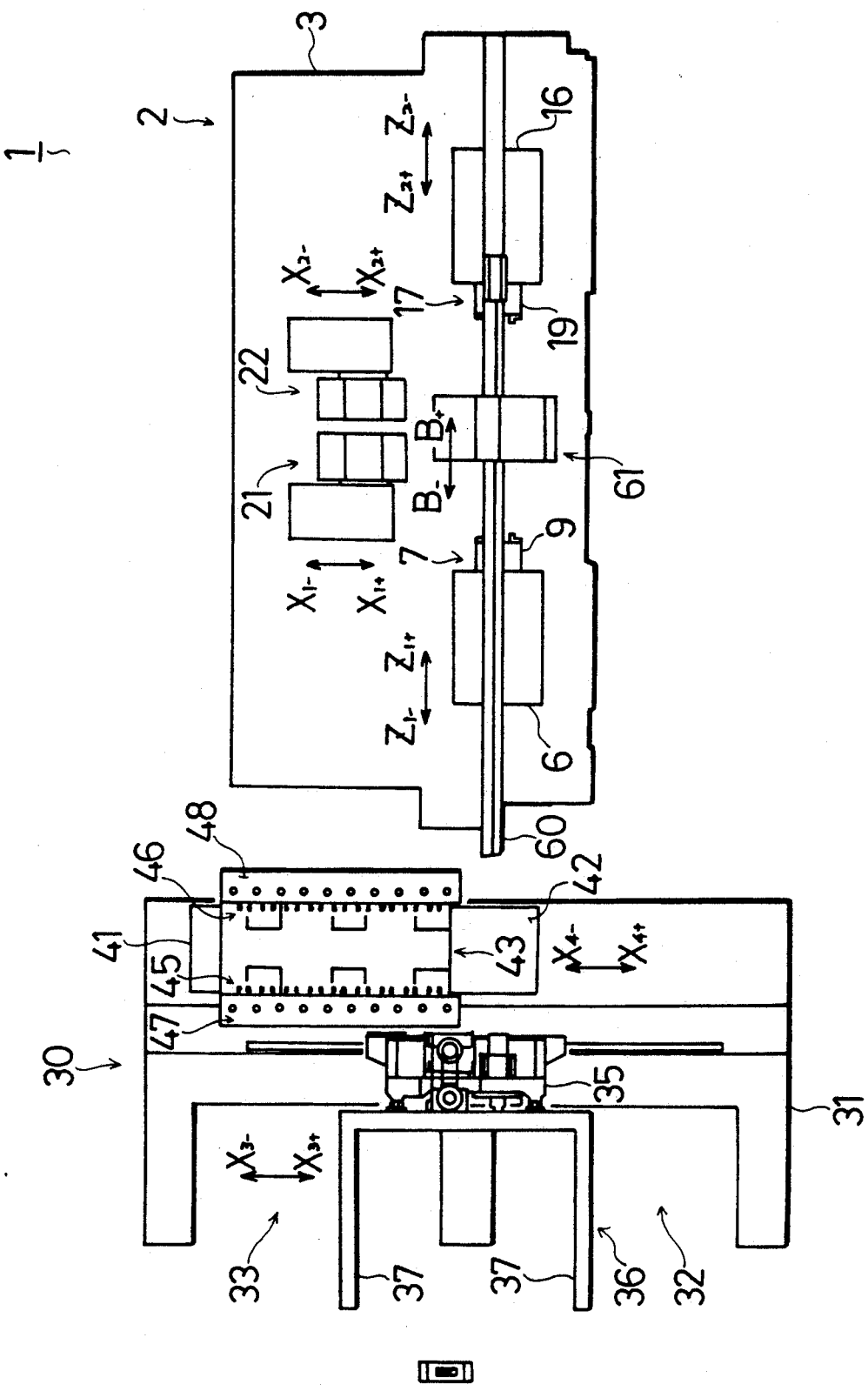
FIG. 2 is a top view of the turning cell of FIG. 1.

A turning cell 1 has an opposed spindles lathe 2 ("the main machine" hereinafter) as shown in FIG. 1 or FIG. 2. At the left hand of the main machine 2, a setup station 30 is provided. Over the main machine 2 and the setup station 30 in FIG.1, a gantry robot 61 is provided, whereby the main machine 2 communicates with the setup station 30.

The main machine 2 has a machine body 3. On the machine body 3, a first headstock 6 and a second headstock 16 are provided so as to face each other, each of the headstocks 6, 16 being movable in the directions of the arrows $Z_{1+}$ and $Z_{1-}$ or in the directions of the arrows $Z_{2+}$ and $Z_{2-}$, which are directions of center axes of spindles (Z-axis direction). On the machine body 3, a first turret tool rest 21 and a second turret tool rest 22 are also provided, being respectively associated with the first headstock 6 and the second headstock 16. Each of the turret tool rests 21, 22 is movable in the directions of the arrows $X_{1+}$ and $X_{1-}$ or in the directions of the arrows $X_{2+}$ and $X_{2-}$, perpendicular to the directions of the arrows $Z_+$ and $Z_-$.

Figure 3:
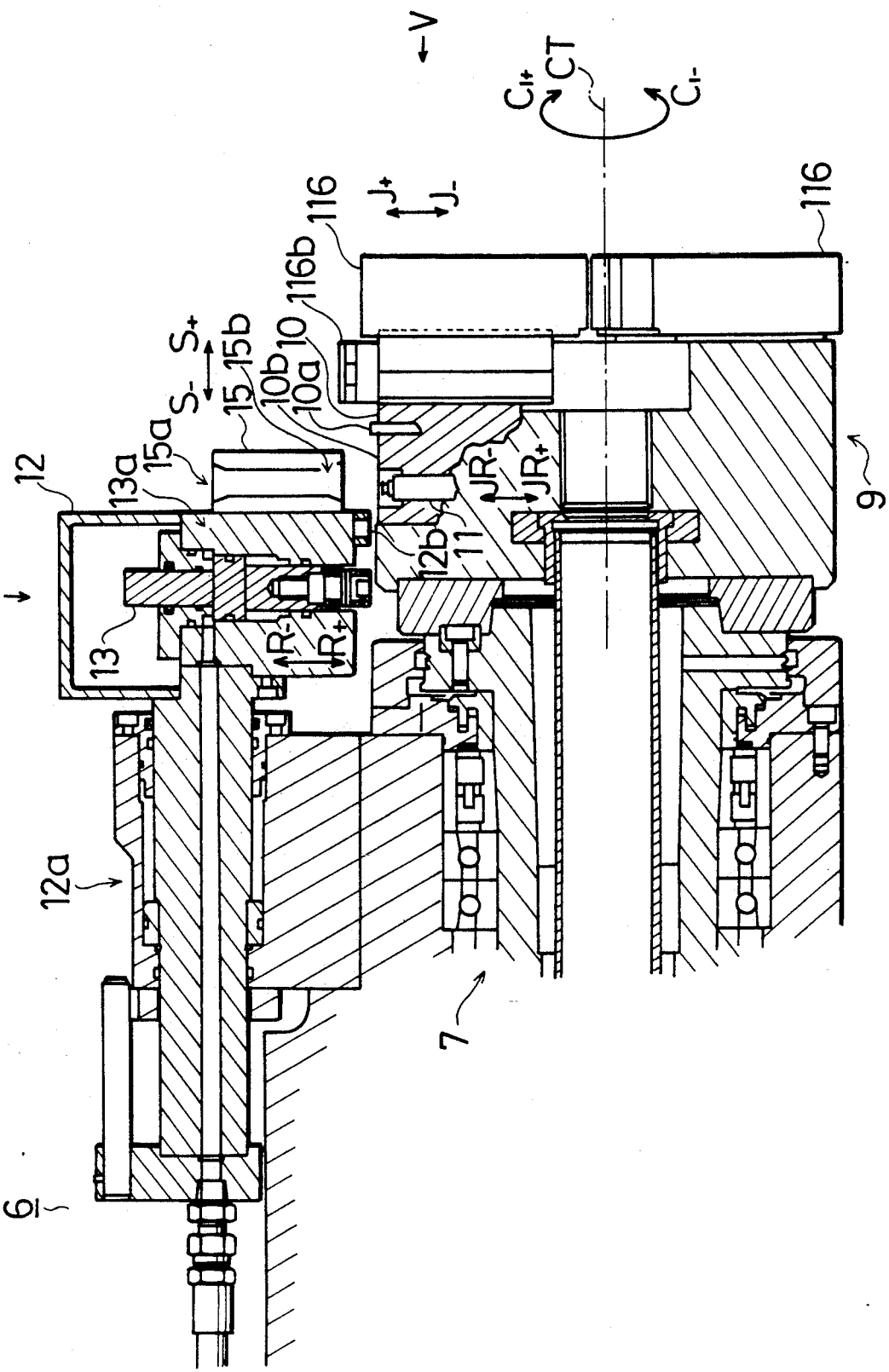
FIG. 3 is a sectional view indicating a chuck and a chuck jaw exchange assist in the turning cell of FIG. 1.
Figure 4:
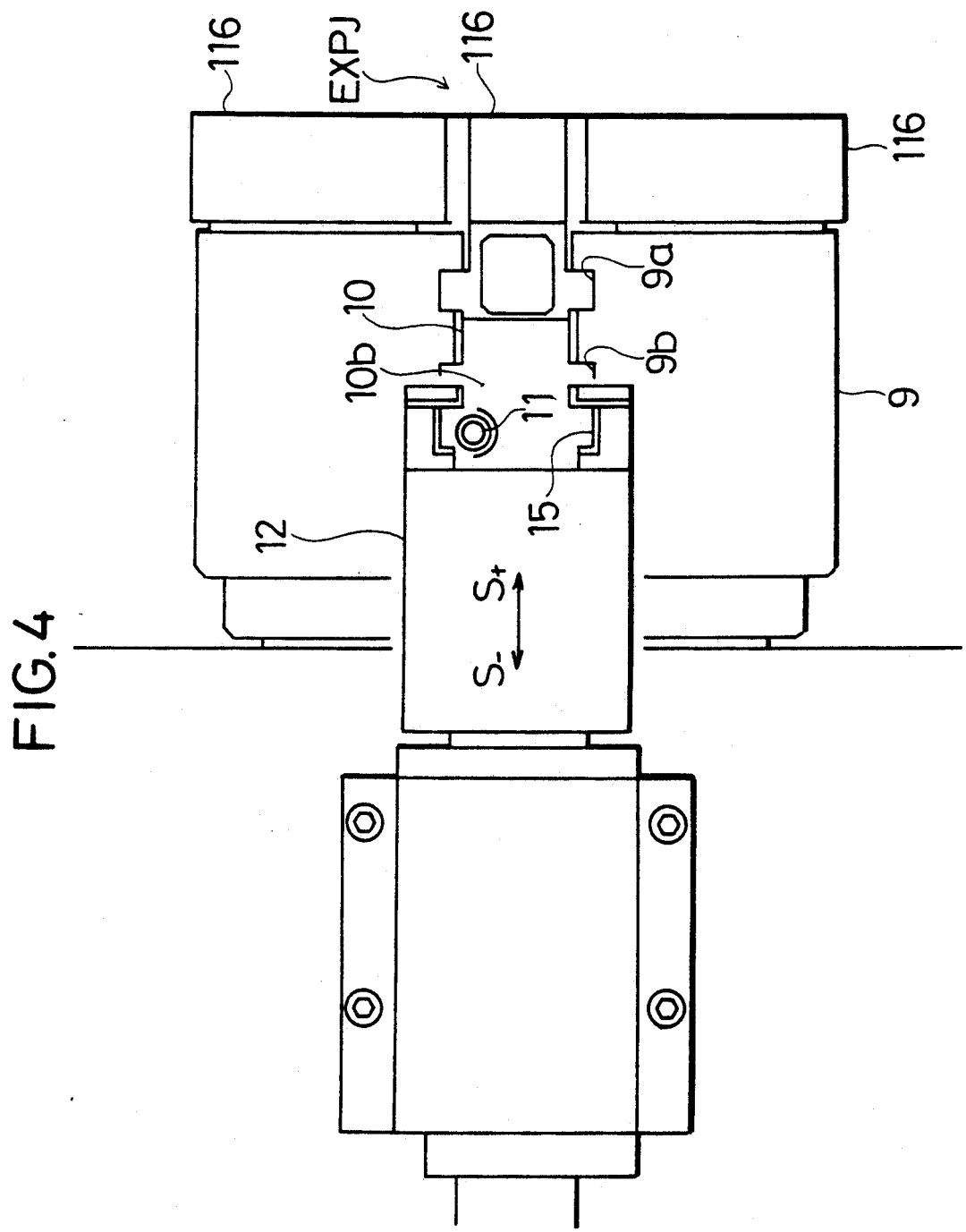
FIG. 4 is a view seen by the arrow IV toward the chuck and the chuck jaw exchange assist as shown in FIG. 3.
Figure 5:
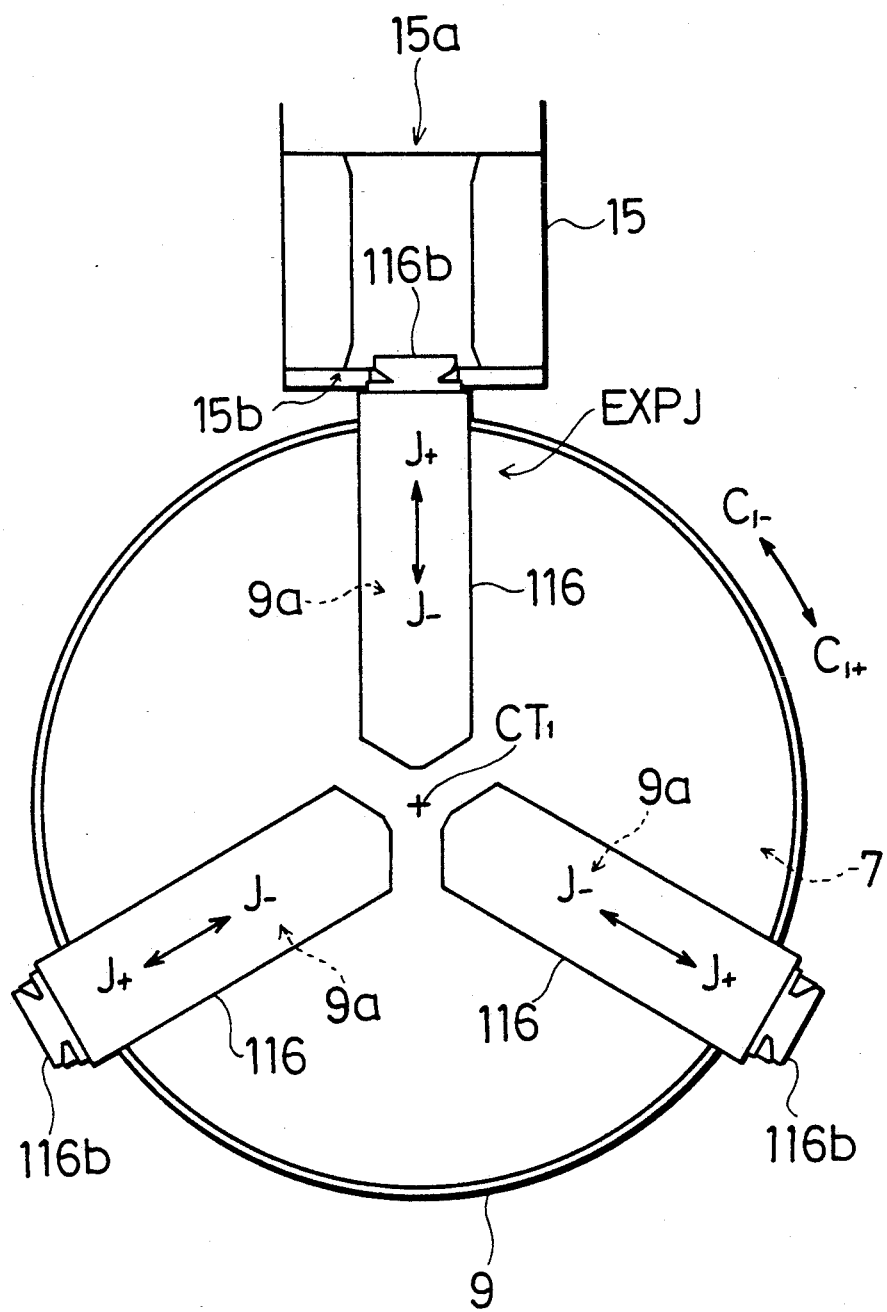
FIG. 5 is a view seen by the arrow V toward the chuck and the chuck jaw exchange assist as shown in FIG. 3.
Figure 24:
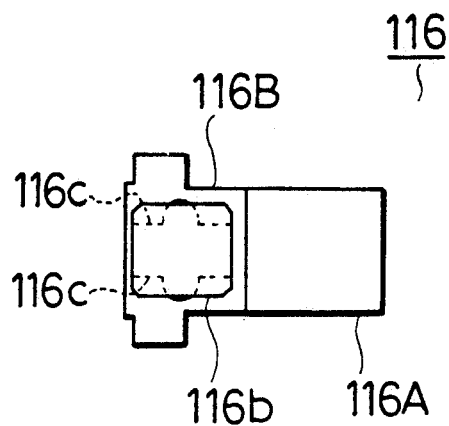
FIGS. 24 through 26 illustrate an example of chuck jaws.
Figure 25:
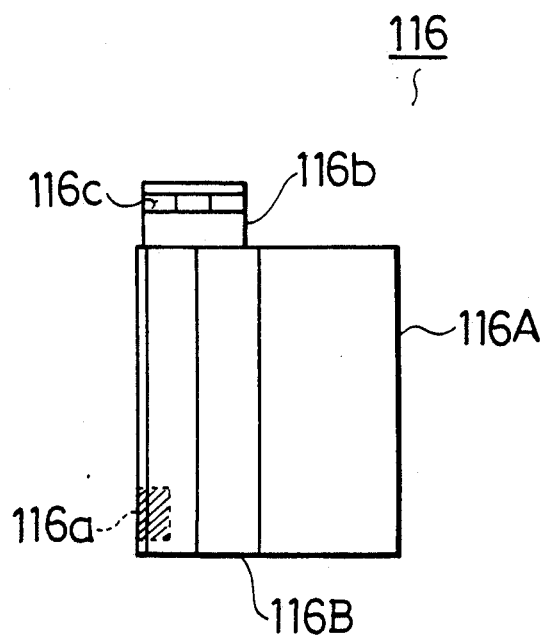

At each of the headstocks 6 and 16, a workpiece spindle 7 or 17 is provided, being rotatable in the directions of the arrows $C_{1+}$ and $C_{1-}$ or the arrows $C_{2+}$ and $C_{2-}$. The workpiece spindles 7 and 17 are provided in such a manner that axis centers $CT_1$ and $CT_2$ correspond with each other on a straight line. At each end of the workpiece spindles 7 and 17, a chuck 9 or 19 is installed. At the chuck 9, slide slots 9a and 9b are formed connecting with each other, as shown in FIG.4. On the chuck 9, three chuck jaws 116 are installed at intervals of 120 degrees with respect to the central axis $CT_1$, each being free to attach or detach, the three chuck jaws 116 being fitted into the slide slots 9a and openable in the directions of the arrows $J_+$ and $J_-$ in FIG. 5, respectively. Three closing and opening operation members 10, each of which is engaged with each of the chuck jaws 116 by having the closing and opening operation member 10 fitted into the slide slot 9b, are installed being movable in the directions of the arrows $J_+$ and $J_-$ in FIG. 3. The chuck jaw 116 is comprised in such a manner that a soft-jaw 116A (which is a member to be abutted against a workpiece 120) is joined to a base-jaw 116B (which is a member being fitted into the slide slot 9a and engaged with the closing and opening operation member 10) by a bolt or the like so as to exchange, as shown in FIG. 25. On the left portion of the base-jaw 116B of the figure, an element for storing chuck jaw ID data 116a ("the chuck jaw ID" hereinafter) is installed. At the upper portion of the base-jaw 116B in the figure, a held portion 116b is provided. At the held portion 116b, slots 116c, 116c are formed as shown in FIG. 24. With the above arrangement of the chuck jaw 116, the chuck jaws 116 having various kinds of forms can be comprised by exchanging the portion of the softjaw 116A and using the portion of the base-jaw 116B in common. The closing and opening operation member 10 is provided with a lock pin 11, which operates such that the closing and opening operation member 10 and the chuck jaw 116 can be joined to and separated from each other, being moveable in the directions of the arrows $JR_-$ and $JR_+$ as shown in FIG. 3. The top end portion of the lock pin 11 of FIG. 3 appears from a peripheral face 10b of the closing and opening operation member 10. At the peripheral face 10b of the closing and opening operation member 10, a positioning pin 10a is provided so as to project. At the upper hand of the chuck 9 of the first headstock 6 of FIG.3, a chuck jaw exchange assist 12 is provided so as to project and recede in the directions of the arrows $S_+$ and $S_-$ by a driving cylinder 12a. At the right end of the chuck jaw exchange assist 12 of the figure, a guide slot 15, which size is slightly big in comparison with the slide slot 9a, is formed in upper and lower directions of the figure. An upper end portion 15a and a lower end portion 15b of the guide slot 15, which are both tapered, are formed. At the lower portion of the chuck jaw exchange assist 12 of the figure, a positioning hole 12b corresponding to the positioning pin 10a of the closing and opening operation member 10 is formed. An operation rod 13 corresponding to the lock pin 11 is provided so as to project and recede in the directions of the arrows $R_+$ and $R_-$ by a driving cylinder 13a. On the chuck 19, the chuck jaws 116 and the closing and opening operation members 10 and the like are installed, in a similar way to the chuck 9. On the second headstock 16, the chuck jaw exchange assist 12 is provided, in a similar way to the first headstock 6.

Figure 6:
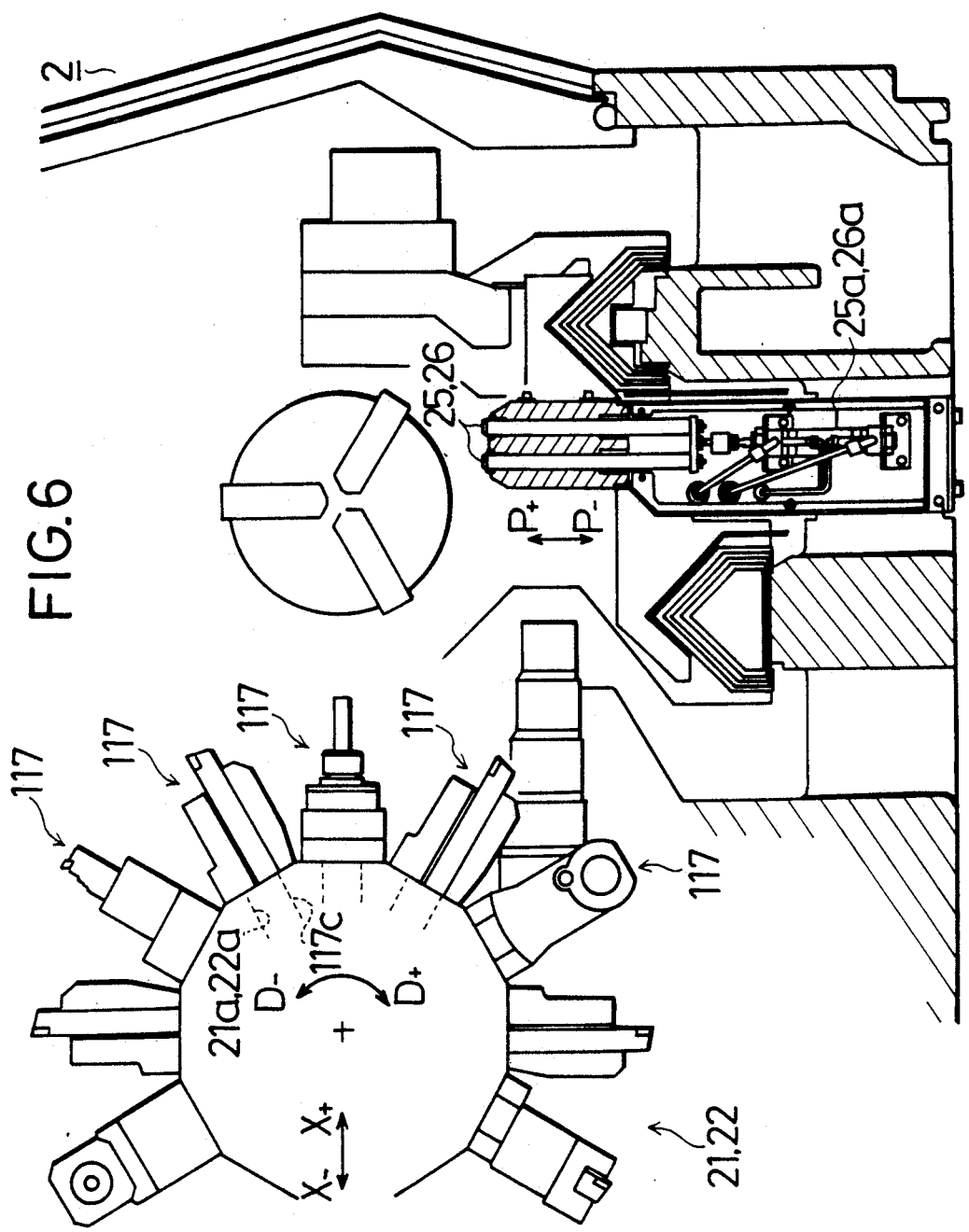
FIG. 6 is a view showing a turret tool rest and a hand positioning pin of the turning cell as shown in FIG. 1.
Figure 18:
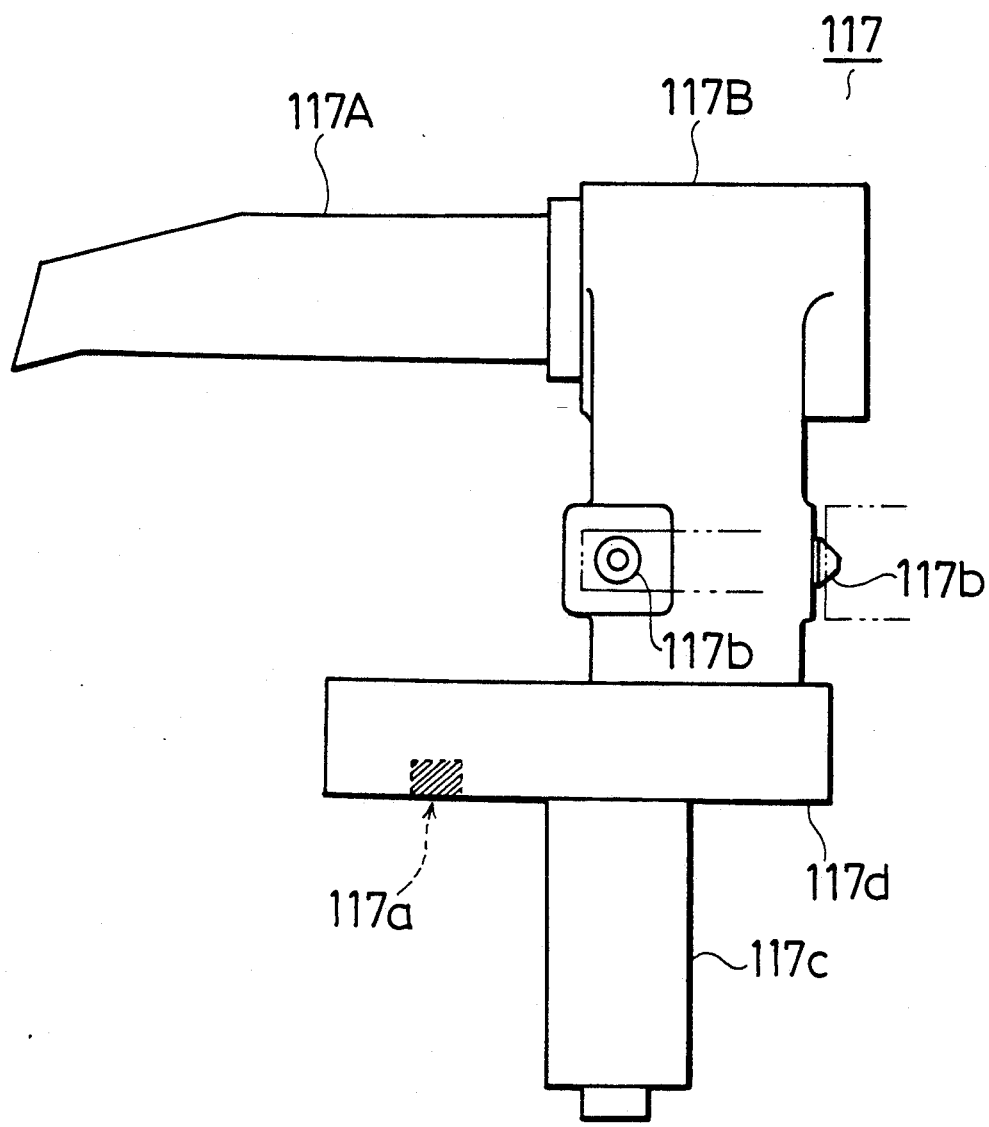
FIG. 18 is a view showing an example of tools.
Figure 19:
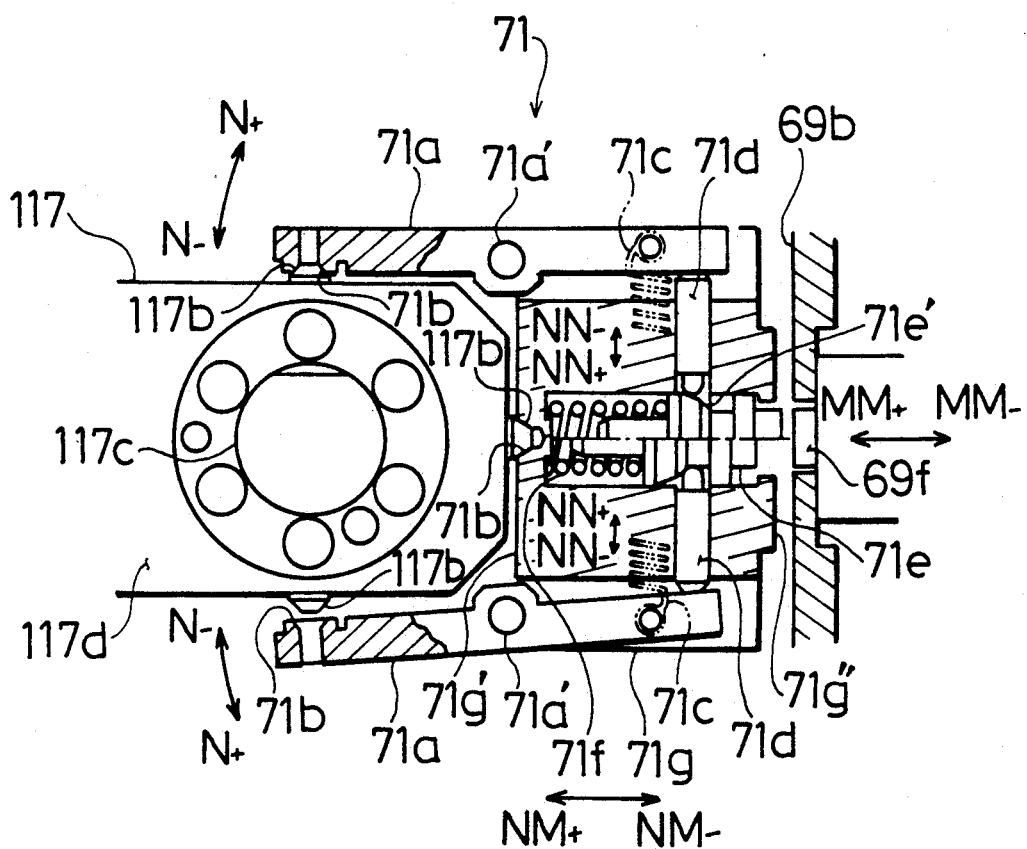
FIG. 19 is a sectional view showing a gripper of the tool hand of FIG. 15.

As shown in FIG.6, on the peripheral face of the first turret tool rest 21, a plurality of tool installing holes 21a are formed being free to turn and index in the directions of the arrows $D_+$ and $D_-$. In each of the tool installing holes 21a, a tool 117 is fitted so as to attach detach. As shown in FIG.18, the tool 117 is comprised such that a tool main body 117A is installed on a holder 117B and a shank 117c to be fitted in and engaged with the tool installing hole 21a is provided at a contacting face 117d positioned in the lower portion of the figure of the holder 117B so as to project. And, in the contacting face 117d a tool ID data storing element 117a ("the tool ID" hereinafter) is installed. On the peripheral face of the holder 117B three held projections 117b are provided so as to project, as shown in FIG. 18 or 19. On the second turret tool rest 22, the tools 117 are attachably and detachably installed so as to turn and index, the same as the first turret tool rest 21.

As shown in FIG.1 or 6, hand positioning pins 25, 26 are provided between the first headstock 6 and the second headstock 16 on the main body 3 so as to respectively associate with the first turret tool rest 21 and the second turret tool rest 22, being free to project and recede in the directions of the arrows $P_+$ and $P_-$ through driving cylinders 25a, 26a.

The setup station 30 has a bed 31 as shown in FIG. 8. At the left lower hand of the bed 31 in the figure, a material station 32 is provided. At the left upper hand of the bed 31 of the figure, a machined station 33 is provided.

Figure 7:
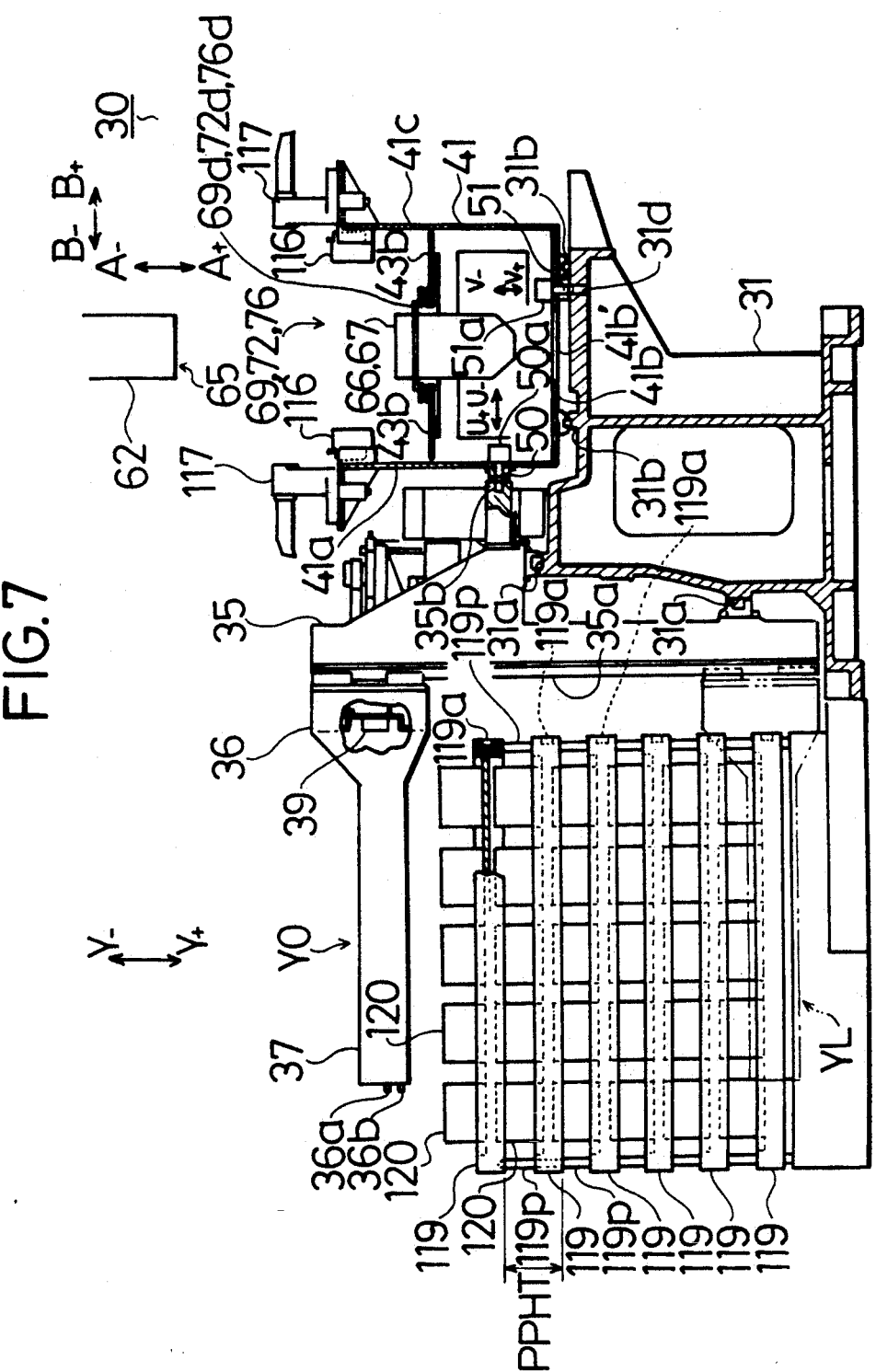
FIG. 7 is an enlarged front elevation of a setup station of FIG. 1.

On the bed 31, as shown in FIG. 7, rails 31a and 31a are provided. On the rails 31a and 31a, a driving unit 35 is provided being free to move in the directions of the arrows $X_{3+}$ and $X_{3-}$ in FIG. 8 such that the material station 32 and the machined station 33 are communicated with each other. In the driving unit 35, a driving motor 35e is provided. A timing pulley 35f is connected with the driving motor 35e so as to rotate. A timing belt 31e, extending in the upper and lower directions of FIG. 8 on the bed 31, is engaged with the timing pulley 35f.

The driving unit 35 is provided with rails 35a and 35a. On the rails 35a and 35a, a pallet fork 36 is provided being free to lift up and down through a driving motor 35c and a ball screw 35d in the directions of the arrows $Y_-$ and $Y_+$ of FIG.7. The pallet fork 36 is provided with arms 37, 37 opening the left portion of FIG.8. On the inside face of each arm 37 (side faces facing arms 37, 37 each other), hooks 37a are provided free to project and recede. As shown in FIG.9 or 10, each arm 37 has a driving motor 37c. With the driving motor 37c, a crankshaft 37d is connected free to rotate in the directions of the arrows $FM_+$ and $FM_-$. A link 37e is engaged with the crankshaft 37d through a pin 37d'. A crankshaft 37f is engaged with the link 37e through a pin 37f' free to rotate in the directions of the arrows $F_+$ and $F_-$. The hooks 37a are fixed on the crankshaft 37f. That is, the crankshaft 37d, the link 37e, the crankshaft 37f and the like compose a toggle mechanism, whereby a pallet 119 described hereinafter can be held by projecting the hooks 37a in the direction of the arrow $F_+$ even if the torque of the driving motor 37c is small. An ID data reading/writing head ("the R/W head" hereinafter) 39 is installed between the arms 37, 37 of the pallet fork 36 facing a right portion of FIG.7 or FIG.8. On the end of the arm 37, a proximity switch 36a and a limit switch 36b are installed.

Rails 31b, 31b are provided at the right hand of the driving unit 35 on the bed 31 of FIG.7. On the rails 31b, 31b, a stocker 41 is provided free to move in the direction parallel to the direction moving the driving unit 35, that is, in the directions of the arrows $X_{4+}$ and $X_{4-}$ of FIG.8. As shown in FIG.11, the stocker 41 comprises a side plate 41a, a bottom plate 41b and a side plate 41c and is formed like a box opening the upper portion of the figure.

At the lower portion of the stocker 41 of FIG.8, a hand jaw storing portion 42 formed like a plate is provided. The jaw storing portion 42 has four places 42a. At the uphand per hand of the hand jaw storing portion 42 in the figure, a hand storing portion 43 is provided inside of the stocker 41 (between the side plate 41a and the side plate 41c). The hand storing portion 43 has three places 43a, formed at intervals of a predetermined length in the upper and lower directions of FIG.8. On both sides of right and left of each place 43a of FIG.8 or FIG.11, holding plates 43b, 43b are provided projecting from the side plates 41a, 41c toward the inside of the stocker 41. At the upper portion of the side plates 41a, 41c of the stocker 41 of FIG.11, a first chuck jaw storing portion 45 and a second chuck jaw storing portion are provided corresponding to the chuck 9 of the first headstock 6 and the chuck 19 of the second headstock 16, respectively, projecting inside of the stocker 41. The first chuck jaw storing portion 45 has nine places 45a, formed at intervals of a predetermined length in the upper and lower directions of FIG.8. Each place 45a has a slot 45b, having almost the same shape as the slide slot 9a of the chuck 9. The slot 45b is formed in the upper and lower directions of the figure so as to project opening the upper portion of FIG.11 and closing the lower portion of the figure. The same as the first chuck jaw storing portion 45, the second chuck jaw storing portion 46 has nine places 46a and each of places 46a has a slot 46b. At the upper portion of the side plates 41a, 41c of the stocker 41 of FIG.11, a first tool storing portion 47 and a second tool storing portion 48, both formed like a plate, are provided projecting outside of the stocker 41, corresponding to the first turret tool rest 21, the second turret tool rest 22, respectively. The first tool storing portion 47 has ten places 47a, formed at intervals of a predetermined length in the upper and lower directions of FIG.8. The places 47a of the first tool storing portion 47 and the places 45a of the first chuck jaw storing portion 45 are staggered each other in the upper and lower directions of FIG.8. At each place 47a, a shank hole 47b is formed penetrating in the upper and lower directions of FIG.11. The same as the first tool storing portion 47, the second tool storing portion 48 has ten places 48a and a shank hole 48b is formed at each place 48a.

At the stocker 41, as shown in FIG.7, a connecting pin 50 is provided free to project and recede in the directions of the arrows $U_+$ and $U_-$ through a driving cylinder 50a so as to engage with or remove from an engagement hole 35b, formed at the driving unit 35. Besides, an origin holding pin 51 is provided free to project and recede in the directions of the arrows $V_+$ and $V_-$ through a driving cylinder 51a so as to engage with or remove from an origin holding hole 31d, formed on the bed 31.

As shown in FIG.11, the R/W head 53 is provided on the bed 31 free to project and recede in the directions of the arrows $L_+$ and $L_-$ through a driving cylinder 53b so as to be able to insert inside the stocker 41 through a hole 41b', formed at the position corresponding to each place 43a of the hand storing portion 43 of the bottom plate 41b of the stocker 41. On the bed 31, outside of the stocker 41, a supporting member 31c or 31c is fixed so as to position at the left hand of the first chuck jaw storing portion 45 in the figure and the lower hand of the first tool storing portion 47 in the figure, or at the right hand of the second chuck jaw storing portion 46 in the figure and the lower hand of the second tool storing portion 48 in the figure. (In FIG.8, only one supporting member 31c is shown in order to avoid complexity.) On the supporting members 31c, 31c, R/W heads 55, 55 are provided free to swing in the directions of the arrows $E_+$ and $E_-$ so as to face holes 41a' and 41c' formed at the places 45a, 46a of the chuck jaw storing portions 45, 46, penetrating the side plates 41a, 41c, respectively. On the supporting members 31c, 31c, R/W heads 56, 56 are fixed facing holes 47c, 48c formed at the places 47a, 48a of the tool storing portions 47, 48 so as to penetrate, respectively.

Figure 12:
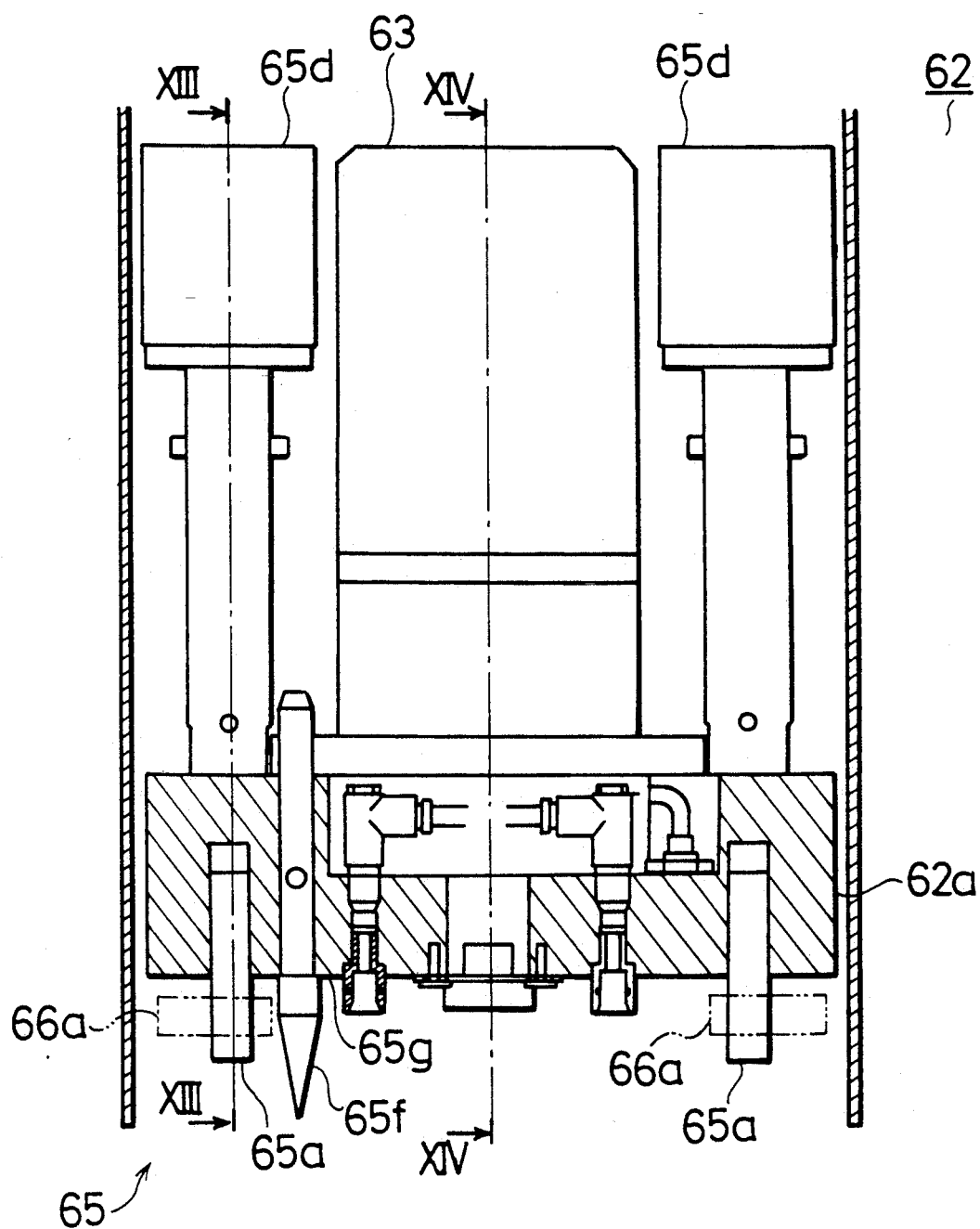
FIG. 12 is an enlarged sectional view of an arm of a gantry robot of FIG. 1.
Figure 13:
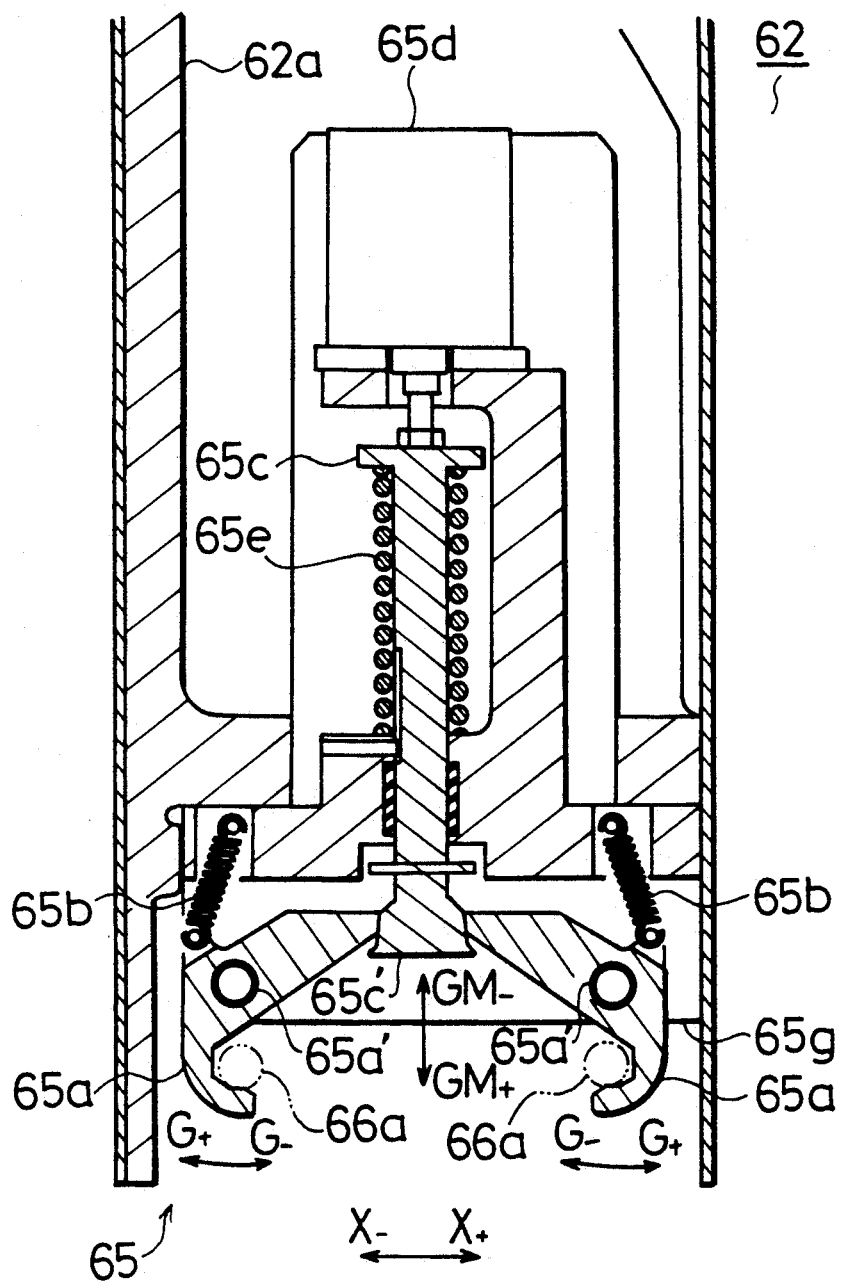
FIG. 13 is a sectional view along line XIII—XIII of the arm of the gantry robot as shown in FIG. 12.

At the upper hand of the main machine 2 and the setup station 30 of FIG.1, a rail 60 is provided. On the rail 60, a gantry robot 61 is provided free to move in the directions of the arrows $B_+$ and $B_-$. The gantry robot 61 has an arm 62 free to move in the directions of the arrows $A_-$ and $A_+$ At the lower end portion of the arm 62, as shown in FIG.12 or FIG.13, a hand connecting portion 65 is provided. The hand connecting portion 65 has two driving cylinders 65d, 65d. An operation rod 65c is connected with each of the driving cylinders 65d movable and drivable in the directions of the arrows $GM_+$ and $GM_-$. The operation rod 65c is energized by a spring 65e in the direction of the arrow $GM_-$ (the direction operating a hook 65a mentioned hereinafter in the direction of the arrow $G_-$). At the lower end portion of the operation rod 65c of the figure, a taper portion 65c' is provided. The taper portion 65c' abuts against two hooks 65a being free to slide. Each of the hooks 65a is provided projecting from a bottom face 65g of a casing 62a in the lower direction of the figure, being free to swing in the directions of the arrows $G_+$ and $G_-$ through a pin 65a'. The hook 65a is energized in the direction of the arrow $G_+$ so as to always abut against the taper portion 65c' by a spring 65b. The hand connecting portion 65 has positioning pins 65f, fixed with respect to the casing 62a, projecting from the bottom face 65g in the lower direction of FIG.12.

Figure 14:
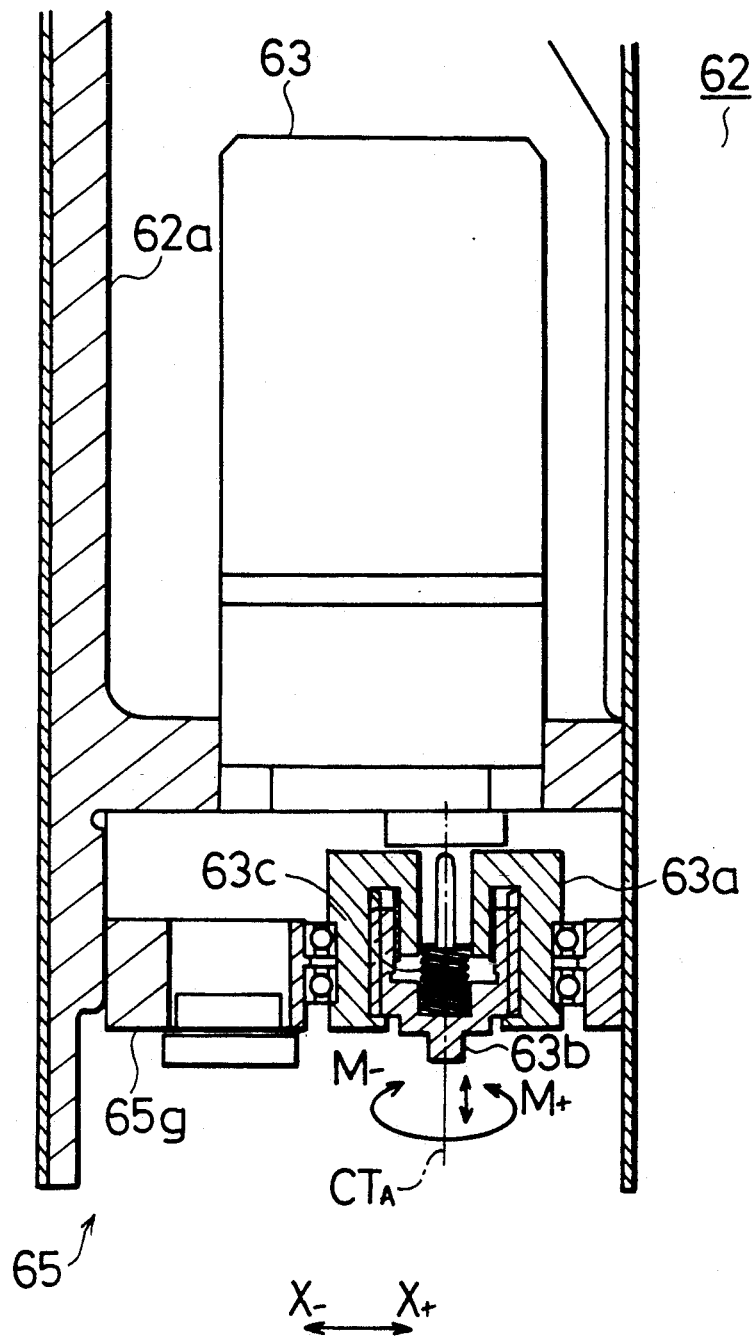
FIG. 14 is a sectional view along line XIV—XIV of the arm of the gantry robot of FIG. 12.

The arm 62 has a driving motor 63, provided so as to fix inside of the casing 62a, as shown in FIG.14. A spline sleeve 63a is connected with the driving motor 63, rotatably and drivably in the directions of the arrows $M_+$ and $M_-$ on an axis center $CT_A$. The axis center $CT_A$ is fixed with respect to the casing 62a. A spline shaft 63b is connected with the spline sleeve 63a movably in the center axis $CT_A$ direction so as to rotate together with the spline sleeve 63a in the directions of the arrows $M_+$ and $M_-$. The spline shaft 63b is pressed through a spring 63c projecting from the bottom face 65g in the lower direction of the figure.

Figure 15:
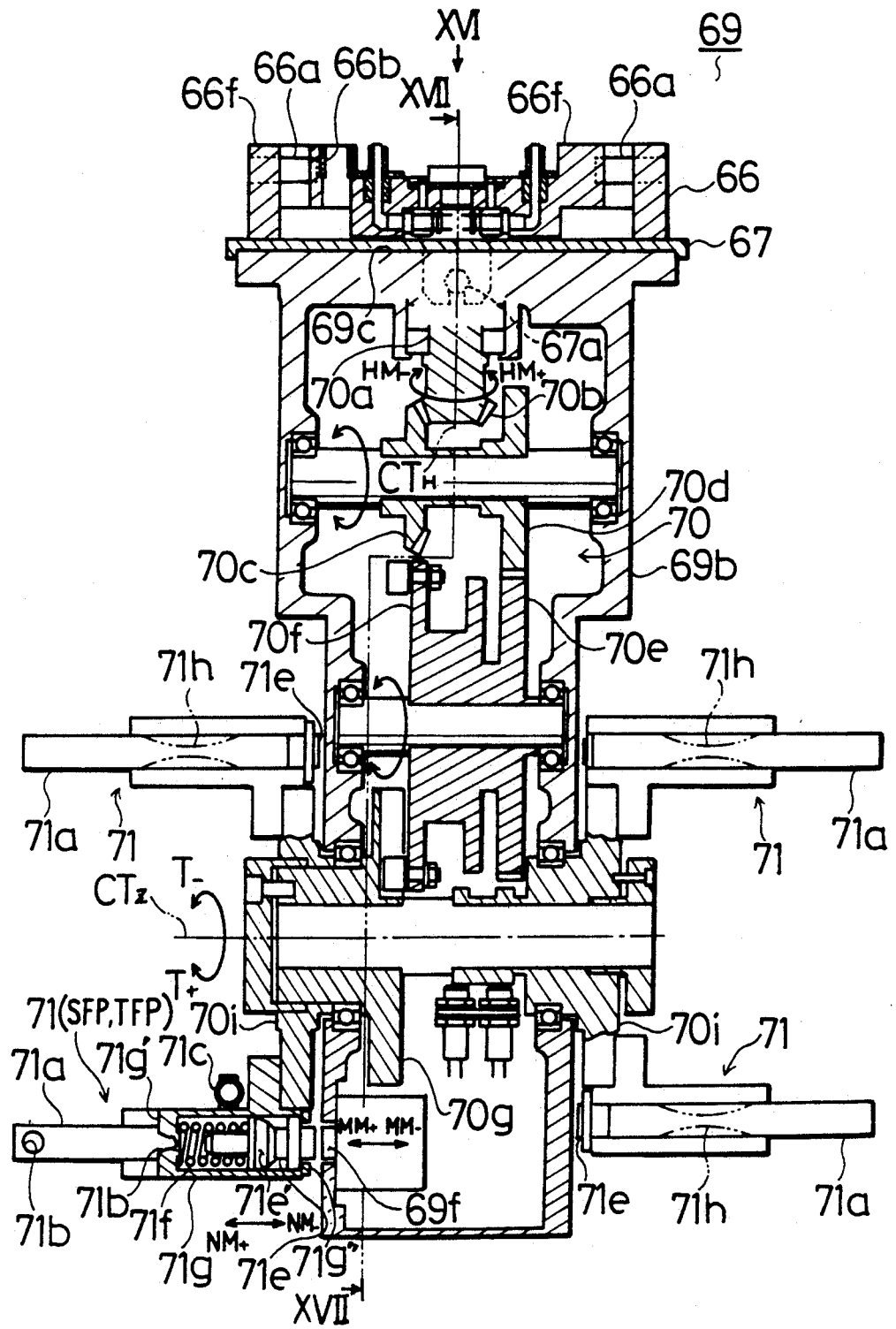
FIG. 15 is a sectional view indicating a tool hand installed on the arm of FIG. 12.
Figure 16:
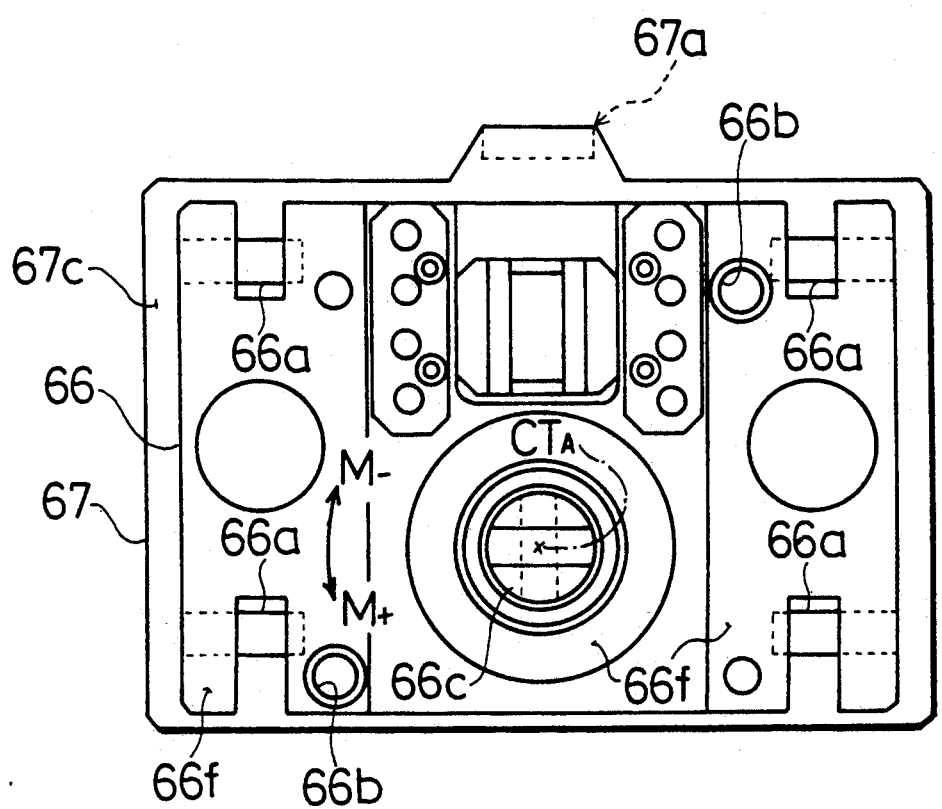
FIG. 16 is a view seen by the arrow XVII—XVII of the tool hand in FIG. 15, a chuck jaw hand or a workpiece hand of FIG. 20.
Figure 17:
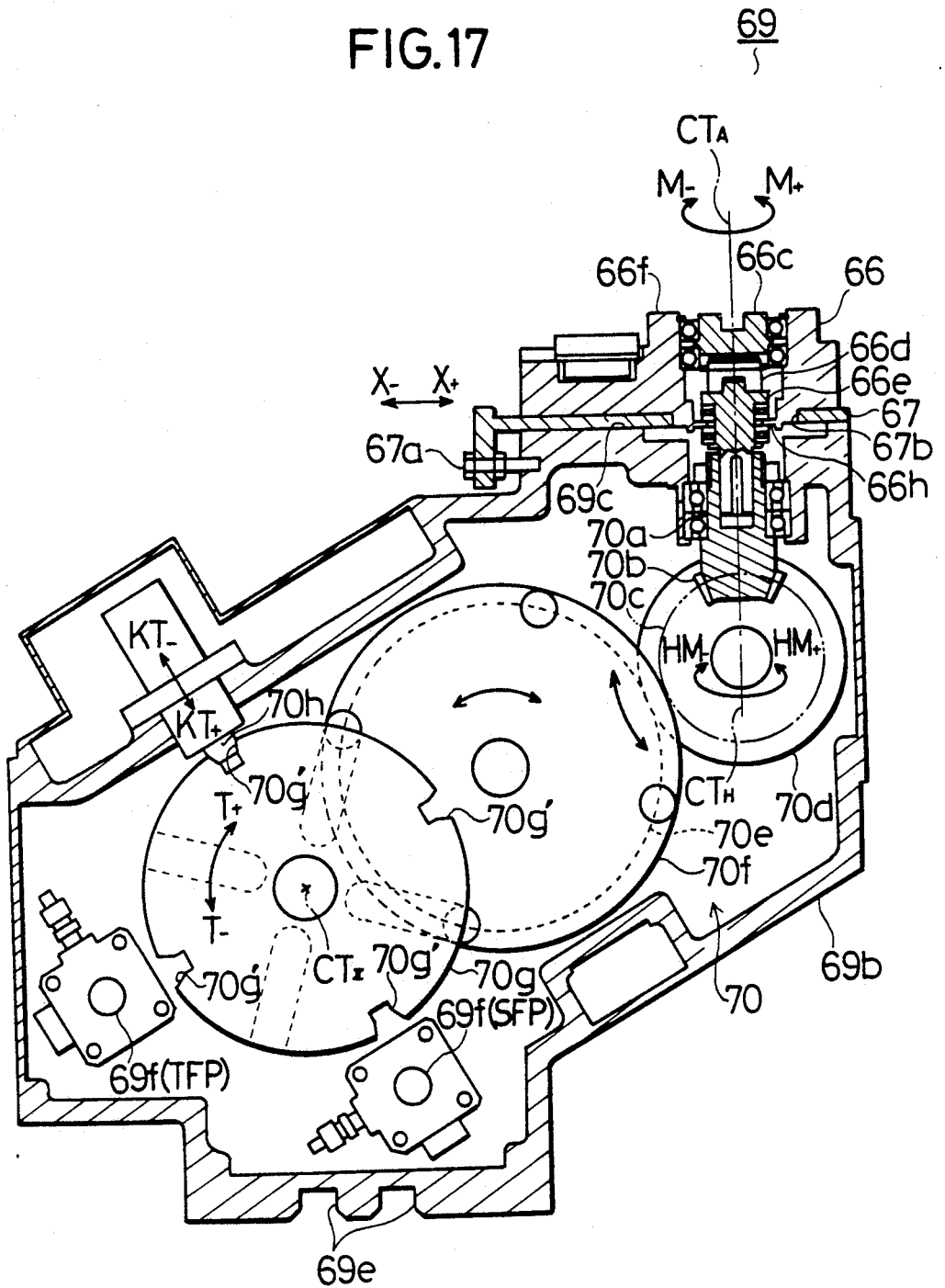
FIG. 17 is a sectional view along line XVII—XVII of the tool of FIG. 15.

A tool hand 69 to be installed on the arm 62, has a casing 69b as shown in FIG.17. An adjusting member like a plate, is fixed with a bolt and the like on the upper face 69c of the casing 69b so as to be able to adjust by moving a predetermined distance with respect to the casing 69b in the right and left directions of FIG.17 (identical with the directions of the arrows $X_-$ and $X_+$ in which the arm 62 can't move when the tool hand 69 is installed on the arm 62) through an adjusting screw 67a engaged with the adjusting member 67 and the casing 69b. Besides, at the upper portion of the adjusting member 67 of the figure, an adjusting member 66 is fixed with a bolt and the like so as to be able to adjust by rotating a predetermined quantity with the axis center $CT_A$ as its center with respect to the adjusting member 67 such that a bottom portion 66h is fitted in a hole 67b, formed at the adjusting member 67 so as to penetrate. (The adjusting member 66 is fixed on the adjusting member 67 when the adjusting member 66 is moved in the right and left directions of the figure.) At the upper face 66f of the adjusting member 66, four engagement pins 66a corresponding to the hooks 65a of the arm 62 are provided, as shown in FIG.15 or FIG.16, and positioning holes 66b corresponding to the positioning pins 65f of the arm 62 are formed. With the above arrangement, the positions of the adjusting members 66, 67 are properly adjusted with respect to the casing 69b, and the positions of the engagement pins 66a and the positioning holes 66b are adjusted a predetermined quantity with respect to the casing 69b, whereby the position of an axis center $CT_Z$ of a rolling member 70i, mentioned hereinafter, can be adjusted with respect to the arm 62 when the tool hand 69 is installed on the arm 62. Therefore, the position of grippers 71, mentioned hereinafter, which are fixed on the rolling member 70i with respect to the turret tool rests 21, 22 can be adjusted only by the adjustment of the tool hand 69 side without adjusting the positions of the rail 60 and the like of the gantry robot 61 with respect to the turret tool rests 21, 22.

Inside of the adjusting member 66, as shown in FIG.17, a coupling 66c to be connected with the spline shaft 63b of the arm 62 is provided, rotatably in the directions of the arrows $M_+$ and $M_-$ on the axis center $CT_A$, fixed with respect to the adjusting member 66. The coupling 66c appears from the upper face 66f. A coupling 66e is connected with the coupling 66c through a coupling 66d. The coupling 66e is provided rotatably in the directions of the arrows $HM_+$ and $HM_-$ on an axis center $CT_H$ so as to be able to move a predetermined distance for the adjusting member 66 in the right and left directions of FIG.17. The couplings 66c, 66d, and 66e compose an Oldham's coupling. The coupling 66e projects from the bottom portion 66h of the adjusting member 66 on the casing 69b side and is connected with a connecting shaft 70a composing a rolling mechanism 70 of the grippers 71, mentioned hereinafter. The axis center $CT_H$ of the connecting shaft 70a is fixed with respect to the casing 69b. When the adjusting members 67, 66 is adjusted by moving a predetermined distance with respect to the casing 69b, therefore, a phase shift arises between the axis center $CT_A$ of the spline shaft 63b, fixed on the casing 62a of the arm 62 and the axis center $CT_H$ of the connecting shaft 70a, fixed on the casing 69b of the tool hand 69, in case where the tool hand 69 is installed on the arm 62. However, the rolling mechanism 70, as mentioned hereinafter, can be driven by rotating the connecting shaft 70a in the directions of the arrows $HM_+$ and $HM_-$ by the driving motor 63 of the arm 62 side, as the spline shaft 63b and the connecting shaft 70a are connected with each other through the couplings 66c, 66d and 66e composing an Oldham's coupling. That is, the tool hand 69 is installed on the arm 62 in such a state that the axis center $CT_A$ of the spline shaft 63b of the arm 62 side and the axis center $CT_H$ of the connecting shaft 70a of the tool hand 69 side are intentionally shifted by the adjusting members 66, 67, the couplings 66c, 66d, 66e and the like, whereby the grippers 71 holding the tool 117 can be precisely positioned on the turret tool rests 21, 22, as mentioned hereinafter.

Inside of the casing 69b, the rolling mechanism 70, being comprised of a connecting shaft 70a, bevel gears 70b, 70c, spur gears 70d, 70e, Geneva gears 70f, 70g and the like, is provided. When the connecting shaft 70a is rotated in the directions of the arrows $HM_+$ and $HM_-$, the Geneva gear 70g rotates in the directions of the arrows $T_+$ and $T_-$ on an axis center $CT_Z$. On the peripheral portion of the Geneva gear 70g, engagement slots 70g' are formed at intervals of 90 degrees with respect to the axis center $CT_Z$. A rotation stop pin 70h is provided at the casing 69b, free to project and recede in the directions of the arrows $KT_+$ and $KT_-$ so as to be able to fit in and depart from the engagement slot 70g'. On both sides of right and left of the casing 69b of FIG.15, the rolling members 70i, 70i are provided corresponding to the first turret tool rest 21 and the second turret tool rest 22, respectively. Each of the rolling members 70i is connected with the Geneva gear 70g, rotatably in the directions of the arrows $T_+$ and $T_-$ on the axis center $CT_Z$ Each rolling member 70i has two grippers 71, 71, symmetrically provided with respect to the axis center $CT_Z$ (at intervals of 180 degrees). Each gripper 71 has a fixed member 71g fixed on the rolling member 70i, as shown in FIG.19. On the fixed member 71g, an operation rod 71e is provided movably in the directions of the arrows $NM_+$ and $NM_-$. The operation rod 71e is pressed by a spring 71f in the direction of the arrow $NM_-$ (in the direction of the arrow $N_-$ for closing arms 71a, 71a, as mentioned hereinafter) by a spring 71f and projects from a back face 71g'' of the fixed member 71g on the casing 69b side. The operation rod 71e is provided with a taper portion 71e'. The taper portion 71e' abuts against two engagement rods 71d, 71d, movably provided in the directions of the arrows $NN_+$ and $NN_-$. The engagement rods $71d$, $71d$ abut against the arms $71a$, $71a$. The arms $71a$, $71a$ are openable and closable in the directions of the arrows $N_+$ and $N_-$ through pins $71a'$, $71a$, and are energized in the direction of the arrow $N_+$ such that the engagement rods $71d$, $71d$ are always engaged with the taper portion $71e'$ of the operation rod $71e$ through springs $71c$ installed between the arms $71a$, $71a$. Inside of the end portion of the arms $71a$, $71a$ (the side on which the arms $71a$, $71a$ face each other) and on a front face $71g'$ of the fixed member $71g$, three engagement holes $71b$, corresponding to the held projections $117b$ of the tool $117$, are formed. As shown in FIG.17, the casing $69b$ is provided with an operation pin $69f$, being free to project and recede from the casing $69b$ in the directions of the arrows $MM_+$ and $MM_-$ so as to push the operation rod $71e$ in the direction of the arrow $NM_+$, as shown in FIG.15 or FIG.19. The casing $69b$ is provided with a total of four operation pins $69f$ such that operation pins $69f$ are respectively provided on turret facing positions TFP and stocker facing positions SFP of the grippers $71$ of both sides of the right and left of FIG.15, disposed at intervals of 90 degrees with respect to the an axis center $CT_Z$, as shown in FIG.17.

At the lower portion of the casing $69b$ of FIG.17, positioning holes $69e$ associated with the hand positioning pins $25$, $26$ are formed. At the lower portion of the casing $69b$ of FIG.11, a hand ID data storing element ("the hand ID" hereinafter) $69a$ is installed. In the upper portion of the casing $69b$ of the figure, a projection $69d$ is provided.

Figure 21:
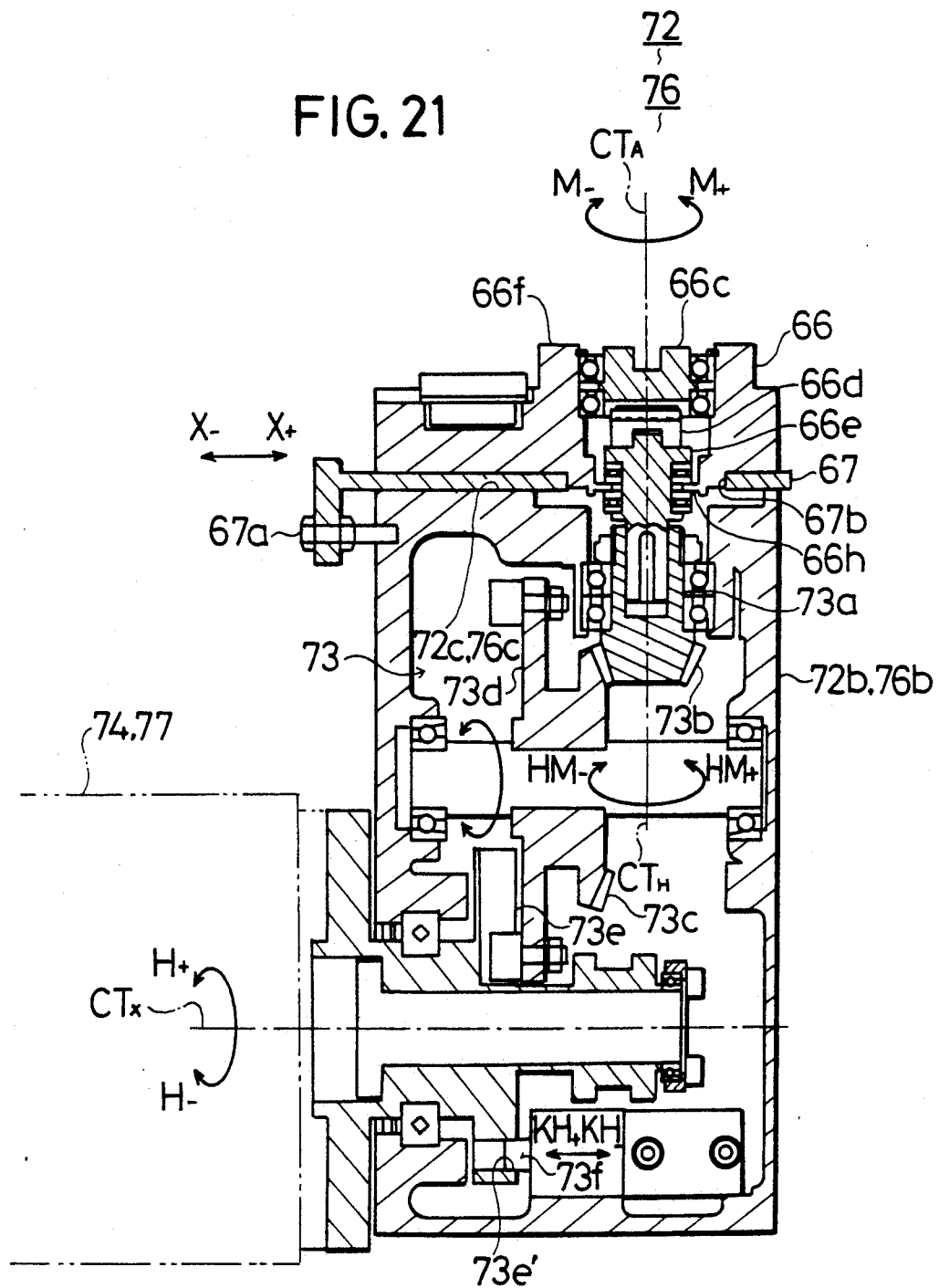
FIG. 21 is a sectional view along line XXI—XXI of the chuck jaw hand or the workpiece hand of FIG. 20.

A chuck jaw hand $72$ to be installed on the arm $62$, as shown in FIG.21, has a casing $72b$. On an upper face $72c$ of the casing $72b$, the adjusting member $67$ is fixed with a bolt and the like such that the adjusting member $67$ can be adjusted by moving a predetermined quantity in the right and left directions of FIG.21 (in the directions of the arrows $X_-$ and $X_+$) with respect to the casing $72b$, the same as the tool hand $69$. At the upper portion of the adjusting member $67$ in the figure, the adjusting member $66$ is fixed with a bolt and the like such that the adjusting member $66$ can be adjusted by rotating a predetermined quantity with respect to the adjusting portion $67$. The coupling $66e$, composing Oldham's coupling together with the couplings $66c$, $66d$, projects from the adjusting member $67$ on the casing $72b$ side. The coupling $66e$ is connected with a connecting shaft $73a$, composing a rolling mechanism $73$ of a rolling portion $74$ as mentioned hereinafter, an axis center $CT_H$ of the connecting shaft $73a$ being fixed with respect to the casing $72b$. The adjusting members $67$, $66$ are adjusted with respect to the casing $72b$, whereby the position of grippers $75$, as mentioned hereinafter, holding the chuck jaw $116$ can be easily adjusted with respect to the chucks $9$, $19$ when the chuck jaw hand $72$ is installed on the arm $62$ and besides, the rolling mechanism $73$ of the chuck jaw hand $72$, as mentioned hereinafter, can be driven as well as the rolling mechanism $70$ of the tool hand $69$, as mentioned hereinbefore, by the driving motor $63$ of the arm $62$ side. This is the same as a case of a workpiece hand $76$, as mentioned hereinafter. With the above arrangement, the degree of freedom of the design of various kinds of hands of the gantry robot $61$, capable of exchange, becomes broader and the hand can be made smaller.

Figure 20:
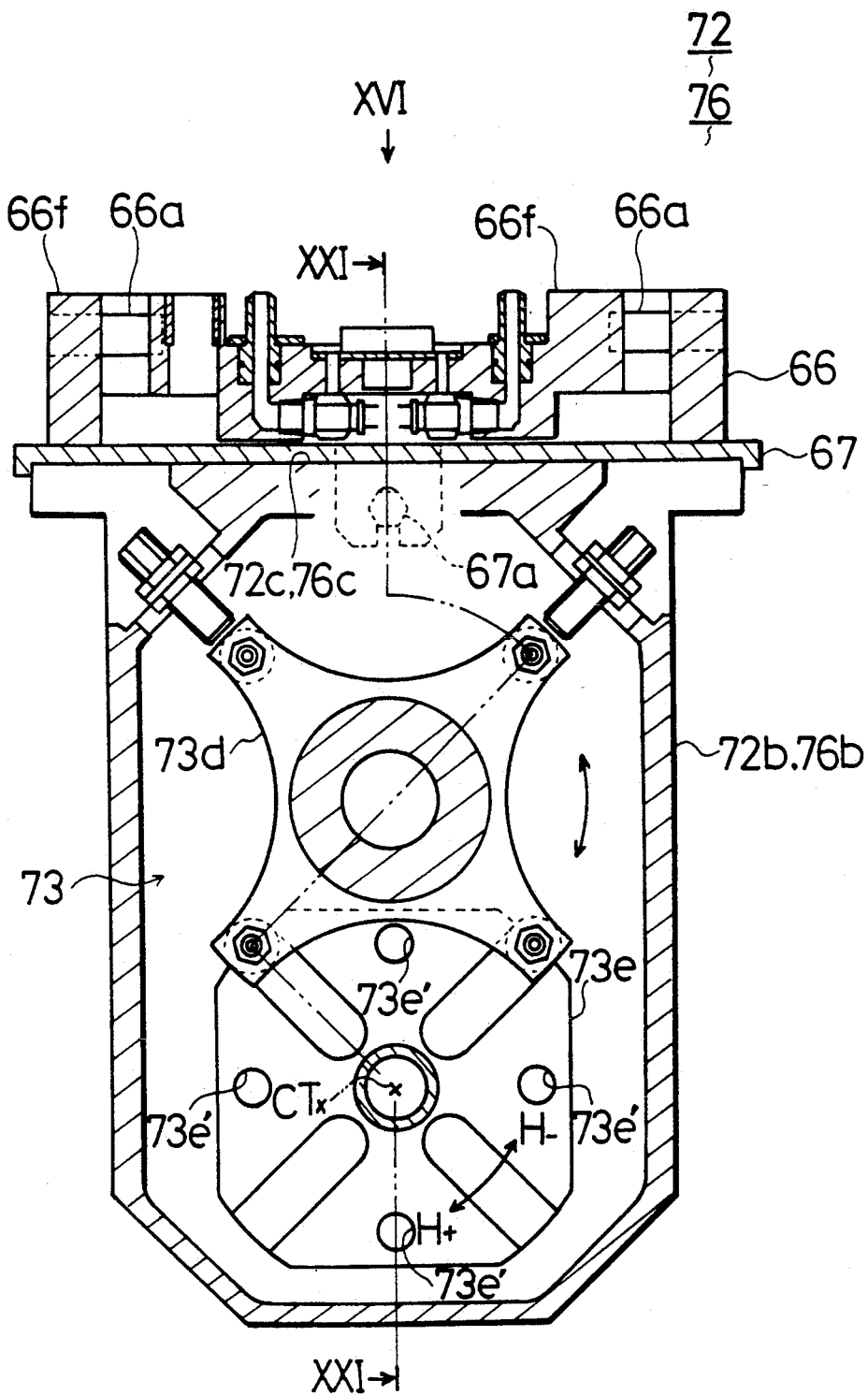
FIG. 20 is a sectional view showing the chuck jaw hand or the workpiece hand installed on the arm of FIG. 12.

Inside of the casing $72b$, the rolling mechanism $73$, being comprised of the connecting shaft $73a$, bevel gears $73b$, $73c$, Geneva gears $73d$, $73e$ and the like, is provided. When the connecting shaft $73a$ is rotated in the directions of the arrows $HM_+$ and $HM_-$, the Geneva gear $73e$ rotates in the directions of the arrows $H_+$ and $H_-$ on an axis center $CT_X$. The Geneva gear $73e$ has engagement holes $73e'$, formed at intervals of 90 degrees on the axis center $CT_X$, as shown in FIG.20. As shown in FIG.21, the casing $72b$ is provided with a rotation stop pin $73f$ being free to project and recede in the directions of the arrows $KH_+$ and $KH_-$ so as to fit in and remove from the engagement slot $73e'$. At the left portion of the casing $72b$ of FIG.21, the rolling portion $74$, connected with the Geneva gear $73e$, is provided being rotatable in the directions of the arrows $H_+$ and $H_-$ on the axis center $CT_X$.

Figure 22:
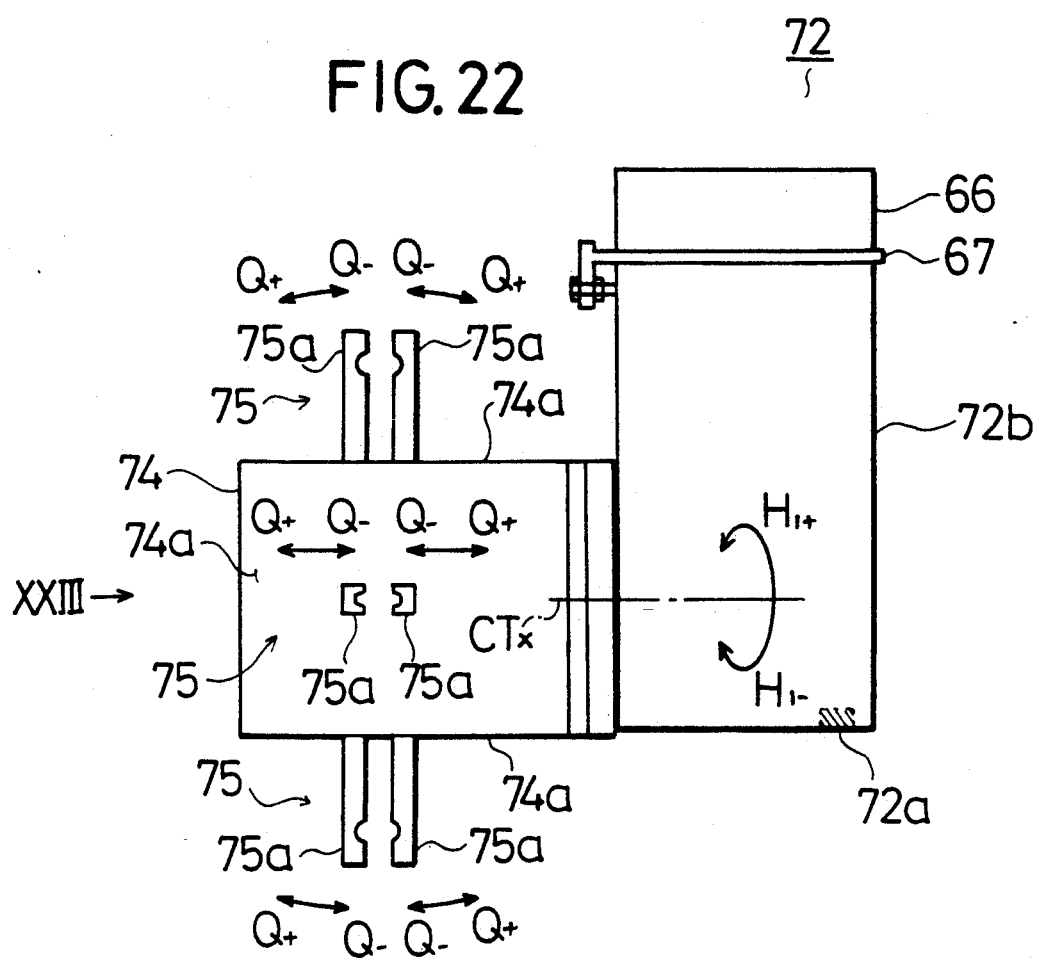
FIG. 22 is a view showing the chuck jaw hand installed on the arm of FIG. 13.
Figure 23:
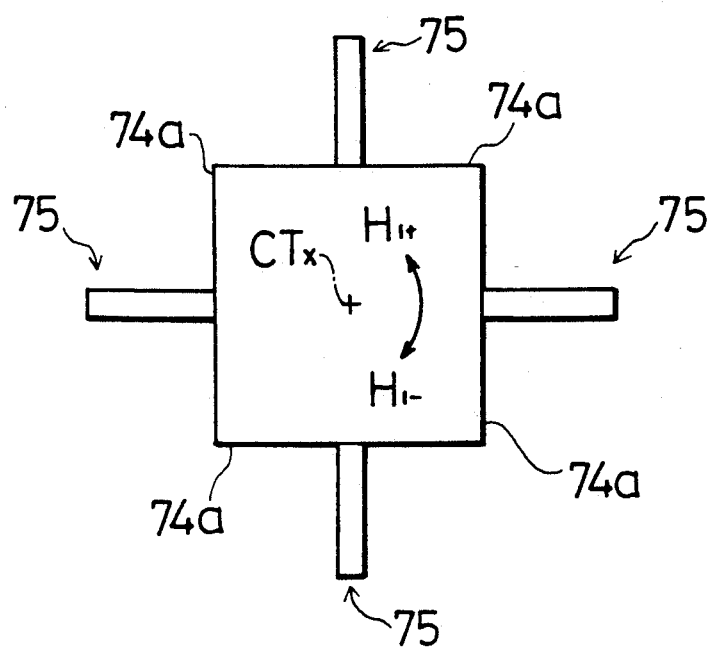
FIG. 23 is a view seen by the arrow XXIII of the chuck jaw hand of FIG. 22.
Figure 26:
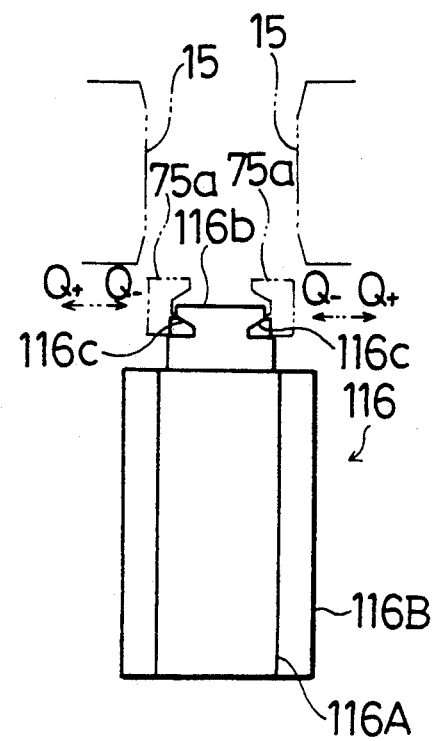

As shown in FIG.22 or FIG.23, at a side face $74a$ of the rolling portion $74$, the four grippers $75$, $75$, $75$, $75$ are provided at intervals of 90 degrees on the axis center $CT_X$ On each gripper $75$, as shown in FIG.26, arms $75a$, $75a$, each being formed in the shape corresponding to the slot $116c$ of the held portion $116b$ of the chuck jaw $116$, are provided openable and closable in the directions of the arrows $Q_+$ and $Q_-$ of FIG.22. As the opening and closing mechanism of the arms $75a$, $75a$ is almost the same as one of the arms $71a$, $71a$ of the gripper $71$ of the tool hand $69$, the detailed explanation will be omitted.

At the lower portion of the casing $72b$ of FIG.22, a hand ID $72a$ is installed. At the upper portion of the casing $72b$ of FIG.7, a projection $72d$ is provided.

The workpiece hand $76$ to be installed on the arm $62$, has a casing $76b$ as shown in FIG.20 or 21. On an upper face $76c$ of the casing $76b$, the adjusting members $67$, $66$ are installed, the same as the tool hand $69$ and the chuck jaw hand $72$. Inside of the casing $76b$, the rolling mechanism $73$, similar to one of the chuck jaw hand $72$, is provided. At the left portion of the casing $76b$ of FIG.21, a rolling portion $77$, connecting with the Geneva gear $73e$, is provided rotatable in the directions of the arrows $H_+$ and $H_-$ on the axis center $CT_X$.

Figure 27:
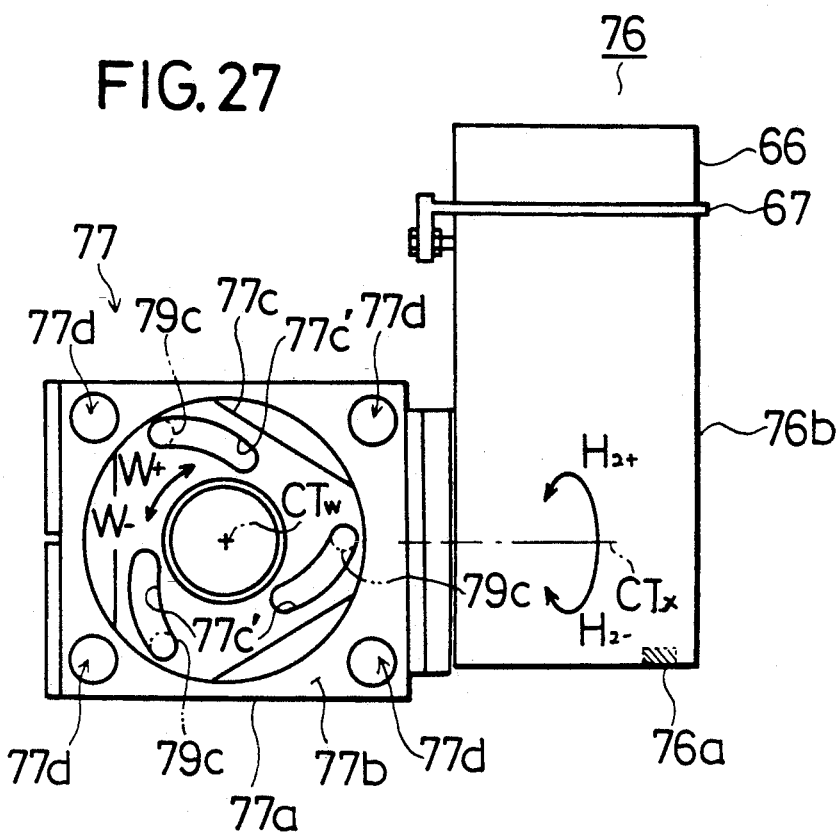
FIG. 27 is a view showing the workpiece hand to be installed on the arm as shown in FIG. 13 in such a state that a hand jaw is removed.
Figure 28:
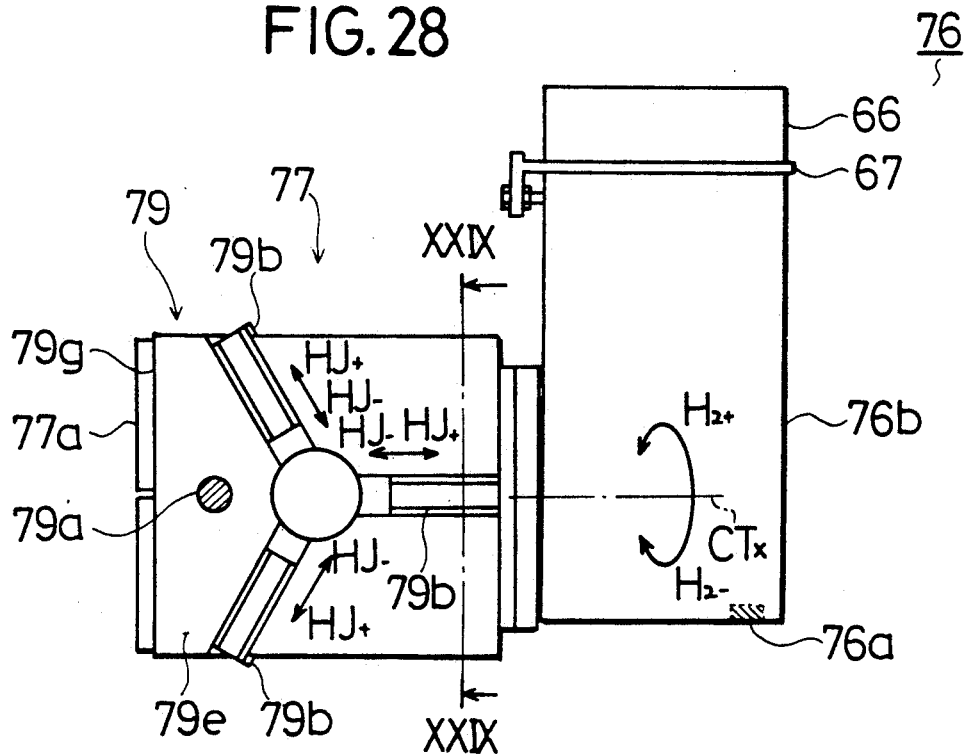
FIG. 28 is a view showing the workpiece hand as shown in FIG. 27 in such a state that the hand jaw is installed.
Figure 29:
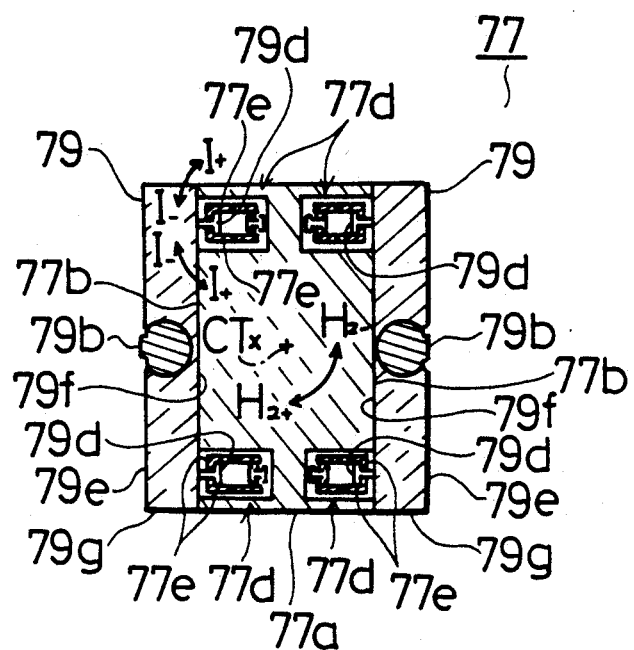
FIG. 29 is a sectional view along line XXIX—XXIX of the workpiece hand of FIG. 28.

The rolling portion $77$ has two hand jaw installation faces $77b$, $77b$, symmetrically provided with respect to the axis center $CT_X$ (at intervals of 180 degrees), as shown in FIG.27, 28 or 29. On each hand jaw installation face $77b$, as shown in FIG.27, a jaw closing and opening operation plate $77c$ is provided rotatable in the directions of the arrows $W_+$ and $W_-$ on an axis center $CT_W$. On the jaw closing and opening operation plate $77c$, three operation slots $77c'$ are formed. At the portion of the casing $77a$ of the hand jaw installation face $77b$, grippers $77d$ are provided at four places. Each gripper $77d$ has hooks $77e$, $77e$, openable and closable in the directions of the arrows $I_+$ and $I_-$, as shown in FIG.29.

At the lower portion of the casing $76b$ of FIG.27 or 28, a hand ID $76a$ is installed. At the upper portion of the casing $76b$ of FIG.7, a projection $76d$ is provided.

Figure 30:
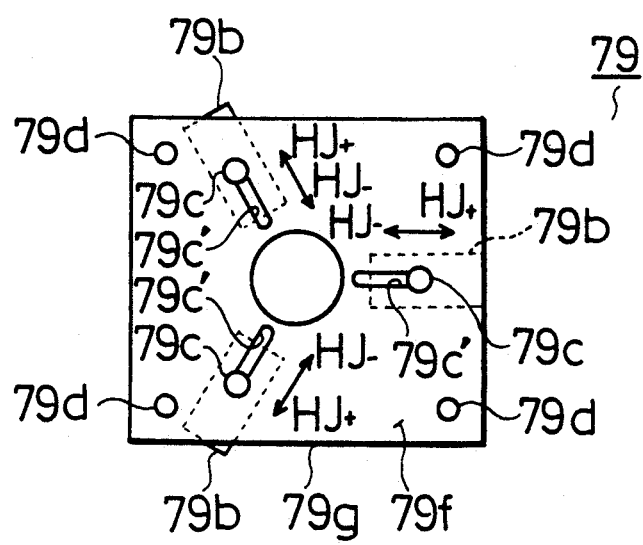
FIG. 30 is a back elevation of the hand jaw of FIG. 29.

A hand jaw unit ("the hand jaw" hereinafter) $79$ to be installed on the workpiece hand $76$, has a block $79g$, as shown in FIG.29. On a workpiece facing face $79e$ of the block $79g$, as shown in FIG.28, three jaws $79b$ are installed being free to open and close in the directions of the arrows $HJ_+$ and $HJ_-$. On each of the jaws $79b$, as shown in FIG.30, an engagement pin $79c$, corresponding to the operation slot $77c'$ of the jaw closing and opening operation plate $77c$ of the workpiece hand $76$, is fixed projecting from a hand contacting face $79f$ of the block $79g$ through a through hole $79c'$. On the hand contacting face 79f, as shown in FIG.29 or FIG.30, four held pins 79d, corresponding to the grippers 77d of the workpiece hand 76, are provided so as to project. On the workpiece facing face 79e, as shown in FIG.28, a hand jaw ID data storing element ("the hand jaw ID") 79a is installed.

Figure 31:
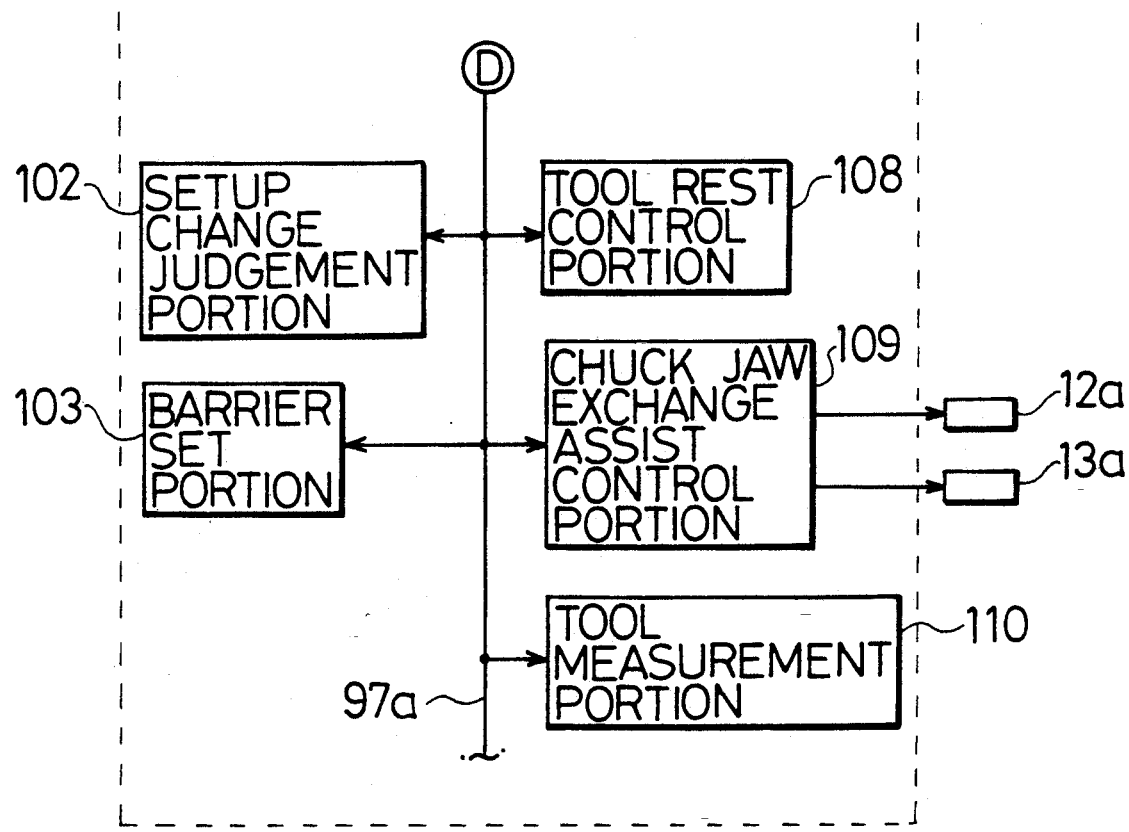
FIG. 31 is a block diagram of the turning cell as shown in FIG. 1.

The turning cell 1 has a cell control portion 82, as shown in FIG.31(a). With the cell control portion 82, a system program memory 83, a system data memory 84, a system operation data memory 85, a machining schedule memory 86, a system operation data check portion 87, a display control portion 88, an input control portion 89, an ID data input/output control portion 90, a workpiece measuring portion 91, a pallet fork control portion 92, a stocker control portion 93, a gantry robot control portion 94, a hand positioning pin control portion 95 and the like are connected through a bus line 82a, as shown in FIG.31(a) or (b). With the display control portion 88, a display 88a, such as a CRT display, is connected. With the input control portion 89, an input unit 89a, such as a keyboard, is connected. With the ID data input/output control portion 90, R/W heads 39, 52, 53, 55, 56 are connected through controllers (including buffer memories) 39a, 52a, 53a, 55a, 56a. With the pallet fork control portion 92, the driving motors 35c, 35e, 37c of the pallet fork 36 and the like are connected. With the stocker control portion 93, the driving cylinder 50a of the connecting pin 50 of the stocker 41 and the driving cylinder 51a of the origin holding pin 51 are connected. With the gantry robot control portion 94, driving motors (not shown) for moving the gantry robot 61 in the directions of the arrows A$_+$ and A$_-$ and in the directions of the arrows B$_-$ and B$_-$, the driving motor 63 of the arm 62, the driving cylinder 65d and the like are connected. Besides, the gantry robot control portion 94 can be connected with various kinds of driving means of the tool hand 69, the chuck jaw hand 72 and the workpiece hand 76. With the hand positioning pin control portion 95, the driving cylinders 25a, 26a of the hand positioning pins 25, 26 are connected.

A main machine control portion 97 is connected with the cell control portion 82 through a transmission line 112. A system program memory 98, a system data memory 99, a machining program memory 100, a soft-jaw forming program memory 101, a setup change judgement portion 102, a barrier set portion 103, a display control portion 104, an input control portion 105, a spindle control portion 106, a headstock control portion 107, a tool rest control portion 108, a chuck jaw exchange assist control portion 109, a tool measurement portion 110 and the like are connected with the main machine control portion 97 through a bus line 97a, as shown in FIG.31(b) or (c). The driving means of the closing and opening operation members 10 of the chucks 9, 19 of the workpiece spindles 7, 17 are connected with the spindle control portion 106. The driving means of the headstocks 6, 16 are connected with the headstock control portion 107. The driving means of the turret tool rests 21, 22 are connected with the tool rest control portion 108. The driving cylinders 12a, 13a of the chuck jaw exchange assist 12 are connected with the chuck jaw exchange assist control portion 109.

A FMS control unit 115 is connected with the cell control portion 82 and the main machine control portion 97 through transmission lines 113, 114, as shown in FIG.31(a) or (b).

When a plurality of kinds of workpieces 120 are machined successively and automatically with the turning cell 1 having the above-mentioned arrangement, machining is performed by properly changing setup of the chuck jaws 116 of the chucks 9, 19 of the headstocks 6, 16 of the main machine 2 and the tools 117 of the turret tool rests 21, 22 according to a kind of a workpiece 120 to be machined, as shown hereinafter.

Prior to machining, an operator in charge of system composes a system operation data cumulative table ASOD, as shown in FIG.59, through the display 88a and the input unit 89a. The system operation data cumulative table ASOD is composed by adding system operation data SOD for scheduled machining to data of past machinings. That is, the operator inputs and sets workpiece numbers WNO of the workpieces 120 to be machined as the system operation data SOD for the scheduled machining through the input unit 89a. Thereafter, the operator inputs a carrier program number TPNO of a carrier program, tool numbers TNO of the tools 117, a chuck jaw number TJNO of the chuck jaw 116, a hand number HNO (In the stocker 41 as shown in FIG.8, only one workpiece hand 76 is stored. However, a plurality of workpiece hands 76 may be stored in the stocker 41. In such a case, the kinds of the workpiece hands 76, that is, the hand numbers HNO may be different from each other according to the kind of the hand jaw 79 to be used.) of the workpiece hand 76 of the gantry robot 61 and a hand jaw number HJNO of the hand jaw 79 to be used (considered to be used) at the time of machining of the workpiece 120 having the workpiece number WNO, classifying with the workpiece number WNO. Then, the cell control portion 82 stores the inputted system operation data SOD in the system operation data memory 85.

When the system operation data SOD concerning each workpiece 120 have been inputted and the system operation data cumulative table ASOD has been composed as shown hereinbefore, the operator in charge of setup stores the chuck jaws 116, the tools 117, the hands 69, 72, 76, the hand jaws 79 and the like, necessary for machining in the stocker 41 of the setup station 30 on the basis of the system operation data SOD for the scheduled machining of the system operation data cumulative table ASOD. That is, each chuck jaw 116 is stored in the stocker 41 in such a manner that the chuck jaws 116 to be installed on the chuck 9 of the first headstock 6 side of a plurality of the chuck jaws 116, necessary for machining, are stored in the first chuck jaw storing portion 45 and the chuck jaws 116 to be installed on the chuck 19 of the second headstock 16 side are stored in the second chuck jaw storing portion 46. When the chuck jaw 116 is stored in the first chuck jaw storing portion 45, the chuck jaw 116 is inserted into the slot 45b of a predetermined place 45a from the upper hand in the figure so as to put, facing the held portion 116 as shown in FIG.25 toward the upper hand of FIG.11 and facing the chuck jaw ID 116a toward the side plate 41a side. Then, the chuck jaw ID 116a of the chuck jaw 116 put in the slot 45b appears outside of the stocker 41 (the left hand of the side plate 41a of the figure) through the hole 41a' formed at the side plate 41a so as to penetrate. Chuck jaw ID data TJIDD, as shown in FIG.63, have already been written and updated in the chuck jaw IDs 116a of the chuck jaws 116 which was set in the stocker 41 and was used once. On the other hand, in the chuck jaw IDs 116a of the chuck jaws 116 which has not yet been used, prior to setting on the stocker 41, no chuck jaw ID data TJIDD has been written. Therefore, the operator writes the chuck jaw ID data TJIDD concerning the chuck jaw 116, such as the chuck jaw number TJNO, in the chuck jaw ID 116a of the chuck jaw 116 with a portable R/W head and the like in advance. Reading and writing of ID data to the IDs with the R/W head, such as writing of the chuck jaw ID data TJIDD in the chuck jaw IDs 116a are performed facing the R/W head toward the ID by electromagnetic induction with non-contact. When the chuck jaw 116 is stored in the second chuck jaw storing portion 46, the chuck 116 is inserted in the slot 46b of a predetermined place 46a so as to put such that the held portion 116b faces the upper hand of FIG.11 and the chuck jaw ID 116a appears outside of the stocker 41 through the hole 41c' of the side plate 41c, in a similar way to the case of the first chuck jaw storing portion 45. Each tool 117 is stored in the stocker 41, storing the tools 117 to be installed on the first turret tool rest 21 of a plurality of tools 117, necessary for machining, in the first tool storing portion 47 and storing the tools 117 to be installed on the second turret tool rest 22 in the second tool storing portion 48. When the tool 117 is stored in the first tool storing portion 47, the shank 117c is inserted in the shank hole 47b of a predetermined place 47a from the upper hand in the figure so as to put the tool 117 on the first tool storing portion 47 in such a manner that the tool main body 117A of the tool 117, as shown in FIG.18, is faced toward the left hand of FIG.11 and the tool ID 117a is faced toward the lower hand of the figure. Then, the tool ID 117a of the tool 117 put on the first tool storing portion 47 appears on the lower hand of the first tool storing portion 47 in the figure through the hole 47c formed at the first tool storing portion 47 so as to penetrate. On this occasion, tool ID data TIDD, as shown in FIG.62, have already been written and updated in the tool ID 117a of each tool 117 which was set in the stocker 41 and was used once. On the other hand, in the tool ID 117a of the tool 117 which has not yet been used, prior to setting on the stocker 41, no tool ID data TIDD has been written. Therefore, the operator writes the tool ID data TIDD concerning the tool 117, such as the tool number TNO, in the tool ID 117a of the tool 117 with a portable R/W head and the like in advance. When the tool 117 is stored in the second tool storing portion 48, the tool 117 is put on a predetermined place 48a in such a manner that the tool main body 117A faces the right hand of FIG.11 and the tool ID 117a appears on the lower hand of the second tool storing portion 48 of the figure through the hole 48c, in a similar way to the first tool storing portion 47. The tool hand 69, the chuck jaw hand 72 and the workpiece hand 76, to be installed on the gantry robot 61, are stored in the hand storing portion 43 by putting the projections 69d, 72d, 76d on the holding plates 43b, 43b of the predetermined places 43a facing the hand ID 69a, 72a, 76a toward the lower hand of FIG.7 and facing the adjusting members 66, 67, to be connected with the arm 62, toward the upper hand of the figure, respectively. On this occasion, hand ID data HIDD concerning the hands 69, 72, 76, such as the hand number HNO, as shown in FIG.64, are written in the hand ID 69a, 72a, 76a of the hands 69, 72, 76 in advance. A plurality of hand jaws 79 are put on a predetermined place 42a of the hand jaw storing portion 42 facing the hand contacting face 79f on this side of paper, as shown in FIG.8. Then, the hand jaw ID 79a of the hand jaw 79, put on the hand jaw storing portion 42, appears on the bed 31 side of the back of the paper of the hand jaw storing portion 42 through the hole 42b formed at each place 42a of the hand jaw storing portion 42 so as to penetrate. On this occasion, in the hand jaw ID 79a of each hand jaw 79, hand ID data HJIDD concerning the hand jaw 79, such as the hand jaw number HJNO, are written in advance, as shown in FIG.65.

Figure 32:
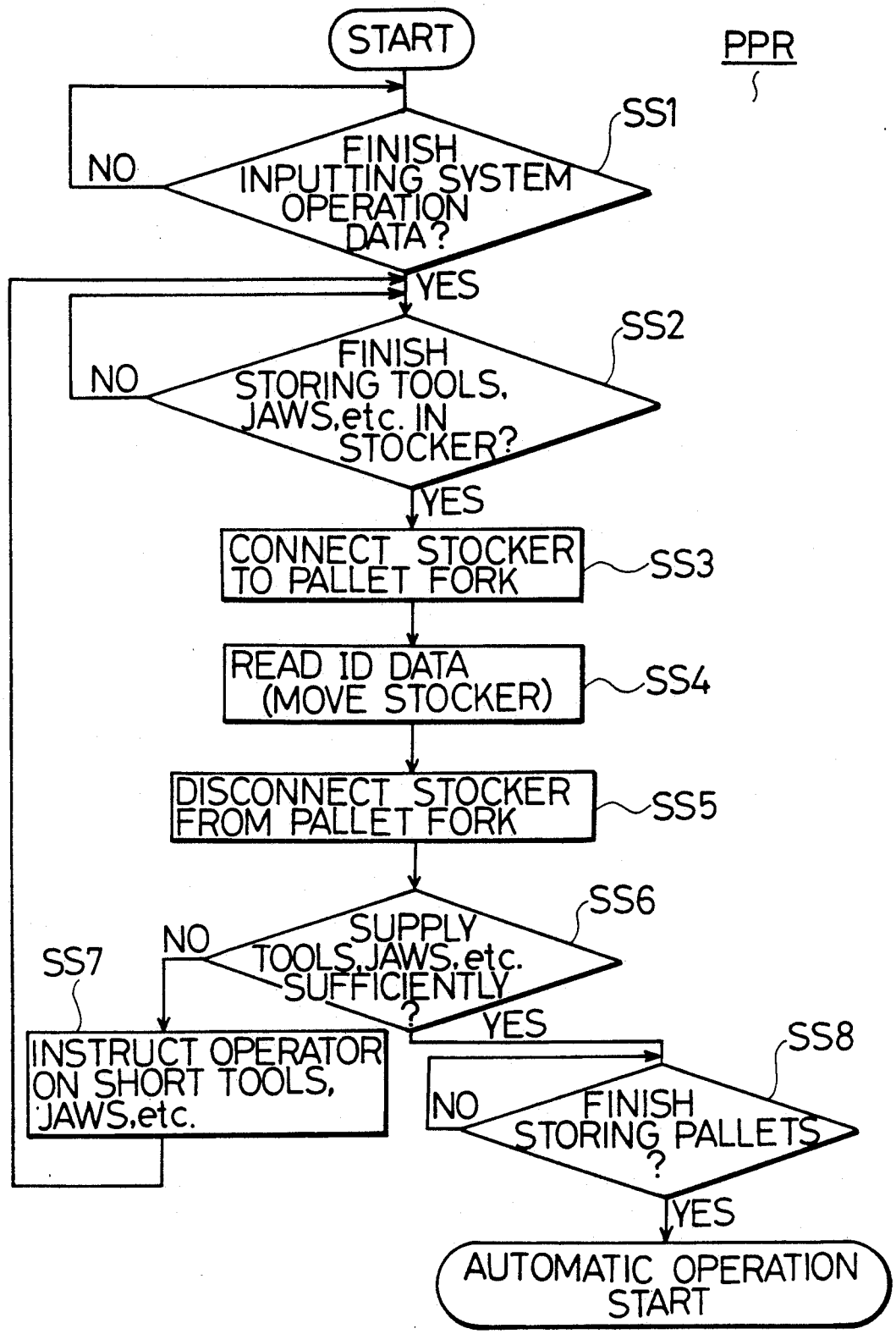
FIG. 32 is a flowchart showing pre-setup program.

In this way, when the operator has inputted the system operation data SOD and the chuck jaw 116, the tool 117, the hands 69, 72, 76 and the hand jaw 79 are stored in the stocker 41, a pre-setup program PPR, as shown in FIG.32, proceeds from Steps SS1 and SS2 to Step SS3, on the basis of a command from the operator through the input unit 89a. Then, the cell control portion 82 makes the connecting pin 50, as shown in FIG.7, projected in the direction of the arrow $U_+$ through the stocker control portion 93 so as to engage with the engagement hole 35b. By doing so, the stocker 41 is connected with the driving unit 35. Besides, the origin holing pin 51 is retracted in the direction of the arrow $V_-$ so as to pick out the engagement hole 31d. Then, the fixed situation of the stocker 41 to the bed 31 is released. By driving the driving motor 35e of the pallet fork 36 side, the stocker 41 having no driving means, can be properly moved together with the pallet fork 36 and the driving unit 35 in the directions of the arrows $X_+$ and $X_-$ of FIG.8. When the pallet fork 36 is moved in the directions of the arrows $X_+$ and $X_-$ of FIG.8, the pallet fork 36 is fixed at a Y-axis origin position YO in the directions of the arrows $Y_+$ and $Y_-$ of FIG.7.

When the stocker 41 has been connected with the pallet fork 36 side, the program, as shown in FIG.32, proceeds to Step SS4. The cell control portion 82 makes the stocker 41 properly moved in the directions of the arrows $X_{4+}$ and $X_{4-}$ of FIG.8 through the pallet fork control portion 92 and reads the chuck jaw ID data TJIDD, the tool ID data TIDD, the hand ID data HIDD and the hand jaw ID data HJIDD out of the ID 116a, 117a, 69a, 72a, 76a, 79a of each chuck jaw 116, each tool 117, each of hands 69, 72, 76 and each hand jaw 79, stored in the stocker 41, through the ID data input/output control portion 90 and the R/W heads 52, 53, 55, 56 so as to store in the system data memory 84.

The stocker 41 is properly moved in the directions of the arrows $X_{4+}$ and $X_{4-}$ of FIG.8 so as to face the tool ID 117a of each tool 117, put on the tool storing portions 47, 48, toward the R/W heads 56, 56 on the supporting members 31c, 31c, fixed on the bed 31 through the holes 47c, 48c, one by one, as shown in FIG.11. Then, the tool ID data TIDD are read out of the tool ID 117a facing the R/W head 56. The R/W heads 55, 55 on the supporting members 31c, 31c are turned in the direction of the arrow $E_-$ of FIG.11 and the stocker 41 is properly moved in the directions of the arrows $X_{4+}$ and $X_{4-}$ of FIG.8 in such a state that the collision between the shanks 117c of the tools 117, projecting from the tool storing portions 47, 48 on the lower hand in the figure, and the R/W heads 55, 55 is saved so as to position the chuck jaw ID 116a of each chuck jaw 116, stored in the chuck jaw storing portions 45, 46 on the side of the R/W heads 55, 55 of FIG.11, one by one. The R/W heads 55, 55 are turned in the direction of the arrow $E_+$ of FIG.11 so as to face the chuck jaw ID 116a of the positioned chuck jaw 116 through the holes 41a', 41c' of the side plates 41a, 41c. Then, the chuck jaw ID data TJIDD are read out of the chuck jaw ID 116a facing the R/W head 55. The R/W head 53 on the bed 31 is retracted in the direction of the arrow $L_-$ of FIG.11 and the stocker 41 is properly moved in the directions of the arrows $X_{4+}$ and $X_{4-}$ of FIG.8 in such a state that the collision between the R/W head 53 and the stocker 41 is saved so as to position the hand ID 69a, 72a, 76a of the hands 69, 72, 76, stored in the hand storing portion 43, on the upper hand of the R/W head 53 of FIG.11, one by one. The R/W head 53 is projected in the direction of the arrow $L_+$ and is inserted inside of the stocker 41 through the hole 41b' of the bottom plate 41b so as to face the hand ID 69a, 72a, 76a. The hand ID data HIDD are thus read out of the hand ID 69a, 72a, 76a facing the R/W head 53. In a similar way, the stocker 41 is properly moved in the directions of the arrows $X_{4+}$ and $X_{4-}$ of FIG.8 so as to face the hand jaw ID 79a of each hand jaw 79, put on the hand jaw storing portion 42, toward the R/W head 52 on the bed 31 on the opposite side of the paper through a hole 42b, one by one. The hand jaw ID data HJIDD are thus read out of the hand jaw ID 79a facing the R/W head 52.

Figure 60:
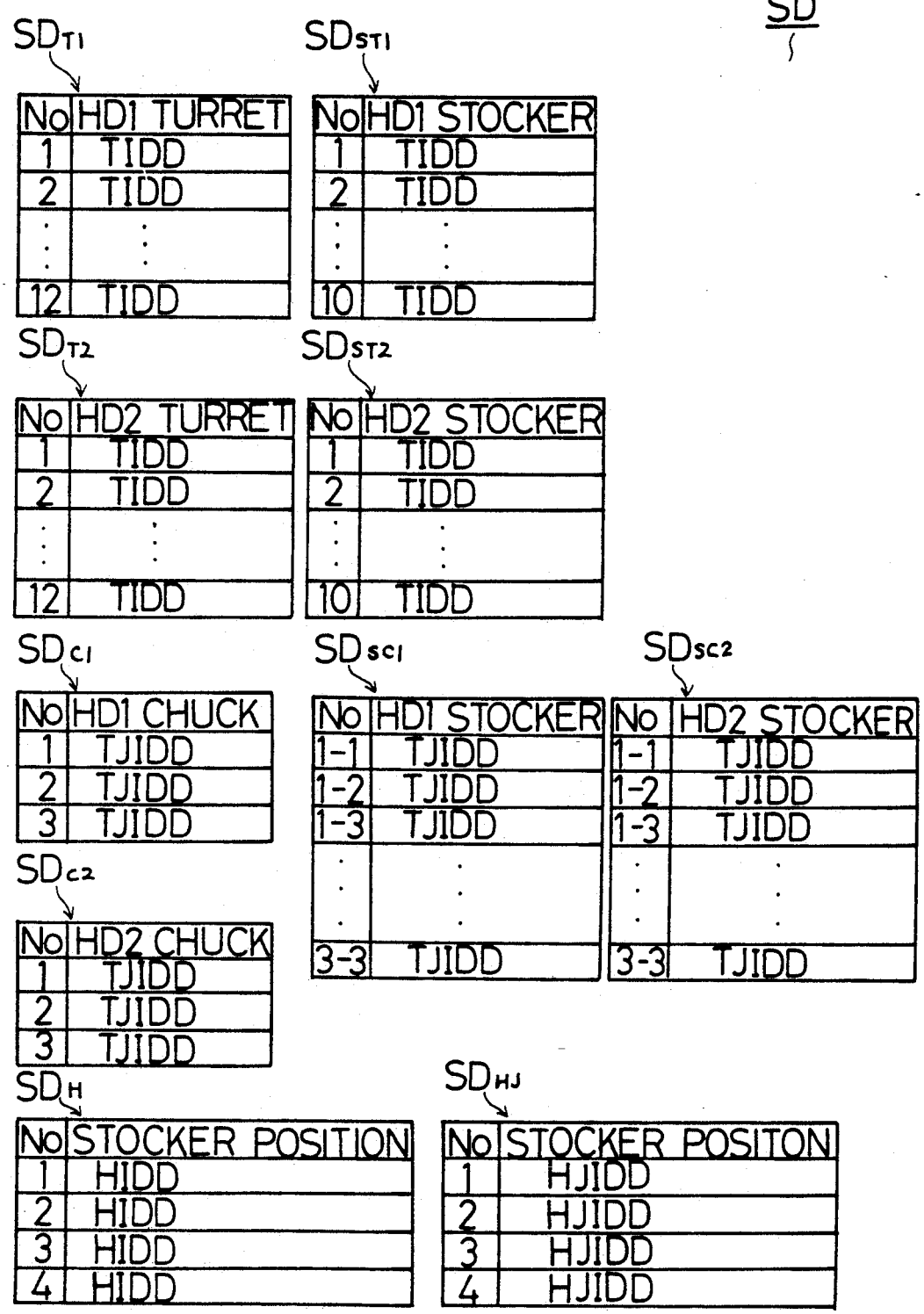
FIG. 60 is a diagrammatic representation of system data.

After the tool ID data TIDD, the chuck jaw ID data TJIDD, the hand ID data HIDD and the hand jaw ID data HJIDD concerning each tool 117, each chuck jaw 116, each of hands 69, 72, 76 and each hand jaw 79, stored in the stocker 41, read at the predetermined places on the stocker 41, are stored in the buffer memories of the controllers 56a, 55a, 53a, 52a, these data are classified by the storing portions 47, 48, 45, 46, 43, 42 and stored in the system data memory 84 as system data $SD_{ST1}$, $SD_{ST2}$, $SD_{SC1}$, $SD_{SC2}$, $SD_H$, $SD_{HJ}$ ranging on the basis of the position number No corresponding to the read places 47a, 48a, 45a, 46a, 43a, 42a, as shown in FIG.60. The actual places 47a, 48a, 45a, 46a, 43a, 42a, on which each tool 117, each chuck jaw 116, each of the hands 69, 72, 76 and each hand jaw 79 are stored, certainly correspond with the system data $SD_{ST1}$, $SD_{ST2}$, $SD_{SC1}$, $SD_{SC2}$, $SD_H$, $SD_{HJ}$. In the system data memory 84, the tool ID data TIDD concerning each tool 116 already installed on the turret tool rests 21, 22 of the main machine 2 and the chuck jaw ID data TJIDD concerning each chuck jaw 116 already installed on the chucks 9, 19 of the main machine 2 are classified by the turret tool rests 21, 22 and the chucks 9, 19 and stored as system data $SD_{T1}$, $SD_{T2}$, $SD_{C1}$, $SD_{C2}$ ranging on the basis of the position numbers No of the installation positions, respectively. On this occasion, in the system data memory 99 of the main machine control portion 97 side, the system data $SD_{T1}$, $SD_{T2}$, concerning the turret tool rests 21, 22 of the system data SD, as shown in FIG.60, and the system data $SD_{C1}$, $SD_{C2}$ concerning the chucks 9, 19 are stored.

When readout of the chuck jaw ID data TJIDD, the tool ID data TIDD, the hand ID data HIDD and the hand jaw ID data HJIDD out of each chuck jaw 116, each tool 117, each of hands 69, 72, 76 and each hand jaw 79, stored in the stocker 41 finishes, the cell control portion 82 releases the connecting situation between the stocker 41 and the driving unit 35 of the pallet fork 36 side in Step SS5 of FIG.32 as follows. That is, the stocker 41 is moved to the control axis origin in the directions of the arrows $X_{4+}$ and $X_{4-}$ of FIG. 8 through the pallet fork control portion 92. The origin holding pin 51 of the stocker 41 is projected in the direction of the arrow $V_+$ of FIG.7 through the stocker control portion 93 so as to engage with the origin holding hole 31d. Then, the stocker 41 is fixed with respect to the bed 31 and the connecting pin 51 is retracted in the direction of the arrow $U_-$ so as to pick out the engagement hole 35b.

Thereafter, the cell control portion 82 judges through the system operation data check portion 87 in Step SS6 of FIG.32 whether or not all kinds of the tools 117, the chuck jaws 116, the hands 69, 72, 76, the hand jaws 79, necessary for machining, are stored in the stocker 41 or the main machine 2, that is, whether or not these necessary for machining are stored in the turning cell 1 by comparing each tool number TNO, each chuck jaw number TJNO, each hand number HNO, each hand jaw number HJNO, set in the system operation data SOD as shown in FIG.59, stored in the system operation data memory 85, with the tool number TNO, the chuck jaw number TJNO, the hand number HNO, the hand jaw number HJNO of each ID data TIDD, TJIDD, HIDD, HJIDD of the system data SD, stored in the system data memory 84, as shown in FIG.60. In case where any kinds of the tools 117, the chuck jaws 116, the hands 69, 72, 76 or the hand jaws 79 are short, the program of FIG.32 proceeds to Step SS7 from Step SS6. Then, the cell control portion 82 displays the chuck jaw number TJNO, the tool number TNO, the hand number HNO or the hand jaw number HJNO of the tool 117, the chuck jaw 116, the hands 69, 72, 76 or the hand jaw 79, which are short, on the display 88a through the display control portion 88 so as to instruct the operator to supply.

The operator in charge of setup puts predetermined numbers of the workpieces 120 of the workpiece number WNO, to be machined and set in the system operation data SOD of the scheduled machining on a predetermined pallet 119 for each workpiece number WNO ranging in a predetermined manner, apart from the storage of the chuck jaws 116, the tools 117, the hands 69, 72, 76, and the hand jaws 79 in the stocker 41 (Its storage may be performed prior to Step SS8 of FIG.32). Thereafter, the pallets 119 each having workpieces 120, are stacked in a predetermined order(This order becomes a machining schedule MSC, as mentioned hereinafter), making all the positions of the pallet ID 119a uniform, as shown in FIG.7. On this occasion, a pallet pin 119p, installed on each pallet 119, is exchanged for a pallet pin 119p of a proper height PPHT so that the workpieces 120 which are put on a predetermined pallet 119 don't abut against the pallet 119, stacked just above the predetermined pallet 119. (It may be that a stretchable pallet pin 119p is fixed on the pallet 119 such that the height PPHT of the pallet pin 119p is properly adjusted.) In this way, when the workpieces 120, to be machined, are put on the pallets 119, the operator writes pallet ID data PIDD concerning the pallet 119, such as a pallet number PLNO of the pallet 119, the workpiece number WNO of the workpiece 120, put on the pallet 119, the height PPHT of the pallet pin 119p, as shown in FIG.66, in the pallet ID 119a of each pallet having the workpieces 120 with a portable R/W head and the like. Thereafter, the pallets 119 stacked are carried to the setup station 30 of the turning cell 1 by a forklift or the like so as to put on the material station 32 facing the pallet IDs 119a toward the right hand of FIG.8.

Figure 33A:
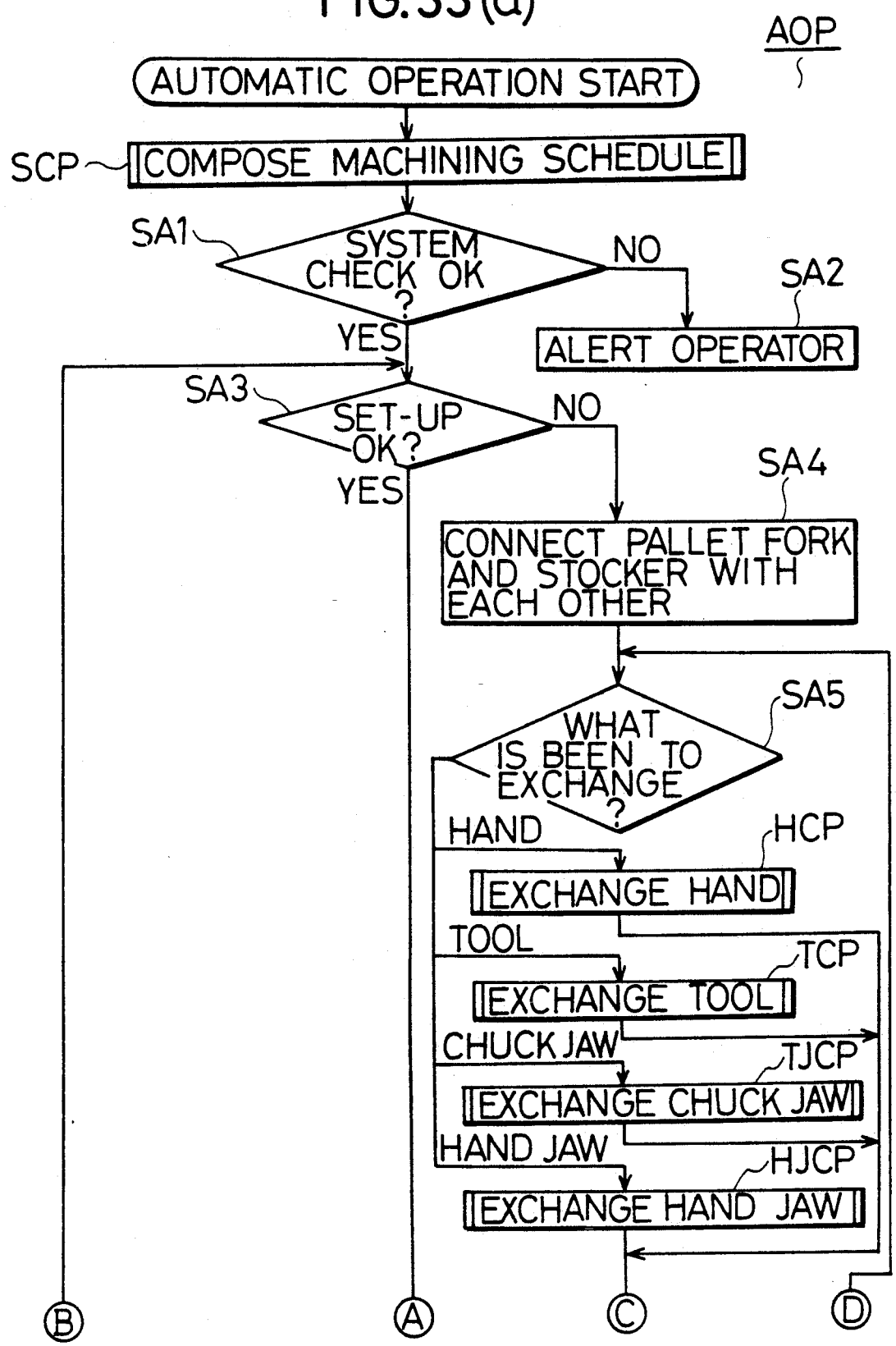
FIG. 33 is a flowchart showing an automatic operation program.
Figure 33:
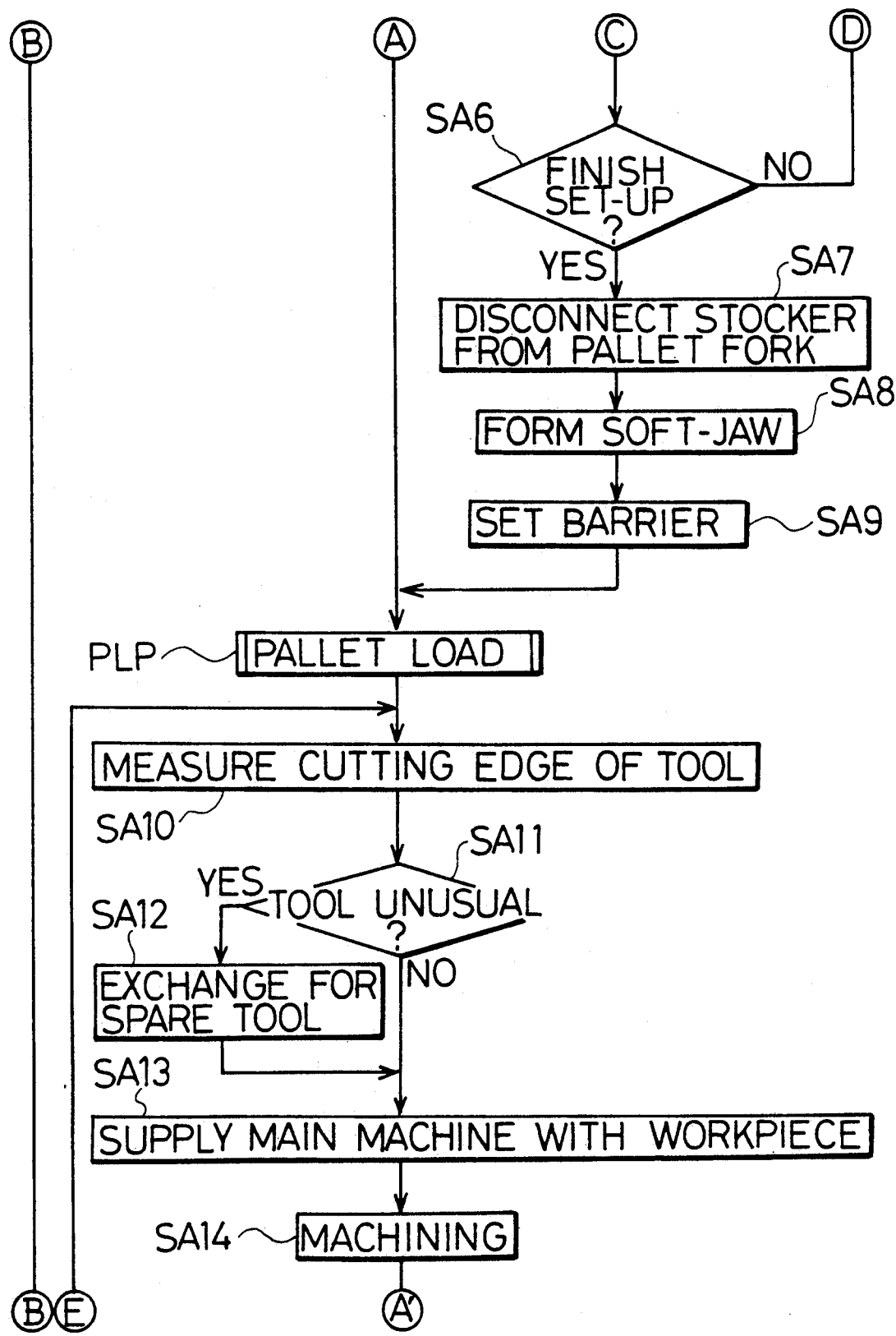

In this way, when the turning cell 1 has been supplied with all of the tools 117, the chuck jaws 116, the hands 69, 72, 76 and the hand jaws 79, necessary for machining, the pallets 119 having the workpieces 120 are put on the material station 32 so as to stack and an automatic operation start button of the input unit 89a is depressed by the operator, the cell control portion 82 proceeds to an automatic operation program AOP, as shown in FIG.33, from Steps SS6, SS8 of FIG.32.

Figure 34:
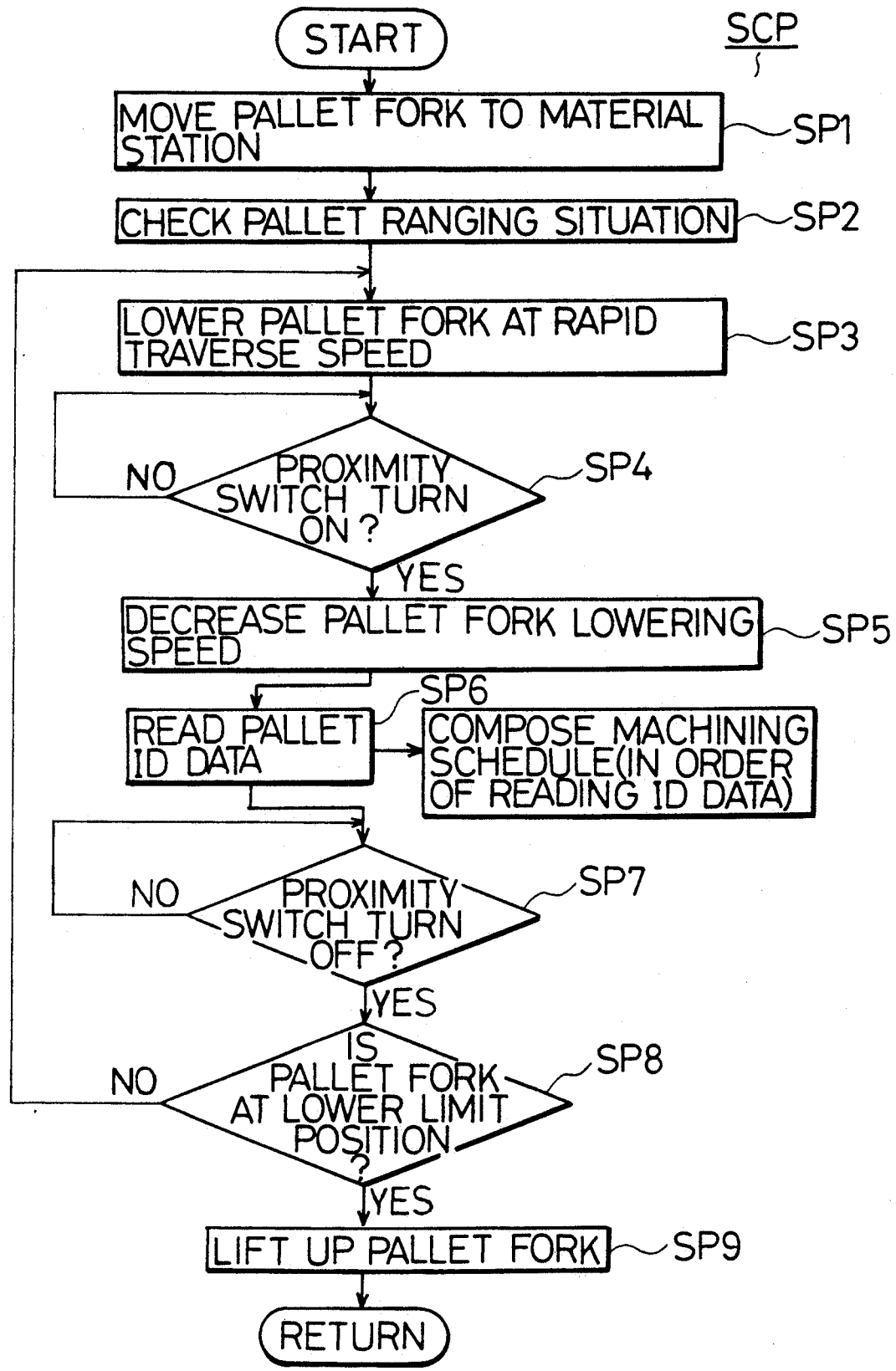
FIG. 34 is a flowchart showing a schedule composition program.

When the automatic operation program AOP starts, the cell control portion 82 makes the pallet fork 36 properly moved in the directions of the arrows $X_{3+}$ and $X_{3-}$ of FIG.8 and in the directions of the arrows $Y_+$ and $Y_-$ of FIG.7 through the pallet fork control portion 92 on the basis of a schedule composition program SCP, as shown in FIG.34, and the pallet ID data PIDD are read out of the pallet ID 119a of each pallet 119, stacked on the material station 32, through the ID data input/output control portion 90 and the R/W head 39 so as to compose the machining schedule MSC, as shown in FIG.61. That is, the pallet fork 36 is moved in the direction of the arrow $X_{3+}$ of FIG.8 so as to position at the Y-axis origin position YO on the upper hand of the pallets 119, put on the material station 32 of FIG.7 (Step SP1 of FIG.34). Thereafter, the pallet fork 36 is once lowered to a low limit position YL, for which a parameter is set, in the direction of the arrow $Y_+$ of FIG.7 in such a state that the hooks 37a of the arms 37 are retracted in the direction of the arrow $F_-$ of FIG.10. In case where the stacked pallets 119 are not ranged, then, the limit switch 36b, installed on the arm 37, abuts against the pallet 119, which isn't ranged in the upper and lower directions of FIG.7, the pallet fork 36 stops and the operator is alerted by a warning lamp and the like. On the contrary, in case where the pallets 119 are ranged, the pallet fork 36, lowered to the low limit position YL, is lifted up to the Y-axis origin position YO on the upper hand of FIG.7 of the pallet 119 of the upper limit in the direction of the arrow $Y_-$, again (Step SP2). The pallet fork 36 is then lowered in the direction of the arrow $Y_+$ of FIG.7 at a predetermined rapid traverse speed, set with a parameter (Step SP3). When the lowered pallet fork 36 approaches the pallet 119, stacked at the top position, the proximity switch 36a, installed on the arm 37, turns on by detecting the metal frame of the pallet 119 (Step SP4). Then, the lowering speed of the pallet fork 36 decreases to a predetermined speed, set with a parameter (Step SP5). When the R/W head 39, installed on the pallet fork 36, faces the pallet ID 119a of a predetermined pallet 119, the pallet ID data PIDD concerning the pallet 119, installing the pallet ID 119a, are read out of the pallet ID 119a. Thereafter, the read pallet ID data PIDD are registered in the machining schedule memory 86 as the machining schedule MSC (Step SP6). When the pallet fork 36 is further lowered and departs from the metal frame of the pallet 119, out of which the pallet ID data PIDD are read, and the proximity switch turns off (Step SP7), the lowering speed of the pallet fork 36 is again increased to the rapid traverse speed such that the pallet fork 36 approaches the next pallet 119, positioned just below the pallet 119, out of which ID data PIDD are read, in case where the pallet fork 36 has not been lowered to the low limit position YL (Step SP8). In this way, the pallet fork 36 is lowered such that the lowering speed is high between the pallets 119, 119 and the lowering speed is lower as the pallet fork 36 approaches each pallet 119. The pallet ID data PIDD concerning the pallets 119, stacked in the upper and lower directions of FIG.7, between the pallet 119 at the top position and the pallet 119 at the bottom position of the figure, are read out of the pallet ID 119a of each pallet 119, successively. The machining schedule MSC is composed registering in the machining schedule memory 86 in such order that the pallet ID data PIDD are read. On this occasion, the machining schedule MSC is displayed on the display 88a, as shown in FIG.61. When the pallet fork 36 is lowered to the lower limit position YL, as shown in FIG.7, the readout of the pallet ID data PIDD out of the pallet ID 119a of the whole pallets 119 finishes and the composition of the machining schedule MSC finishes (Step SP8), the pallet fork 36 is lifted up to the Y-axis origin position YO in the direction of the arrow $Y_-$ (Step SP9) so as to finish the schedule composition program SCP.

Next, in Step SA1 of FIG.33(a), the cell control portion 82 compares the workpiece number WNO of the read pallet ID data PIDD with the workpiece number WNO in the system operation data SOD for machining to be performed this time, through the system operation data check portion 87. In case where both of the workpiece numbers WNO don't correspond with each other, the operator is alerted in Step SA2. On the contrary, in case where both of the workpiece numbers WNO correspond with each other, the program proceeds to Step SA3. Accordingly, the tool ID data TIDD and the chuck jaw ID data TJIDD concerning each tool 117 and each chuck jaw 116 in the turning cell 1 are indirectly compared with the pallet ID data PIDD through the system operation data SOD composed by the operator. As shown in FIG.66, as the tool numbers TNO and the chuck jaw numbers TJNO of the tools 117 and the chuck jaws 116, necessary for machining on the workpieces 120 put on the pallet 119, are stored in the pallet ID data PIDD, whether or not the turning cell 1 is supplied with the necessities of machining may be confirmed by directly comparing the tool ID data TIDD and the chuck jaw ID data TJIDD with the pallet ID data PIDD, as mentioned hereinafter. This is the same as the cases of the hands 69, 72, 76 and the hand jaw 79.

In Step SA3, the cell control portion 82 transfers machining program numbers PRN in the pallet ID data PIDD, concerning the workpieces 120 to be machined, to the main machine control portion 97 in order of setting in machining schedule MSC. The main machine control portion 97 reads the machining program PRO of the machining program number PRN out of the machining program memory 100 and judges through the setup change judgement portion 102 whether or not necessary kinds of tools 117 are installed on the turret tool rests 21, 22, whether or not necessary kinds of chuck jaws 116 are installed on the chucks 9, 19, whether or not necessary kind of workpiece hand 76 is installed on the gantry robot 61 and whether or not necessary kinds of hand jaws 79 are installed on the workpiece hand 76 in case of machining of predetermined numbers of the workpieces 120 by comparing the tool numbers TNO, the chuck jaw numbers TJNO, etc. set in the machining program PRO (of the tools 117 and the chuck jaws 116, etc. necessary for machining the workpieces 120) with the system data SD in the system data memories 84, 99. In the above-mentioned case, the necessity of setup change is judged on the basis of the machining program PRO selected according to the pallet ID data PIDD, that is, on the basis of the pallet ID data PIDD indirectly. However, the necessity of setup change may be judged on the basis of the pallet ID data PIDD, directly, or on the basis of the system operation data SOD. In case where any necessities aren't installed, the main machine control portion 97 outputs an exchange command to the cell control portion 82 and transfers the tool numbers TNO, the chuck jaw numbers TJNO, the hand number HNO, the hand jaw number HJNO and the like, to be exchanged and the program proceeds to Step SA4 of FIG.33(a). Then, the tools 117, the chuck jaws 116, the workpiece hand 76 or the hand jaw 79 are exchanged. Besides, the tools 117, being unfit to further use (or considered to be unfit to further use) of the tools 117, installed on the turret tool rests 21, 22, are exchanged or if using time and the like of the tools 117 reach tool life in the tool ID data TIDD, the tools 117 are exchanged. On this occasion, such a situation that the stocker 41 doesn't have anything to be exchanged is saved and exchange of the tools 117, the chuck jaws 116, the workpiece hands 76 and the hand jaws 79, as mentioned hereinafter, is smoothly performed, as storage of the tools 117, the chuck jaws 116, the workpiece hands 76, and the hand jaws 79, necessary for machining, into the stocker 41 is confirmed by the system operation data check portion 87 in advance.

In Step SA4, the cell control portion 82 makes the connecting pin 50 of the stocker 41 projected in the direction of the arrow $U_+$ of FIG.7 through the stocker control portion 93 such that the stocker 41 and the driving unit 35 are connected with each other and makes the origin holding pin 51 retracted in the direction of the arrow $V_-$ so as to release the fixed condition of the stocker 41 to the bed 31. Then, the stocker 41 can be moved together with the driving unit 35 and the pallet fork 36 in the directions of the arrows $X_+$ and $X_-$ of FIG.8.

Figure 35:
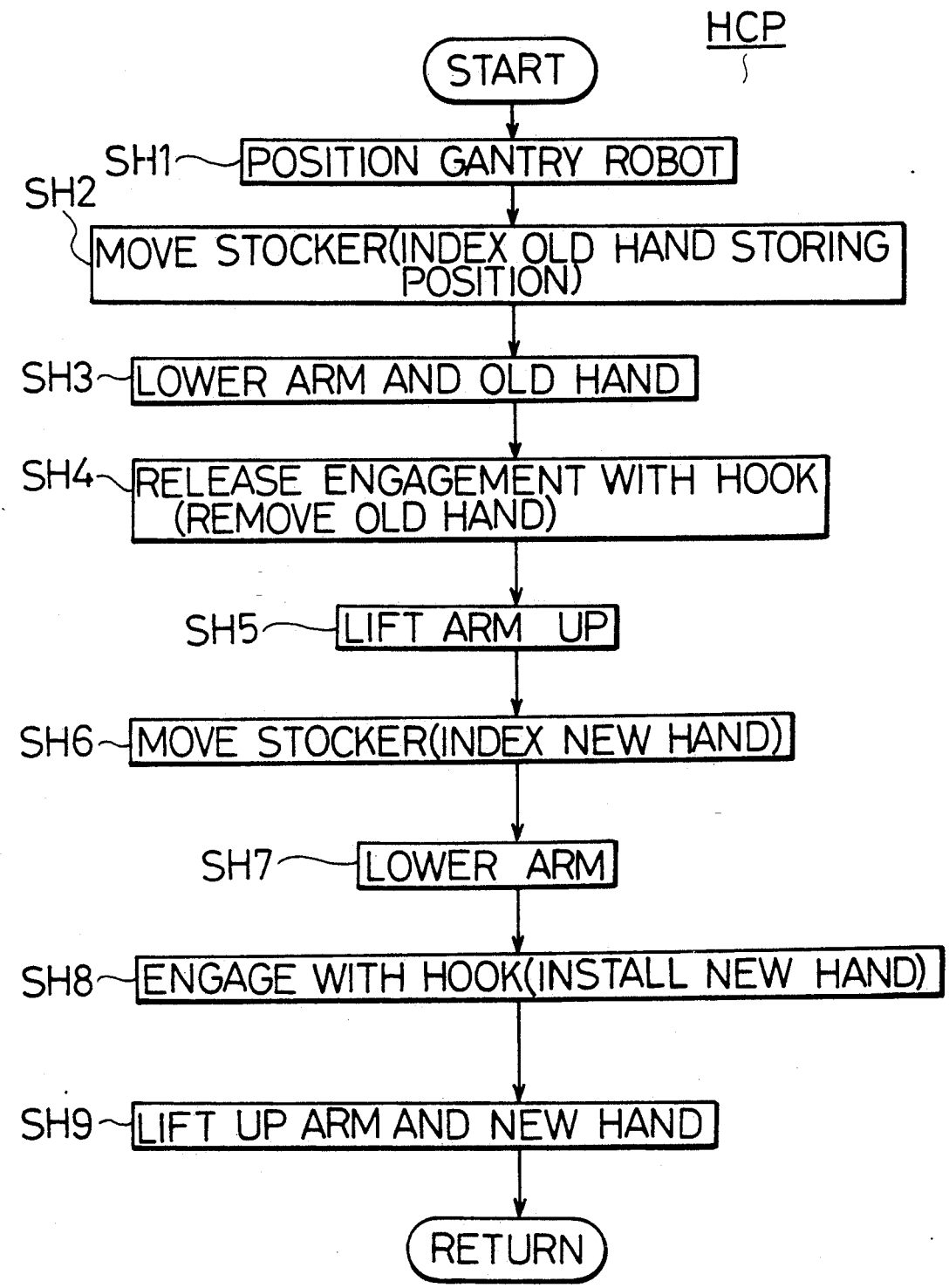
FIG. 35 is a flowchart showing a hand exchange program.

The case of exchange of the tools 117 of the turret tool rests 21, 22 is now stated. Prior to exchange of the tools 117, the program proceeds from Step SA5 of FIG.33(a) to the hand exchange program HCP, as shown in FIG.35. The cell control portion 82 makes the stocker 41 driven and controlled through the pallet fork control portion 92 on the basis of the hand exchange program HCP and makes the gantry robot 61 driven and controlled through the gantry robot control portion 94 so as to exchange the hand of the gantry robot 61. That is, as the workpiece hand 76, being suitable for holding the workpiece 120, is usually installed on the gantry robot 61, this is exchanged for the tool hand 69, suitable for holding the tool 117. At first, the workpiece hand 76 of the gantry robot 61 is positioned on the upper hand of the movement path of the stocker 41 of FIG.1 (Step SH1). The stocker 41 is properly moved in the directions of the arrows $X_{4+}$ and $X_{4-}$ of FIG.8 so as to position the predetermined place 43a to be stored the workpiece hand 76 at a delivery position GTP (Step SH2). Thereafter, the arm 62 and the workpiece hand 76 of the gantry robot 61 are lowered in the direction of the arrow $A_+$ of FIG. 7 so as to put the projection 76d of the workpiece hand 76 on the holding plates 43b, 43b of the place 43a, positioned at the delivery position GTP (Step SH3). When the driving cylinders 65d, as shown in FIG.13, are driven so as to project the operation rods 65c in the direction of the arrow $GM_+$ against elasticity of the springs 65e, the hooks 65a, 65a move in the direction of the arrow $G_+$ following the tapered portion 65c' by the springs 65b. Then, the engagement between the hooks 65a of the arm 62 side and the engagement pins 66a of the workpiece hand 76 side is released (Step SH4). The workpiece hand 76 departs from the arm 62 and is stocked in the stocker 41 in a state of the projection 76d being held with the holding plates 43b, 43b. Thereafter, only the arm 62 of the gantry robot 61 is lifted up in the direction of the arrow $A_-$ of FIG.7 so as to retract outside of the movement area of the stocker 41 (Step SH5), and the stocker 41 is properly moved in the directions of the arrows $X_{4+}$ and $X_{4-}$ of FIG.8 so as to position the tool hand 69, put on the predetermined place 43a at the delivery position GTP (Step SH6). The arm 62 is again lowered in the direction of the arrow $A_+$ of FIG.7 so as to fit the positioning pins 65f of the arm 62, as shown in FIG.12, into the positioning holes 66b of the tool hand 69, as shown in FIG.15. At the same time, the arm 62 and the tool hand 69, positioned at the delivery position GTP, are abutted against each other engaging the coupling 66c of the tool hand 69, as shown in FIG.17, with the spline shaft 63b of the arm 62, as shown in FIG.14 (Step SH7). When the depression of the operation rods 65c, as shown in FIG.13, in the direction of the arrow $GM_+$ by the driving cylinders 65d is released and the operation rods 65c are retracted in the direction of the arrow $GM_-$ by the springs 65e, the hooks 65a, 65a move in the direction of the arrow $G_-$ against elasticity of the springs 65b following the tapered portion 65c', and the hooks 65a of the arm 62 side and the engagement pins 66a of the tool hand 69 side are engaged with each other. The tool hand 69 is, then, installed on the arm 62 (Step SH8). The arm 62 and the tool hand 69 are lifted up in the direction of the arrow $A_-$ of FIG.7 so as to finish the hand exchange program HCP. The cell control portion 82 can recognize the place 43a storing each of hands 69, 72, 76 without mistakes, because the hand ID data HIDD which are basis of the recognition are read out of each of the hand IDs 69a, 72a, 76a of the hands 69, 72, 76 when the hands 69, 72, 76 are stored by the operator at the predetermined places 43a of the stocker 41. Therefore, a proper hand (the tool hand 69 in the above case) is certainly selected so as to install on the gantry robot 61 in case of exchange of the hand of the gantry robot 61. This is the same as the cases of the hand jaws 79, the chuck jaws 116, and the tools 117, stored in the stocker 41. That is, as the cell control portion 82 can certainly recognize the places 42a, 45a, 46a, 47a, 48a by reading ID data out of each ID, the exchange of the hand jaw 79, the chuck jaw 116, the tool 117, as mentioned hereinafter, is correctly performed.

Figure 36:
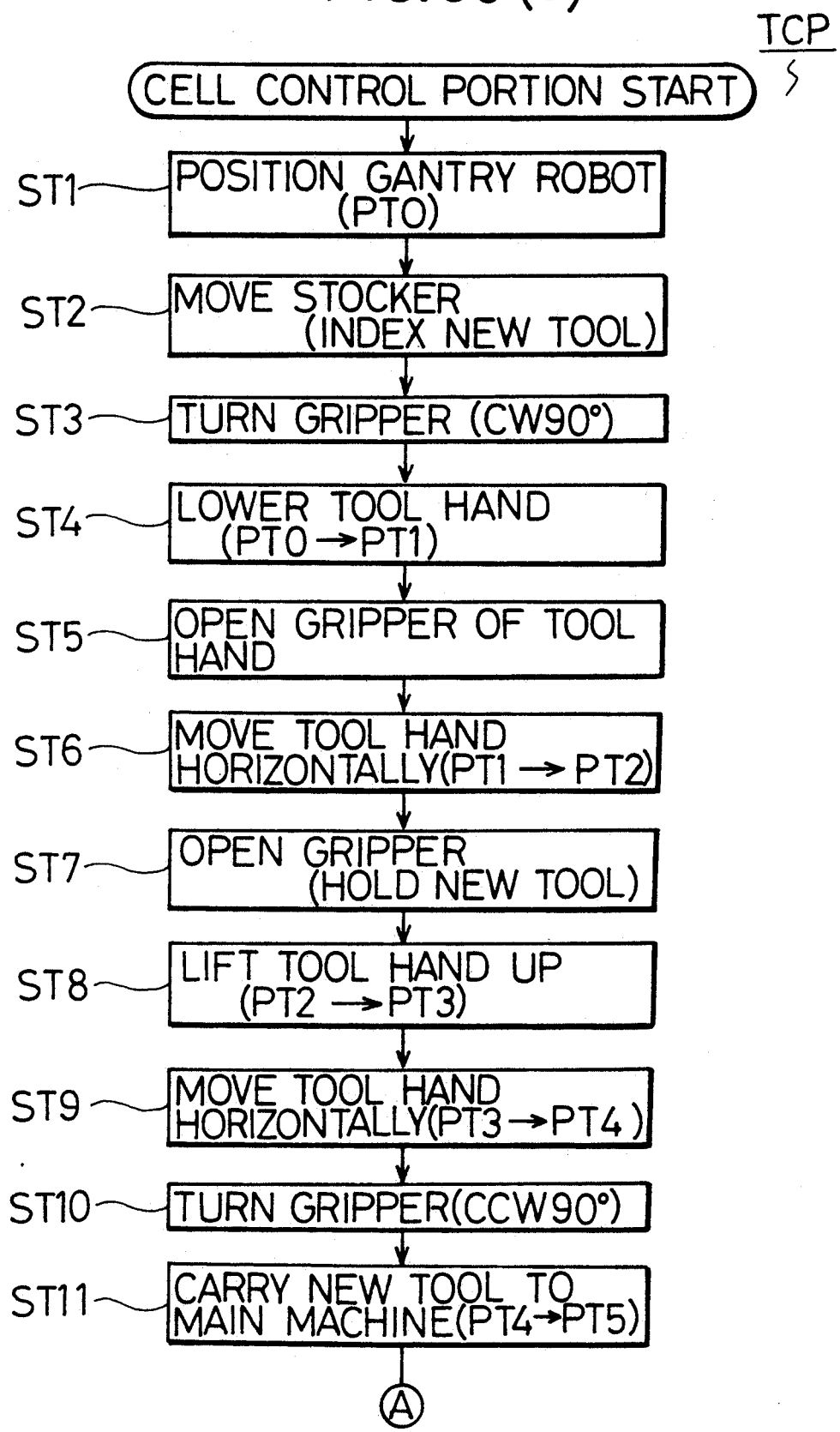
FIG. 36 is a flowchart showing a tool exchange program.
Figure 36B:
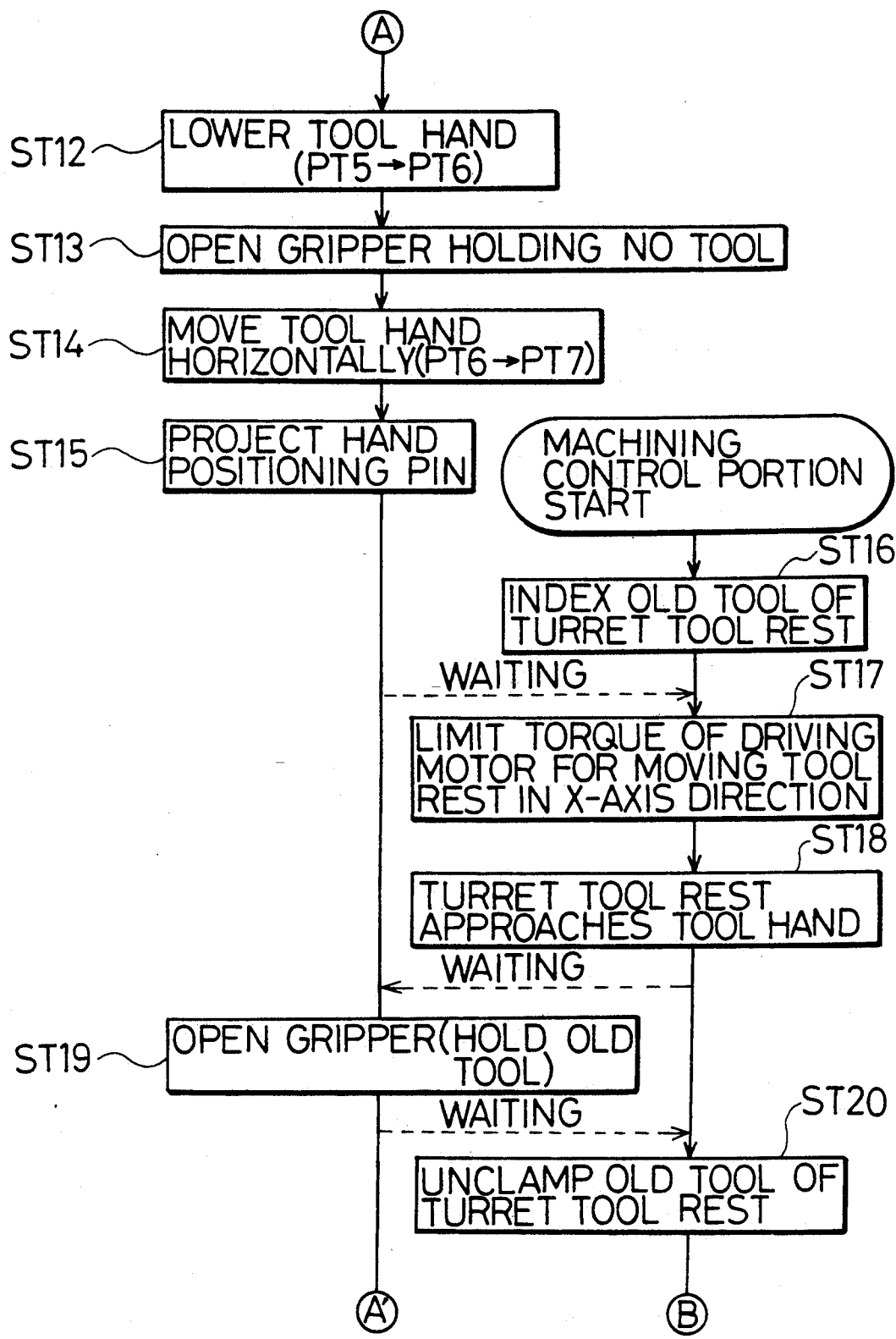
Figure 36:
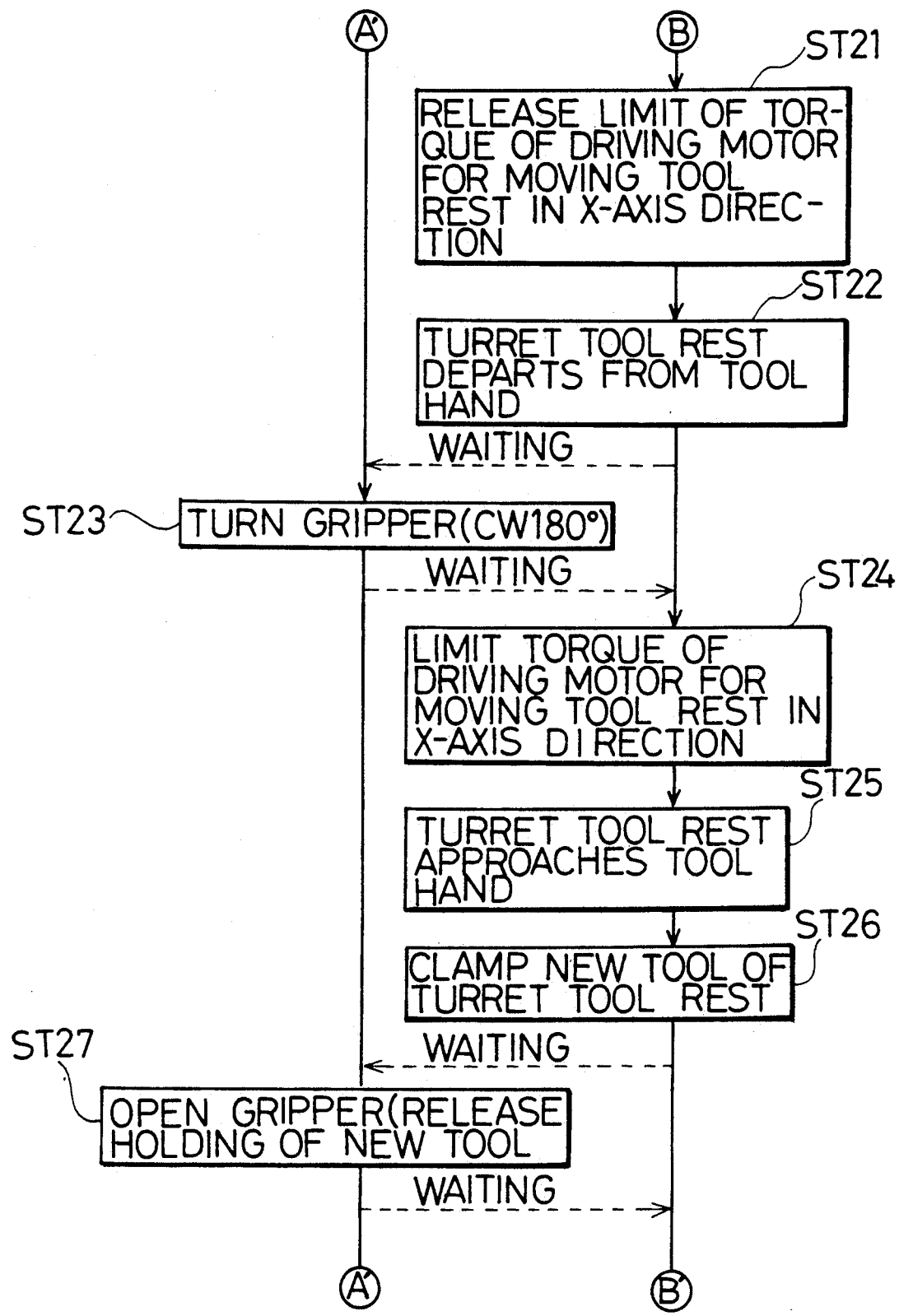
Figure 36:
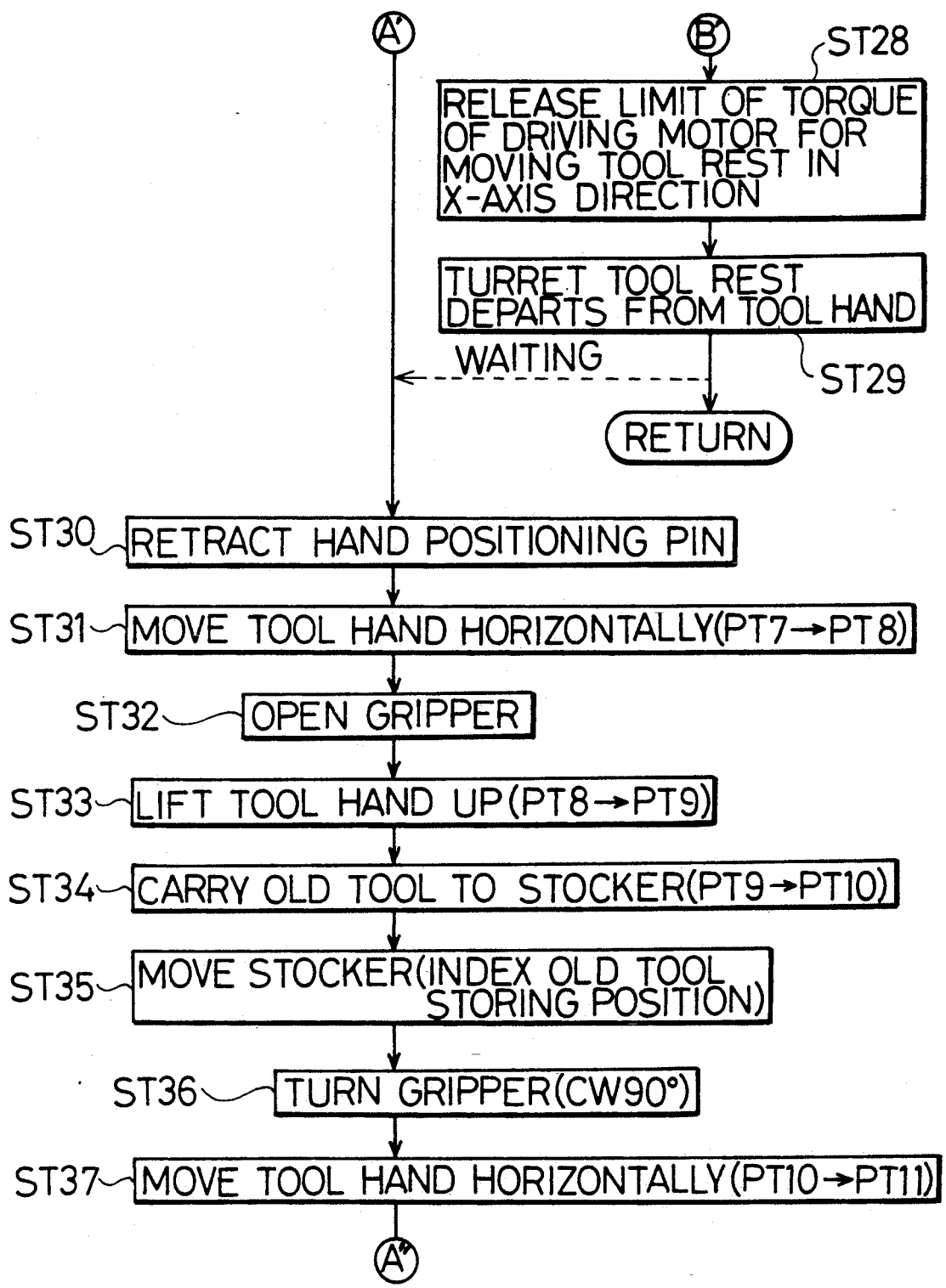
Figure 36:
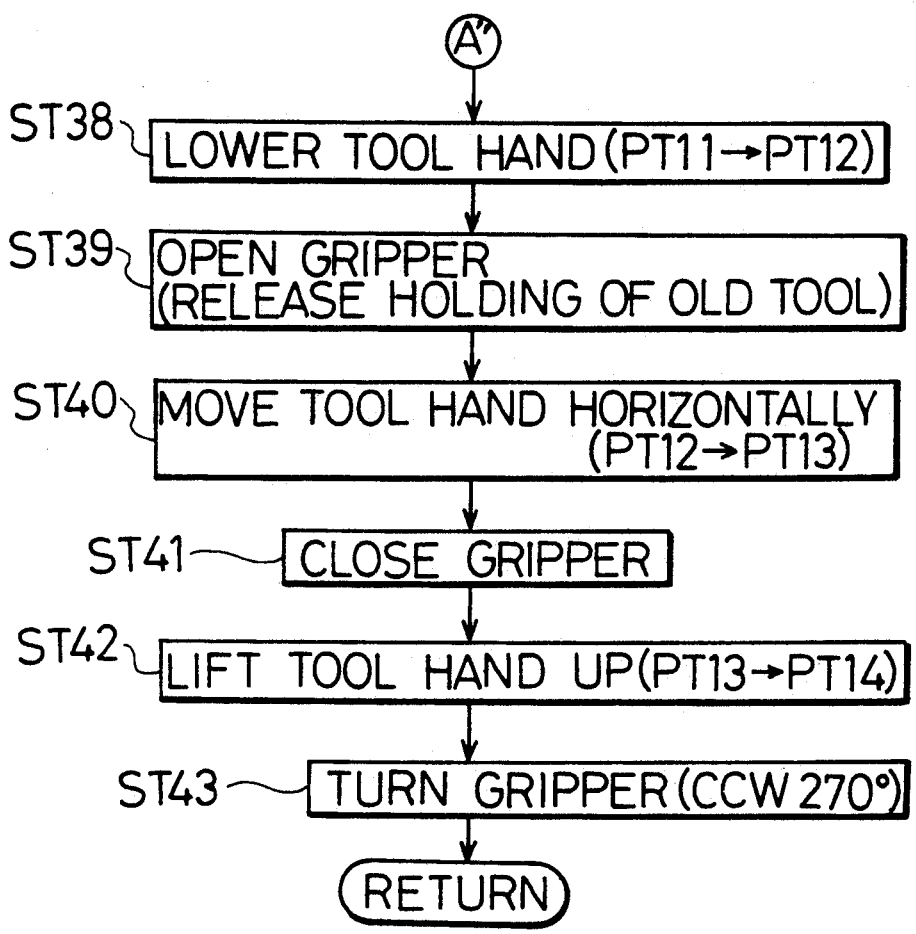
Figure 37:
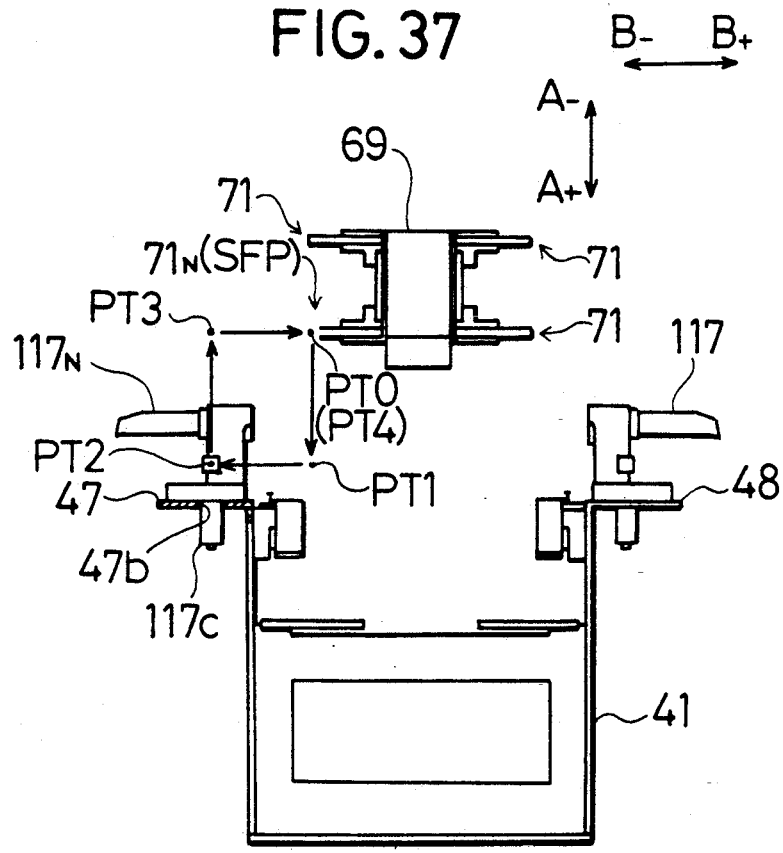
FIGS. 37 through 47 illustrate way of exchange of tools.
Figure 38:
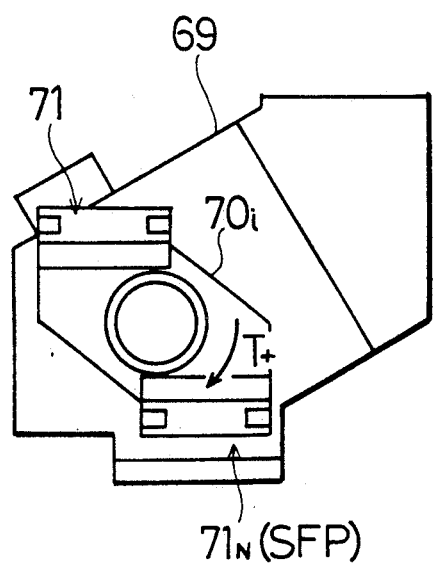
Figure 39:
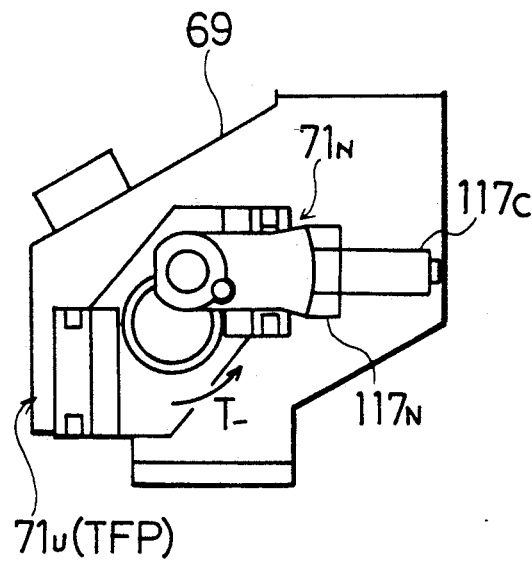
Figure 40:
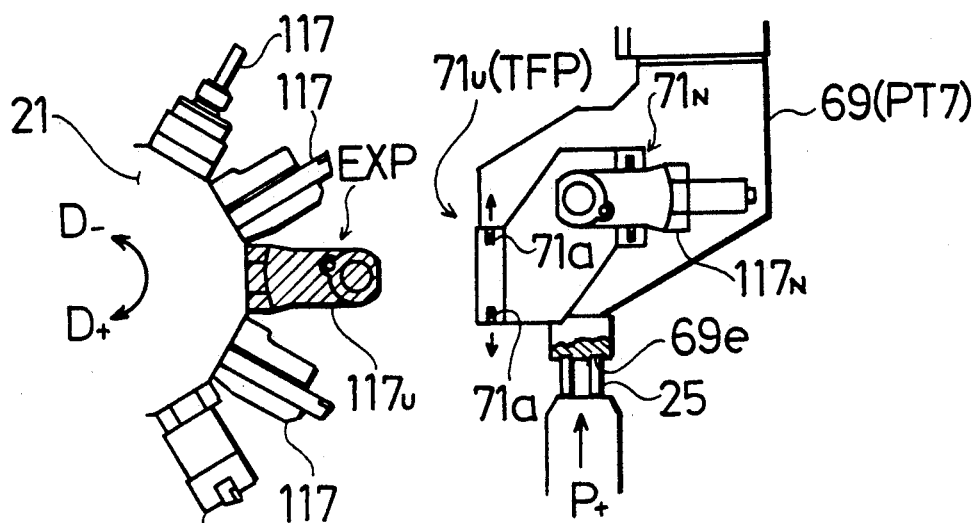
Figure 41:
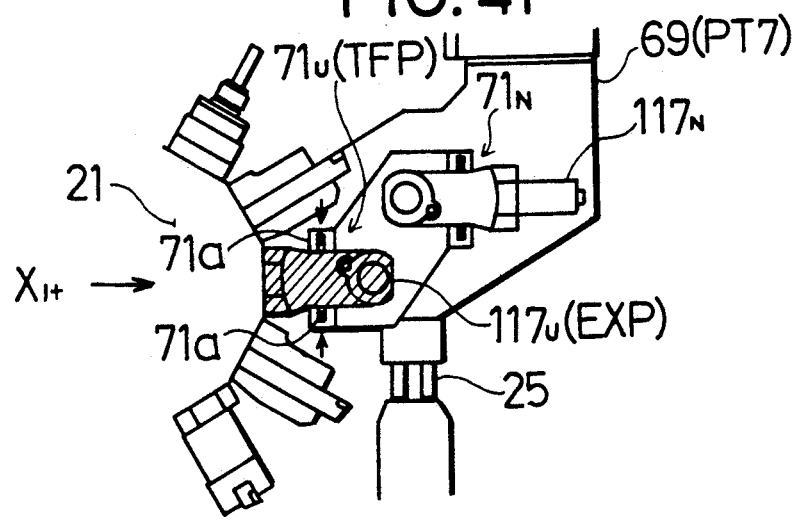
Figure 42:
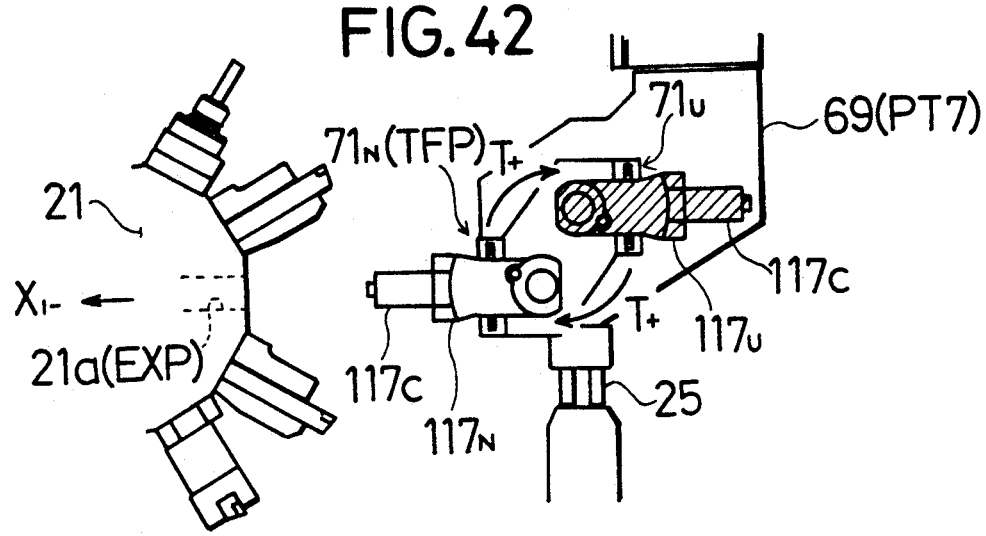
Figure 43:
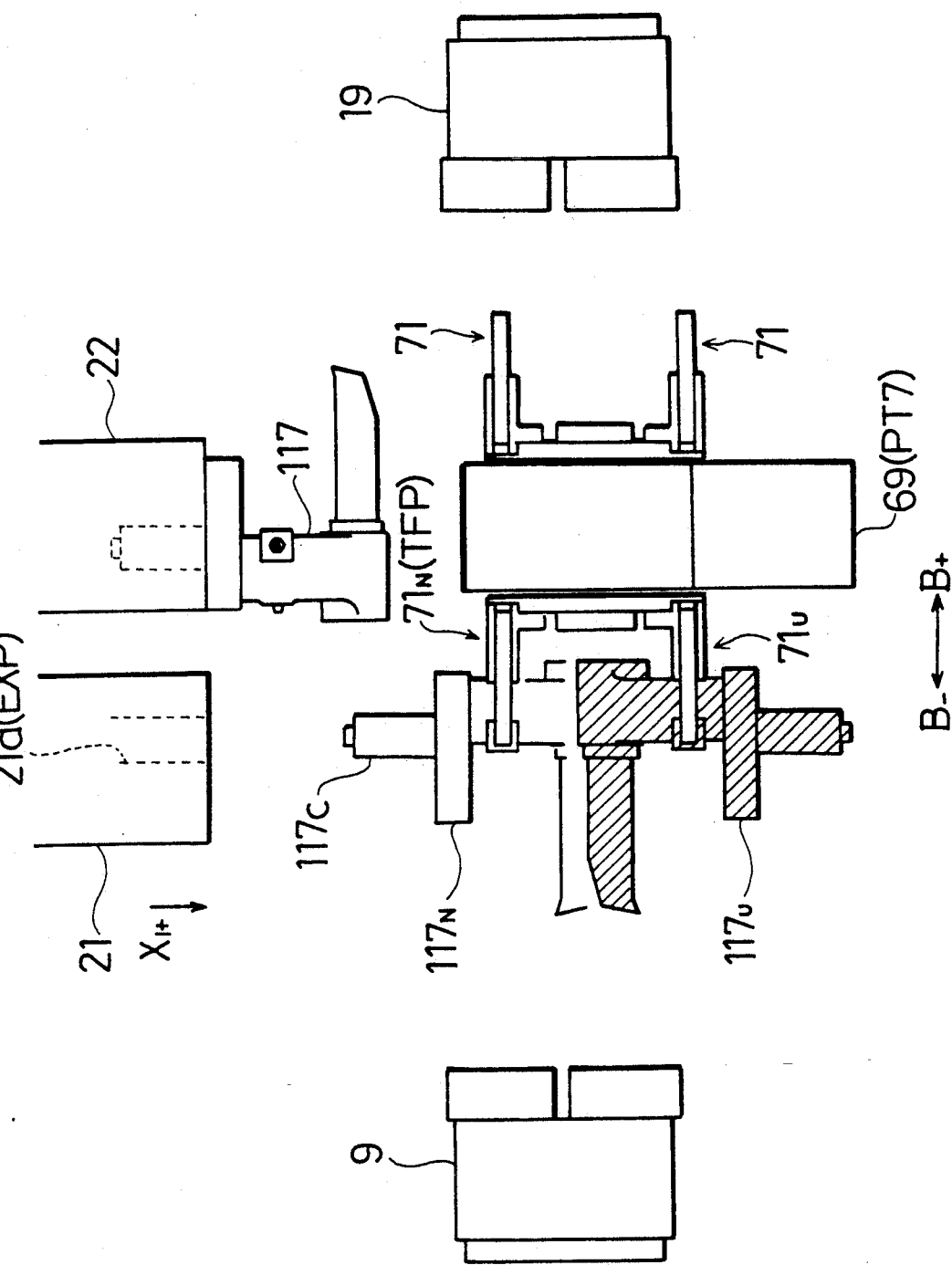
Figure 44:
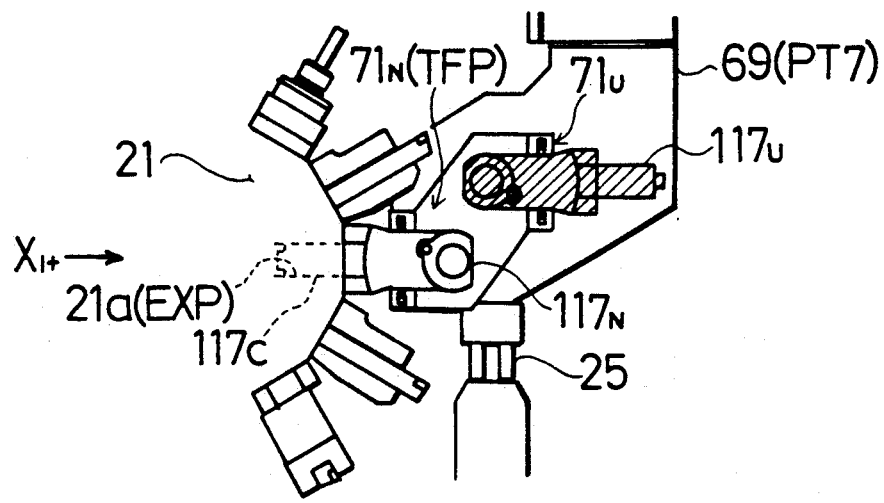
Figure 45:
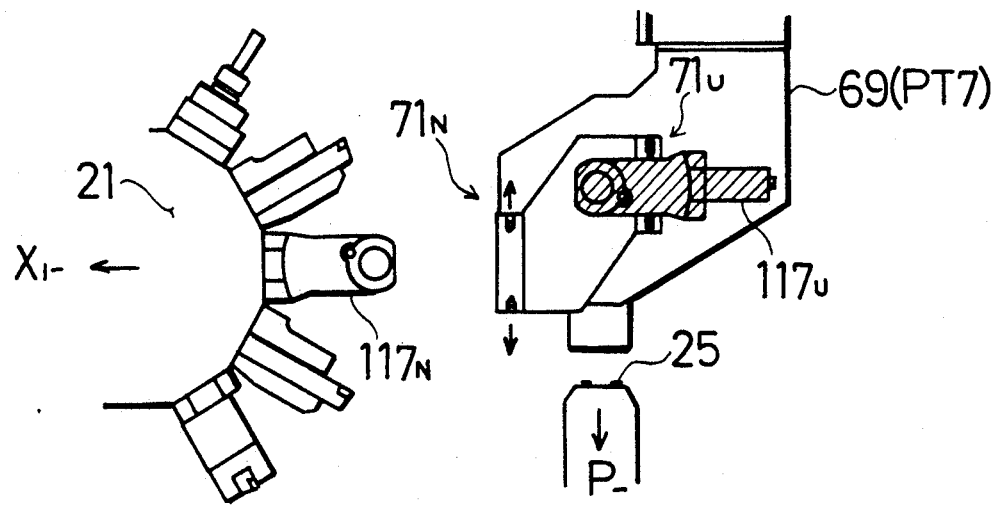
Figure 46:
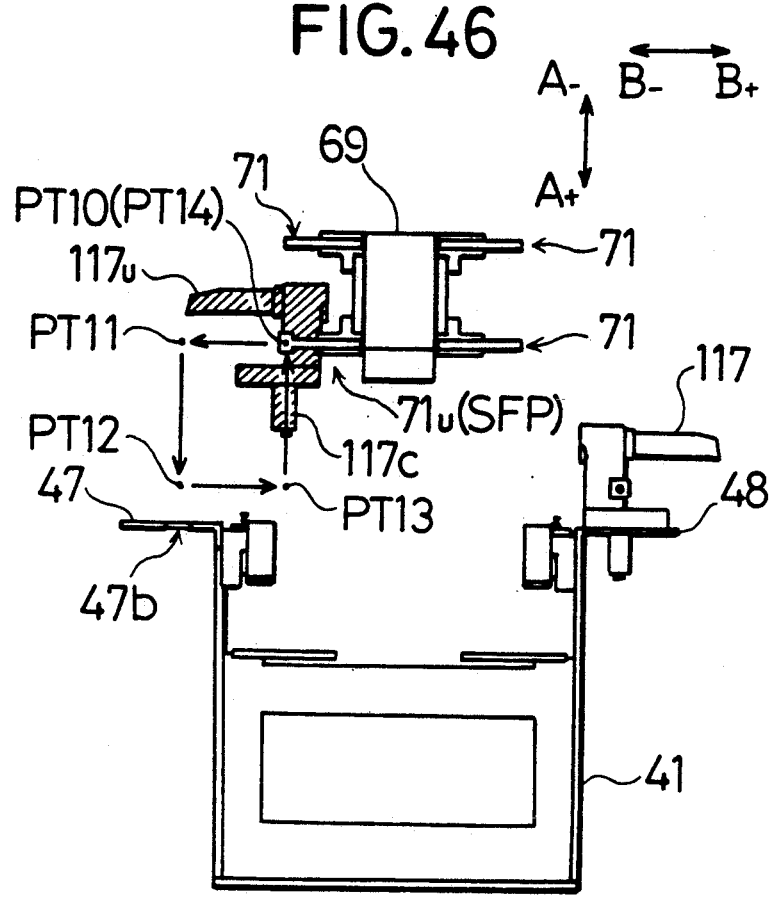
Figure 47:
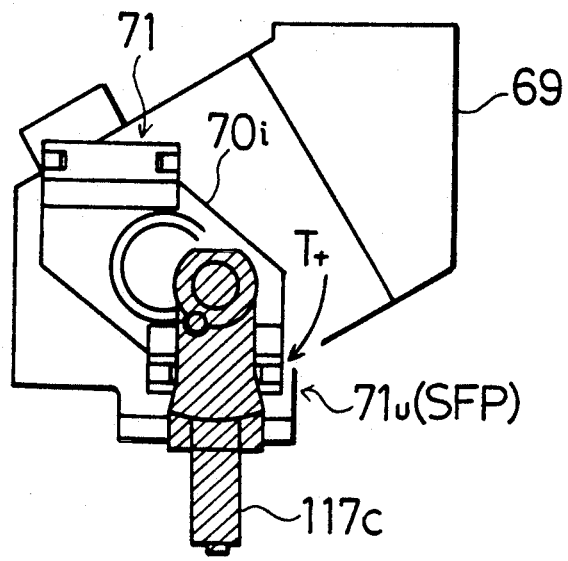

The tool exchange to the turret tool rests 21, 22 has not yet finished, when the tool hand 69 has been installed on the gantry robot 61. Therefore, the program returns to Step SA5 from Step SA6 of FIG.33(a) or (b). The program further proceeds to a tool exchange program TCP, as shown in FIG.36. The cell control portion 82, on the basis of the tool exchange program TCP, drives and controls the stocker 41 through the pallet fork control portion 92 and drives and controls the gantry robot 61 through the gantry robot control portion 94, and drives and controls the hand positioning pins 25, 26 through the hand positioning pin control portion 95. Besides, the main machine control portion 97 drives and controls the turret tool rests 21, 22 through the tool rest control portion 108 delivering a waiting signal between the main machine control portion 97 and the cell control portion 82 so as to exchange the respective tools 117 of the first turret tool rest 21 and the second turret tool rest 22. On this occasion, the tool hand 69 is provided with two grippers 71 on each of both sides, right and left, of FIG.15, being respectively associated with the first turret tool rest 21 and the second turret tool rest 22. The exchange of the tools 117 of the first turret tool rest 21 side and the exchange of the tools 117 of the second turret tool rest 22 side may be performed together. However, as exchange of the tools 117 of the second turret tool rest 22 side is the same as exchange of the tools 117 of the first turret tool rest 21 side, the exchange of the tools 117 of the first turret tool rest 21 side will now be explained. At first, the tool hand 69 of the gantry robot 61 is positioned at a position PT0, that is, upper position of the movement path of the stocker 41 of FIG.37 (Step ST1 of FIG.36(a)). Thereafter, the stocker 41 is properly moved in the directions of the arrows $X_{4+}$ and $X_{4-}$ of FIG.8 so as to position a tool $117_N$ of a predetermined tool number TNO to be installed on the first turret tool rest 21("the new tool" hereinafter), put on a predetermined place 47a, at the delivery position GTP (Step ST2). The rotation stop pin 70h of the gantry robot 61, as shown in FIG.17, is retracted in the direction of the arrow $KT_-$ and the driving motor 63 provided in the arm 62, as shown in FIG. 14, is rotated in the direction of the arrow $M_+$ so as to turn the grippers 71 of the tool hand 69, 90 degrees in the direction of the arrow $T_+$ of FIG.17 together with the Geneva gear 70g. The rotation stop pin 70h is projected in the direction of the arrow $KT_+$ so as to fit in the engagement hole 70g' of the Geneva gear 70g. Then, of the two grippers 71, associated with the first turret tool rest 21, as shown in FIG.38, one is positioned at the stocker facing position SFP so as to fix (Step ST3). Then, the operation rod 71e of the gripper $71_N$, positioned at the stocker facing position SFP, faces the operation pin 69f of the casing 69b side, as shown in FIG.15. Thereafter, the tool hand 69 is lowered to the position PT1 of the height of the tool $117_N$ on the stocker 41 in the direction of the arrow $A_+$ of FIG.37 (Step ST4). When the operation pin 69f, as shown in FIG.15, is projected in the direction of the arrow $MM_+$ and the operation rod 71e is pressed in the direction of the arrow $NM_+$ against elasticity of the spring 71f, the arms 71a, 71a, as shown in FIG.19, in the direction of the arrow $N_+$ through the spring 71c, and the engagement rods 71d, 71d following the tapered portion 71e' of the operation rod 71e (Step ST5). Next, in such a state that the arms 71a, 71a open, the tool hand 69 is moved to a position PT2 in the direction of the arrow $B_-$ of FIG.37 and the gripper $71_N$ is approached to the new tool $117_N$ on the stocker 41, inserting the new tool $117_N$ between the arms 71a, 71a from the upper and lower directions of FIG.19 (Step ST6). When the operation pin 69f, as shown in FIG.19, is retracted in the direction of the arrow $MM_-$, the operation rod 71e is pressed in the direction of the arrow $NM_-$ by the spring 71f. Then, the arms 71a, 71a are closed in the direction of the arrow $N_-$ against elasticity of the spring 71c following the tapered portion 71e' of the operation rod 71e through the engagement rods 71d, 71d. The gripper $71_N$ holds the new tool $117_N$ engaging three engagement holes 71b with three held projections 117b (Step ST7). Thereafter, when the tool hand 69 is lifted up to a position PT3 in the direction of the arrow $A_-$ of FIG.37 holding the new tool $117_N$ with the gripper $71_N$, the new tool $117_N$ is picked out from the stocker 41 pulling the shank 117c out of the shank hole 47b (Step ST8). The tool hand 69 is moved to a position PT4 in the direction of the arrow $B_+$ (Step ST9) and the gripper 71 is turned 90 degrees in the direction of the arrow $T_-$ of FIG.39 so as to position and fix the gripper $71_U$, with which the new tool $117_N$ isn't held, at the turret facing position TFP (Step ST10). Then, the operation rod 71e of the gripper $71_U$, positioned at the turret facing position TFP, faces the operation pin 69f of the casing 69b side, as shown in FIG.15. On this occasion, the shank 117c of the new tool $117_N$, held by the other gripper $71_N$, is transverse, as shown in FIG.39. Thereafter, the tool hand 69 is moved to a position PT5 in the direction of the arrow $B_+$ of FIG.1 so as to carry the new tool $117_N$, picked out of the stocker 41, to the main machine 2 side (Step ST11). In case where the above exchange is performed together with the exchange of the tool 117 of the second turret tool rest 22, as mentioned above, the new tool $117_N$ is picked out of the first tool storing portion 47 by the gripper 71 on the left side of the tool hand 69 of FIG.37 and the new tool $117_N$ is picked out of the second tool storing portion 48 by the gripper 71 on the right side of the tool hand 69 of FIG.37, in a similar way. Two new tools $117_N$ are carried to the main machine 2 side from the stocker 41 holding with the tool hand 69 together. When the new tool $117_N$ has been carried to the main machine 2 side, the tool hand 69 is lowered to a position PT6 in the direction of the arrow $A_+$ of FIG.1 (Step ST12 of FIG.36(b)) and the tool hand 69 is moved to a position PT7 in the direction of the arrow $B_-$ in such a state that the arms 71a, 71a of the gripper $71_U$, with which the new tool $117_N$ isn't held, open (Step ST13). Then, the open gripper $71_U$ faces the first turret tool rest 21(Step ST14). Thereafter, the hand positioning pin 25 is projected in the direction of the arrow $P_+$ of FIG.40 and is engaged with the positioning hole 69e of the tool hand 69 so as to fix the tool hand 69 on the machine body 3 (Step ST15). While the new tool $117_N$ is carried to the main machine 2 by the gantry robot 61, the first turret tool rest 21 is properly turned in the directions of the arrows $D_+$ and $D_-$ so as to rotationally position the tool $117_U$ of a predetermined tool number TNO ("the old tool" hereinafter), unnecessary for this time of machining, of a plurality of tools 117 installed on the first turret tool rest 21, at an exchange position EXP (Step ST16). When the tool hand 69 has been fixed at the position PT7 by the hand positioning pin 25, the first turret tool rest 21 is moved in the direction of the arrow $X_{1+}$ of FIG. 41 in such a state that electric current supplying a driving motor (not shown) (As the driving motor is for cutting, its torque is high.) for moving the first turret tool rest 21 in X-axis direction (in the directions of the arrows $X_{1+}$ and $X_{1-}$ of FIG.2) is limited and its torque is limited (Step ST17) so as to approach the tool hand 69 (Step ST18). Then, as the old tool $117_U$ at the exchange position EXP of the first turret tool rest 21 is inserted between the open arms 71a, 71a of the gripper $71_U$, as shown in FIG.41, the arms 71a, 71a of the gripper $71_U$ are closed so as to hold the old tool $117_U$ with the tool hand 69 (Step ST19). After the holding condition of the old tool $117_U$ in the tool installation hole 21a of the first turret tool rest 21 is released (Step ST20 of FIG.33(c)), the first turret tool rest 21 is moved in the direction of the arrow $X_{1-}$ of FIG.42 in such a state the limit of torque of the driving motor is released (Step ST21) so as to remove from the tool hand 69 (Step ST22). Then, the old tool $117_U$ held with the tool hand 69 is pulled out of the tool installation hole 21a of the first turret tool rest 21. Thereafter, the grippers 71 of the tool hand 69 is turned 180 degrees together with the old tool $117_U$ and the new tool $117_N$ in the direction of the arrow $T_+$ of FIG.42 and the new tool $117_N$ is positioned and fixed at the turret facing position TFP facing the shank 117c to the tool installation hole 21a of the first turret tool rest 21, as shown in FIG.42 or FIG.43 (Step ST23). The first turret tool rest 21 is moved in the direction of the arrow $X_{1+}$ of FIG.44 in such a state the torque of the driving motor in X-axis direction is limited (Step ST24) so as to approach the tool hand 69 (Step ST25). Then, the shank 117c of the new tool $117_N$ held with the tool hand 69 is fitted into the tool installation hole 21a removing the old tool $117_U$ of the first turret tool rest 21. When the shank 117c is inserted, it is fixed in the tool installation hole 21a so as to hold. Then, the new tool $117_N$ is installed on the first turret tool rest 21 (Step ST26). On this occasion, the tool hand 69 of the gantry robot 61 can be correctly adjusted as regards the position of the grippers 71 (or the casing 69b) to the arm 62 through the adjusting members 66, 67. Besides, the tool hand 69 has been positioned and fixed on the machine body 3 by the hand positioning pin 25 (In case where there is no hand positioning pin 25, it is difficult to precisely position the tool hand 69 as the tool hand 69 is installed at the top end of the extending arm 62.). Therefore, the shank 117c of the new tool $117_N$ held with the gripper $71_N$, positioned at the turret facing position TFP, is precisely positioned in the tool installation hole 21a of the first turret tool rest 21. That is, insertion of the shank 117c of the new tool $117_N$ in the tool installation hole 21a is properly performed even if fitting is tight. Even if the adjustment of the position of the grippers $71_N$ to the arm 62 with the adjusting members 66, 67 is not proper and the shank 117c of the new tool $117_N$ isn't properly inserted into the tool installation hole 21a, hurt to the gantry robot 61 by pushing movement of the first turret tool rest 21 can be saved as the torque of the driving motor of the first turret tool rest 21 in X-axis direction is limited. Besides, hurt to the whole gantry robot 61 may be saved by forming dent portions 71h at the arms 71a of the grippers 71, as shown with two-dot long and two short dashes line of FIG.15, so as to hurt only the arms 71a portion in the above-mentioned case. Next, the gripper $71_N$ of the tool hand 69 is opened so as to release the holding of the new tool $117_N$ (Step ST27) and the first turret tool rest 21 is moved together with the new tool $117_N$ in the direction of the arrow $X_{1-}$ of FIG.45 in such a state that the limit of the torque of the driving motor in X-axis direction is released (Step ST28 of FIG.33(d)) so as to remove from the tool hand 69 (Step ST29). The hand positioning pin 25 is retracted in the direction of the arrow $P_-$ so as to release the fixed condition of the tool hand 69 to the machine body 3 (Step ST30). In case where the above exchange is performed together with the exchange of the tools 117 of the second turret tool rest 22, in this stage, the tool hand 69 is horizontally moved in the direction of the arrow $B_-$ of FIG.43 so as to face the gripper 71 on the right side of the tool hand 69 of FIG.43 to the second turret tool rest 22 and the hand positioning pin 26, as shown in FIG.1, is projected in the upper direction of the figure so that the tool hand 69 is fixed on the machine body 3. And the second turret tool rest 22 is properly moved in the directions of the arrows $X_{2+}$ and $X_{2-}$ of FIG.2. Then, the old tool $117_U$ of the second turret tool rest 22 is exchanged for the new tool $117_N$. Next, the tool hand 69 is moved to a position PT8 in the direction of the arrow $B_+$ of FIG.1 (Step ST31), the open gripper $71_N$ is closed (Step ST32) and the tool hand 69 is lifted up to a position PT9 in the direction of the arrow $A_-$ (Step ST33). Thereafter, the tool hand 69 is moved to a position PT10 in the direction of the arrow $B_-$ of FIG.46 and the old tool $117_U$ removed from the first turret tool rest 21 is carried to the stocker 41 side (Step ST34). In case where the exchange of the tools 117 to both of the turret tool rests 21, 22 is performed together, two old tools $117_U$ are carried to the stocker 41 side from the main machine 2 holding with the tool hand 69 together. When the old tool $117_U$ is carried to the stocker 41 side, the stocker 41 is properly moved in the directions of the arrows $X_{4+}$ and $X_{4-}$ of FIG.8 so as to position a predetermined place 47a to be stored the old tool $117_U$ at the delivery position GTP (Step ST35). The gripper 71 of the tool hand 69 is turned 90 degrees in the direction of the arrow $T_+$ of FIG.47 so as to position and fix the old tool $117_U$, held with the tool hand 69, at the stocker facing position SFP facing the shank 117c toward the lower hand of the figure (Step ST36). The tool hand 69 is moved to a position PT11 in the direction of the arrow $B_-$ of FIG.46 so as to position the shank 117c of the old tool $117_U$ on the upper hand of the figure of the shank hole 47b, positioned at the delivery position GTP (Step ST37). The tool hand 69 is lowered to a position PT12 in the direction of the arrow $A_+$ and the old tool $117_U$ is put on the predetermined place 47a inserting the shank 117c into the shank hole 47b (Step ST38 of FIG.33(e)). Thereafter, the gripper $71_U$ is opened so as to release the holding of the old tool $117_U$ with the hand tool 69 (Step ST39), and the tool hand 69 is moved to a position PT13 in the direction of the arrow $B_+$ (Step ST40). The gripper $71_U$ is closed (Step ST41), the tool hand 69 is lifted up to a position PT14 in the direction of the arrow $A_-$ (Step ST42) and the gripper 71 is turned 270 degrees in the direction of the arrow $T_-$ (Step ST43). Then, the tool exchange program TCP finishes. In case where the exchange of the tools 117 of the second turret tool rest 22 is also performed with the above exchange, as mentioned above, the old tool $117_U$, held with the gripper 71 on the left side of the tool hand 69 of FIG.46, as mentioned above, is stored in the first tool storing portion 47 and in a similar way the old tool $117_U$, held with the gripper 71 on the right side of the tool hand 69 of FIG.46, is stored in the second tool storing portion 48 and then the tool exchange program TCP finishes.

In case of exchange of the tool 117, the system data $SD_T$ concerning the turret tool rests 21, 22, and the system data $SD_{ST}$ concerning the tool storing portions 47, 48, stored in the system data memories 84, 99, are exchanged transferring the tool ID data TIDD concerning the exchanged tools 117 between the cell control portion 82 and the main machine control portion 97. When exchange of the old tool $117_U$ for the tool $117_N$ in the first turret tool rest 21 and the second turret tool rest 22 finishes, the cell control portion 82 writes the newest tool ID data TIDD concerning each old tool $117_U$, stored in the system data memories 84, 99, in the tool ID 117a of each old tool $117_U$, stored in the stocker 41, through the pallet fork control portion 92, the ID data input/output control portion 90 and the R/W head 56, in a similar way to the above-mentioned readout of the tool ID data TIDD out of the tool ID 117a of the tool 117. That is, of the tool ID data TIDD concerning each tool 117, the tool ID data TIDD, stored in the system data memories 84, 99 in the turning cell 1 as the system data SD, are updated each time when the tool 117 is used in the main machine 2. However, the tool ID data TIDD stored in the tool ID 117a of each tool 117 are not updated while each tool 117 is installed on the main machine 2. Therefore, when each tool 117 is returned to the stocker 41, the tool ID data TIDD in the tool ID 117a are updated, collectively.

Figure 48B:
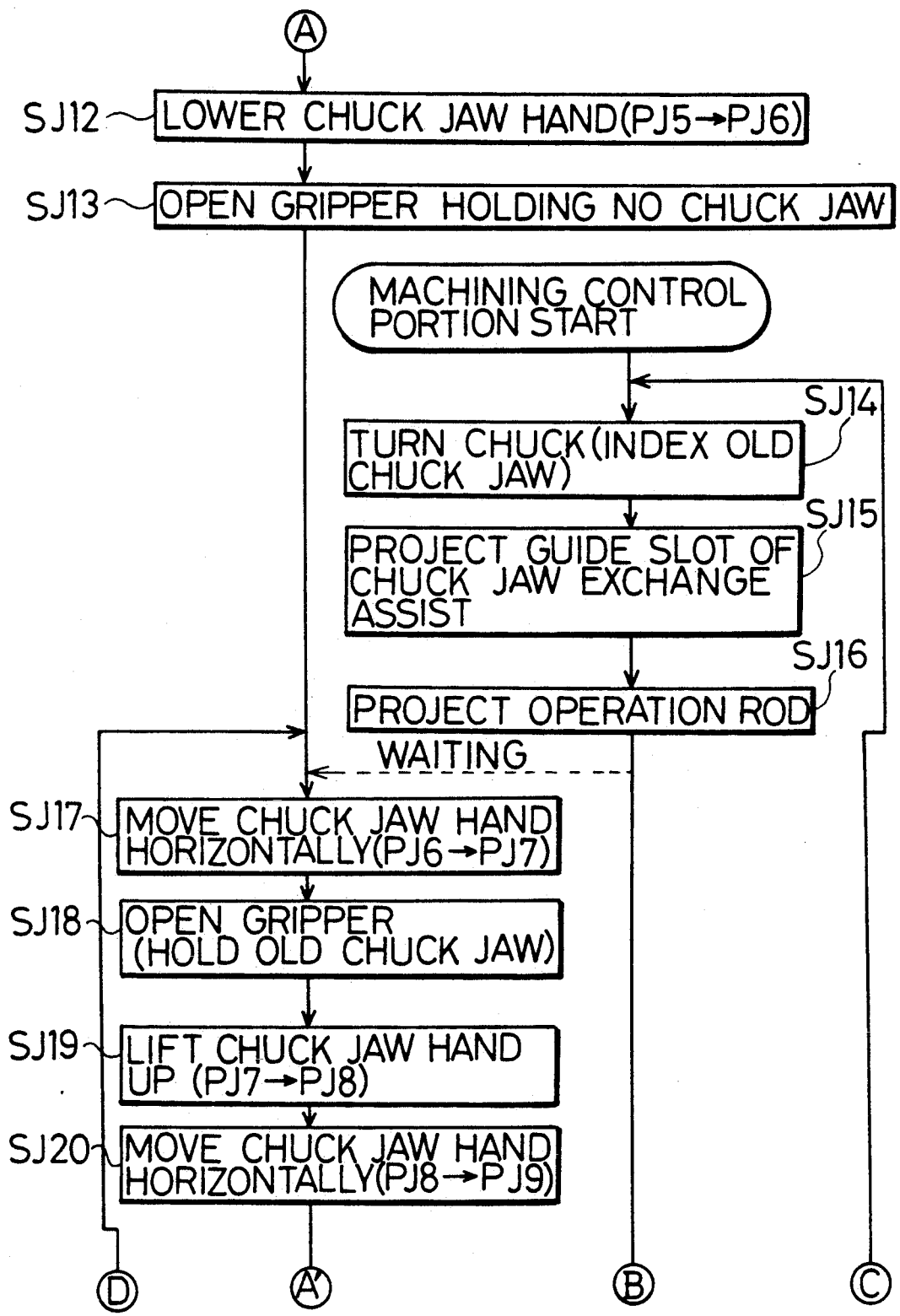
FIG. 48 is a flowchart showing a chuck jaw exchange program.
Figure 48C:
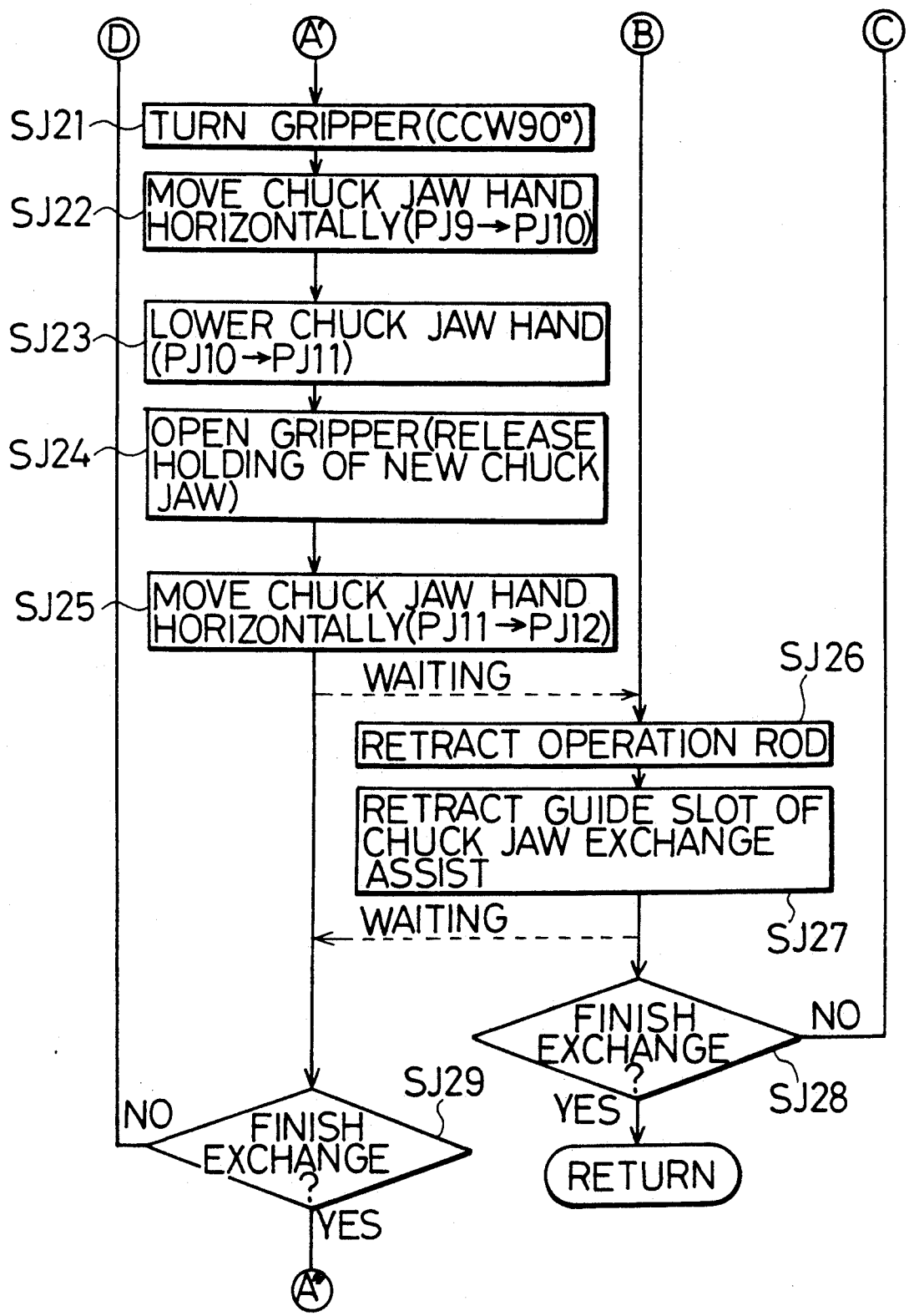
Figure 48D:
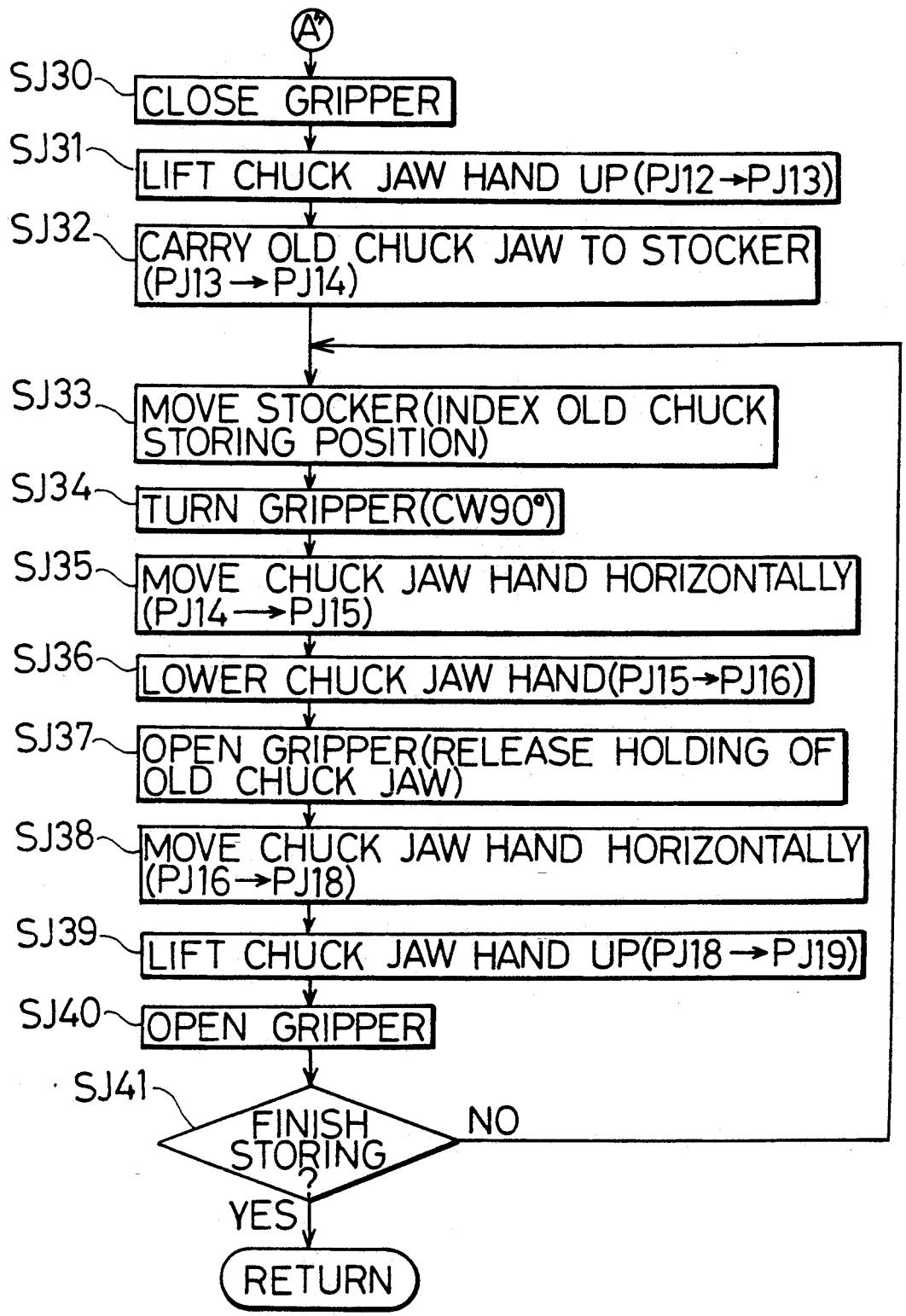
Figure 49:
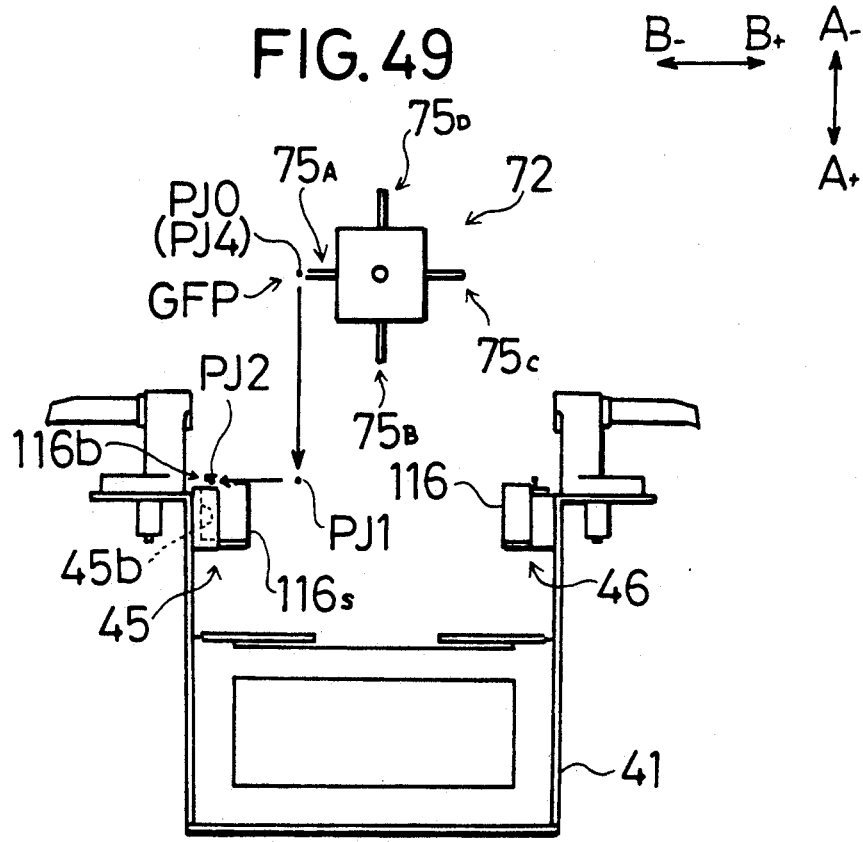
Figure 50:
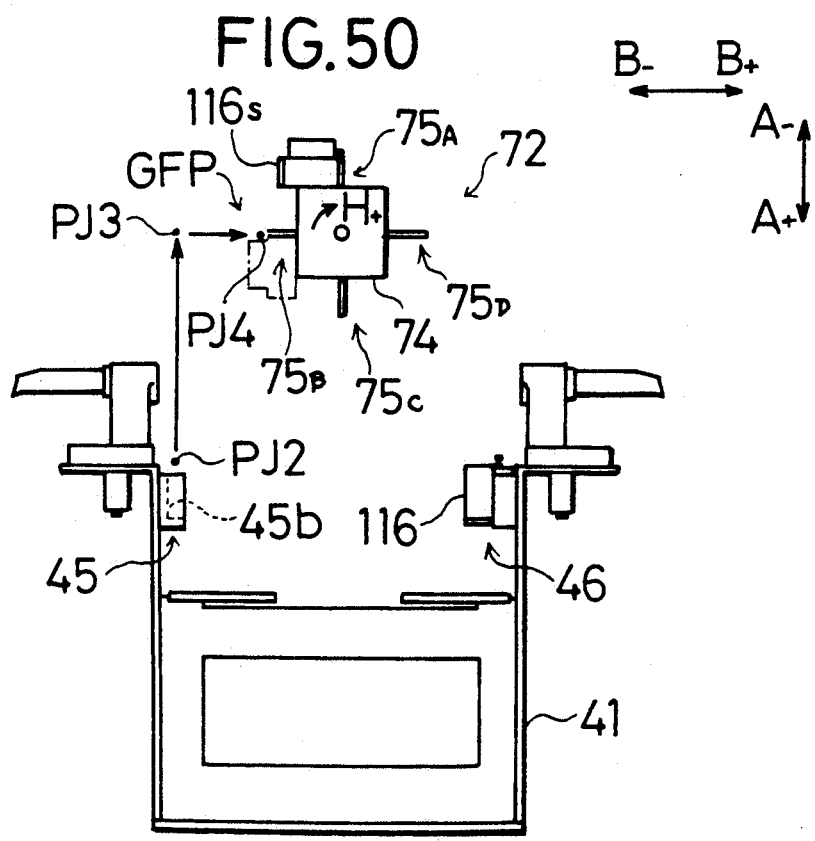
Figure 51:
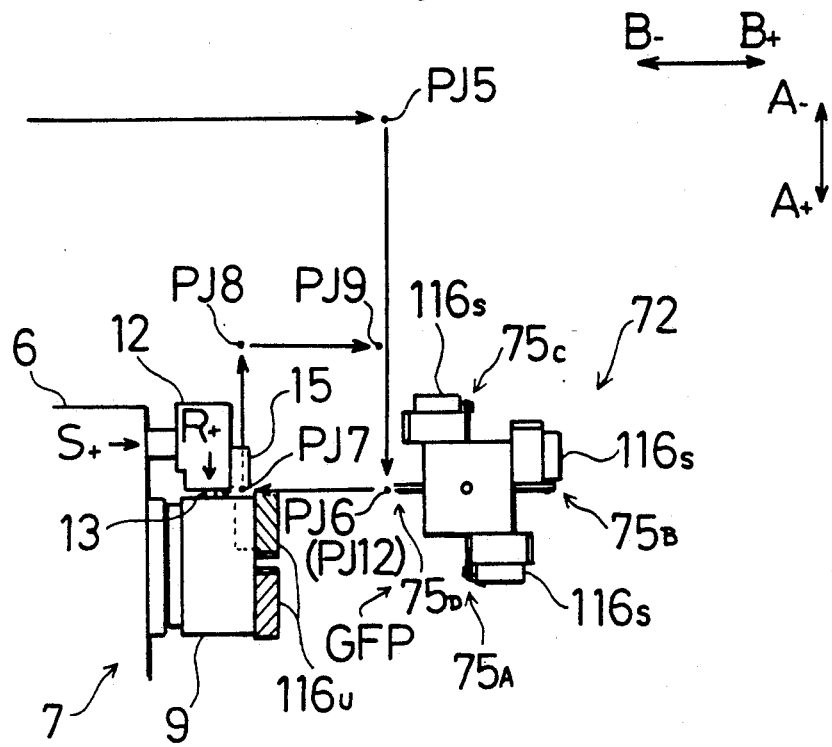
Figure 52:
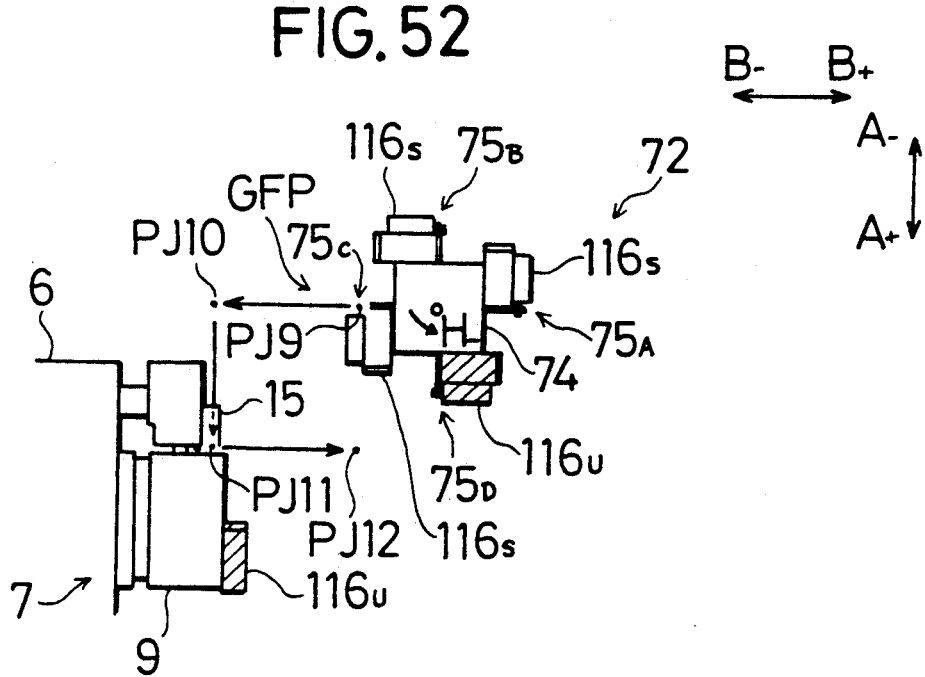
Figure 53:
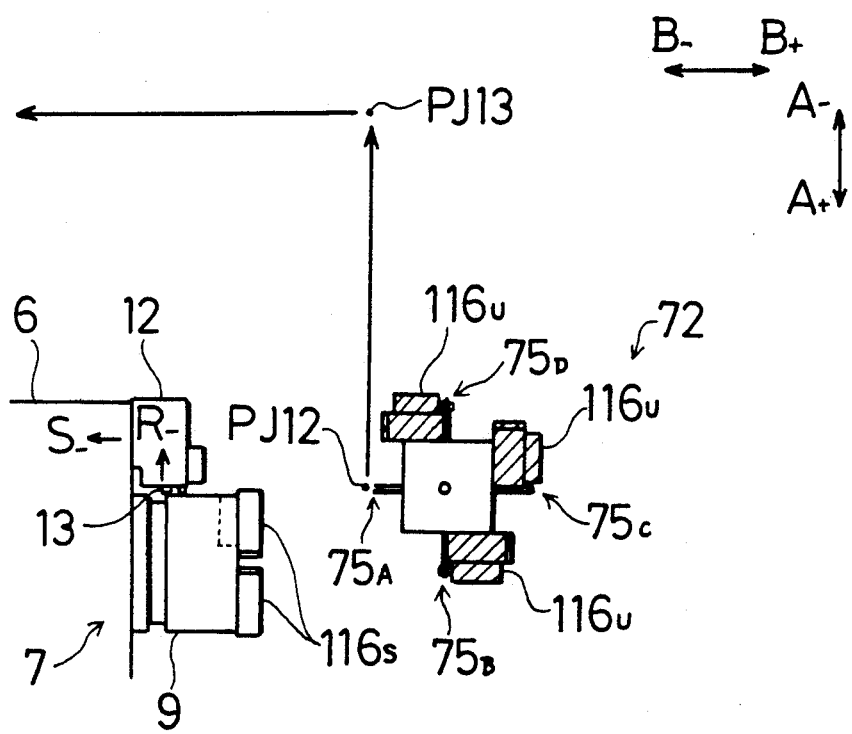

The exchange of the chuck jaws 116 of the chucks 9, 19 will now be explained. Prior to the exchange of the chuck jaws 116, the program proceeds to a hand exchange program HCP from Steps SA6, SA5 of FIG. 33(a) or (b). In a similar way to the case of the exchange of the tool 117, the tool hand 69, installed on the gantry robot 61, is exchanged for the chuck jaw hand 72, being suitable for holding of the chuck jaw 116. When the chuck jaw hand 72 has been installed on the gantry robot 61, the program proceeds to a chuck jaw exchange program TJCP, as shown in FIG.48, from Steps SA6, SA5. The cell control portion 82, on the basis of the chuck jaw exchange program TJCP, drives and controls the stocker 41 through the pallet fork control portion 92 and drives and controls the gantry robot 61 through the gantry robot control portion 94. Besides, the main machine control portion 97 drives and controls the chuck jaw exchange assists 12 through the chuck jaw exchange assist control portion 109 and drives and controls the workpiece spindles 7, 17 and the chucks 9, 19 through the spindle control portion 106 delivering a waiting signal between the cell control portion 82 and the main machine control portion 97 so as to exchange respective chuck jaws 116 of the chucks 9, 19 of the first and second headstocks 6, 16 sides. As the exchange of the chuck jaws 116 of the chuck 19 of the second headstock 16 side is the same as the exchange of the chuck jaws 116 of the chuck 9 of the first headstock 6 side, the exchange of the chuck jaws 116 of the chuck 9 of the first headstock 6 side will now be explained, hereinafter. At first, the chuck jaw hand 72 of the gantry robot 61 is positioned at a position PJO on the upper hand of the movement path of the stocker 41 of FIG.49 (Step SJ1 of FIG.48(a)). The stocker 41 is properly moved in the directions of the arrows $X_{4+}$ and $X_{4-}$ of FIG.8, so as to position a chuck jaw $116_S$ ("the new chuck" hereinafter) of a predetermined chuck jaw number TJNO, put on a predetermined place 45a, to be installed on the chuck 9, at the delivery position GTP (Step SJ2). Thereafter, the chuck jaw hand 72 is lowered to a position PJ1 of the height of the chuck jaws $116_S$ in the stocker 41 in the direction of the arrow A. of FIG.49 (Step SJ3). Of the four grippers 75 of the chuck jaw hand 72, the arms 75a, 75a of the grippers $75_A$, positioned at a slot facing position GFP, are opened in the direction of the arrow $Q_+$ of FIG.22 (Step SJ4). Thereafter, the chuck jaw hand 72 is moved to a position PJ2 in the direction of the arrow $B_-$ of FIG.49 in such a state that the arms 75a, 75a of the gripper $75_A$ open, and the gripper $75_A$ is approached to the new chuck jaw $116_S$, stored in the stocker 41 inserting the held portion 116b of the new chuck jaw $116_S$, projecting from the slot 45b on the upper hand of the figure between the arms 75a, 75a (Step SJ5). The arms 75a, 75a of the gripper $75_A$ are closed in the direction of the arrow $Q_-$ of FIG.22 so as to hold the new chuck jaw $116_S$ engaging the arms 75a, 75a with the slots 116c, 116c of the held portion 116b, as shown in FIG.26 (Step SJ6). When the chuck jaw hand 72 is lifted up to a position PJ3 in the direction of the arrow $A_-$ of FIG.50 holding the new chuck jaw $116_S$ with the gripper $75_A$, the new chuck jaw $116_S$ is picked out from the stocker 41 pulling out of the slot 45b (Step SJ7). The chuck jaw hand 72 is moved to a position PJ4 (PJO) in the direction of the arrow $B_+$ (Step SJ8). Thereafter, the driving motor 63 provided in the arm 62 of the gantry robot 61, as shown in FIG.14, is rotated and driven in the direction of the arrow $M_+$ such that the rolling portion 74 of the chuck jaw hand 72 is turned 90 degrees together with the Geneva gear 73e in the direction of the arrow $H_+$ of FIG.21. The rotation stop pin 73f is projected in the direction of the arrow $KH_+$ so as to engage with the engagement hole 73e' of the Geneva gear 73e and the gripper $75_B$, with which the chuck jaw 116 has not yet been held, is positioned and fixed at the slot facing position GFP, as shown in FIG.50 (Step SJ9). In a similar way to the above-mentioned picking out of the new chuck jaw $116_S$ by the gripper $75_A$, the three new chuck jaws $116_S$ are picked out of the stocker 41 in such a manner that the second new chuck jaw $116_S$ is picked out of the stocker 41 holding with the gripper $75_B$ and the third new chuck jaw $116_S$ is picked out of the stocker 41 holding with the gripper $75_C$ (Step SJ10). Then, the chuck jaw hand 72 is in such a state that three grippers $75_A$, $75_B$, $75_C$ of the four grippers 75 hold the three new chuck jaws $116_S$, respectively and remaining one gripper $75_D$ holds no chuck jaw and is positioned at the slot facing position GFP, as shown in FIG.51. The chuck jaw hand 72 is moved to the position PJ5 in the direction of the arrow $B_+$ of FIG.51 and the three new chuck jaws $116_S$, picked out of the stocker 41, are carried to the main machine 2 side (Step SJ11). When the new chuck jaws $116_S$ have been carried to the main machine 2 side, the chuck jaw hand 72 is lowered to a position PJ6 of the height of the chuck 9 in the direction of the arrow $A_+$ (Step SJ12 of FIG.48(b)) and the arms 75a, 75a of the gripper $75_D$, holding no chuck jaw 116, positioned at the slot facing position GFP, are opened (Step SJ13). While the new chuck jaws $116_S$ are carried to the main machine 2 from the stocker 41, the first headstock 6 is positioned at a predetermined jaw exchange position in the directions of the arrows $Z_{1+}$ and $Z_{1-}$ of FIG.2. At the same time, a workpiece spindle 5 is properly rotated in the directions of the arrows $C_{1+}$ and $C_{1-}$ of FIG.5 so as to position one old chuck jaw $116_U$ of three chuck jaws $116_U$ ("the old chuck jaw" hereinafter) of predetermined chuck jaw numbers TNO, unsuitable for holding of the workpieces 120 to be machined this time, installed on the chuck 9, at an exchange position EXPJ (Step SJ14). Thereafter, the chuck jaw exchange assist 12, on the first headstock 6, is projected in the direction of the arrow $S_+$ of FIG.51 so as to match the guide slot 15 of the chuck jaw exchange assist 12, as shown in FIG.4, with the slot 9a of the chuck 9, into which the old chuck jaw $116_U$ is inserted, positioned at the exchange position EXPJ (Step SJ15). The operation rod 13 of the chuck jaw exchange assist 12 is projected in the direction of the arrow $R_+$ of FIG.3 or FIG.51 so as to push the rock pin 11 of the chuck 9 in the direction of the arrow $JR_+$ of FIG.3. The engagement between the closing and opening operation member 10 and the old chuck jaw $116_U$ is released. Then, the old chuck jaw $116_U$ can move in the slot 9a of the chuck 9 in the directions of the arrows $J_+$ and $J_-$ (Step SJ16). On this occasion, the old chuck jaw $116_U$ is provisionally and elastically held by a spring and the like in the slot 9a if the engagement with the closing and opening chuck 9. When the old chuck jaw $116_U$, positioned at the exchange position EXPJ of the chuck 9, and the gripper $75_D$, positioned at the slot facing position GFP of the chuck jaw hand 72, face each other, the chuck jaw hand 72 is moved to a position PJ7 in the direction of the arrow $B_-$ of FIG.51 in such a state that the gripper $75_D$ opens, and the gripper $75_D$ is approached to the old chuck jaw $116_U$ installed on the chuck 9, inserting the held portion 116b between the arms 75a, 75a of the gripper $75_D$ (Step SJ17). The arms 75a, 75a of the gripper $75_D$ of the chuck jaw hand 72 are closed so as to hold the old chuck jaw $116_U$ through the held portion 116b (Step SJ18). The chuck jaw hand 72 is lifted up to a position PJ8 in the direction of the arrow $A_-$ of FIG.51 holding the old chuck jaw $116_U$ (Step SJ19). Then, the old chuck jaw $116_U$ is pulled out of the slot 9a in the direction of the arrow $J_+$ of FIG.3 and removed from the chuck 9 passing through the inside of the guide slot 15. The chuck jaw hand 72 is moved to a position PJ9 in the direction of the arrow $B_+$ of FIG.51 (Step SJ20) and the rolling portion 74 is rotated 90 degrees in the direction of the arrow $H_-$ of FIG.52 so as to position and fix the new chuck jaw $116_S$, held with the gripper $75_C$, at the slot facing position GFP (Step SJ21 of FIG.48(c)). Next, the chuck jaw hand 72 is moved to a position PJ10 in the direction of the arrow $B_-$ of FIG.52 so as to position the new chuck jaw $116_S$, positioned at the slot facing position GFP, on the upper hand of the figure of the guide slot 15 and the slot 9a of the chuck 9 (Step SJ22). When the chuck jaw hand 72 is lowered to a position PJ11 in the direction of the arrow $A_+$, the new chuck jaw $116_S$ is inserted into the slot 9a of the chuck 9 passing through inside of the guide slot 15 (Step SJ23). On this occasion, as the chuck jaw hand 72 is installed on the top end of the extending arm 62, it is difficult to precisely match the new chuck jaw $116_S$, held with the chuck jaw hand 72, with the slot 9a of the chuck 9 in this state. However, the chuck jaw hand 72 of the gantry robot 61 can be precisely adjusted as regards the positions of the grippers 75 when it is positioned at the slot facing position GFP with respect to the arm 62 through the adjusting members 66, 67 and is guided by the guide slot 15, having tapered end portions 15a, 15b. Therefore, the new chuck jaw $116_S$ is properly inserted into the slot 9a matching with the slot 9a of the chuck 9. When the new chuck jaw $116_S$ is inserted into the slot 9a, the gripper $75_C$ is opened so as to release the holding of the new chuck jaw $116_S$ with the chuck jaw hand 72 (Step SJ24). The chuck jaw hand 72 is moved to a position PJ12 (PJ6) in the direction of the arrow $B_+$ of FIG.52 (Step SJ25). On this occasion, the new chuck jaw $116_S$ is elastically and provisionally held with a spring and the like in the slot 9a. Thereafter, the operation rod 13 of the chuck jaw exchange assist 12 is retracted in the direction of the arrow $R_-$ of FIG.3, the closing and opening operation member 10 of the chuck 9 is engaged with the new chuck jaw $116_S$, inserted in slot 9a, so as to certainly install the new chuck jaw $116_S$ on the chuck 9 (Step SJ26) and the chuck jaw exchange assist 12 is retracted in the direction of the arrow $S_-$ (Step SJ27). When the new chuck jaw $116_S$ is installed on the chuck 9, the gripper $75_C$ with which the new chuck jaw $116_S$ has been held theretofore, holds no chuck jaw at the slot facing position GFP. Therefore, in a similar way to the case of the gripper $75_D$, as mentioned above, the workpiece spindle 7 and the chuck 9 are properly rotated in the directions of the arrows $C_{1+}$ and $C_{1-}$ of FIG.5 so as to position the remaining old chuck jaw $116_U$ at the exchange position EXPJ, the old chuck jaw $116_U$ is removed from the chuck 9 with the gripper $75_C$ and the new chuck jaw $116_S$, held with the gripper $75_B$, is installed on the chuck 9. Furthermore, the workpiece spindle 7 and the chuck 9 are properly rotated in the directions of the arrows $C_{1+}$ and $C_{1-}$ of FIG.5 so as to position the remaining old chuck jaw $116_U$ at the exchange position EXPJ. The old chuck jaw $116_U$ is removed from the chuck 9 with the gripper $75_B$ and the new chuck jaw $116_S$, held with the gripper $75_A$, is installed on the chuck 9. In this way, three old chuck jaws $116_U$, which were installed on the chuck 9, are exchanged for the three new chuck jaws $116_S$, which were held on the chuck jaw hand 72, one by one (Steps SJ28, SJ29). Then, in the chuck jaw hand 72, as shown in FIG.53, the three grippers $75_B$, $75_C$, $75_D$ of the four grippers 75 hold three old chuck jaws $116_U$, respectively and the remaining one gripper $75_A$ holds no chuck jaw. The open gripper $75_A$ is closed (Step SJ30 of FIG.48(d)). The chuck jaw hand 72 is lifted up to a position PJ13 in the direction of the arrow $A_-$ (Step SJ31) and is moved to a position PJ14 in the direction of the arrow $B_-$ of FIG.54, and the three old chuck jaws $116_U$, removed from the chuck 9, are carried to the stocker 41 side (Step SJ32). When the old chuck jaws $116_U$ have been carried to the stocker 41 side, the stocker 41 is properly moved in the directions of the arrows $X_{4+}$ and $X_{4-}$ of FIG.8 so as to position a predetermined place 45a, to be stored the old chuck jaws $116_U$, at the delivery position GTP (Step SJ33). Thereafter, the rolling portion 74 is turned 90 degrees in the direction of the arrow $H_+$ of FIG.54 so as to position and fix the old chuck jaws $116_U$, held with the gripper $75_B$, at the slot facing position GFP (Step SJ34). The chuck jaw hand 72 is moved to a position PJ15 in the direction of the arrow $B_-$ so as to position the old chuck jaws $116_U$, held with the gripper $75_B$, on the upper hand of the figure of the slot 45b, positioned at a delivery position GTP (Step SJ35). Thereafter, the chuck jaw hand 72 is lowered to a position PJ16 in the direction of the arrow $A_+$ and the chuck jaw $116_U$ is inserted in the slot 45b of the predetermined place 45a so as to put (Step SJ36). The gripper $75_B$ is opened so as to release the holding of the old chuck jaws $116_U$ with the chuck jaw hand 72 (Step SJ37). The chuck jaw hand 72 is moved to a position PJ17 in the direction of the arrow $B_+$ of FIG.55 (Step SJ38), the chuck jaw hand 72 is lifted up to a position PJ18 (PJ14) in the direction of the arrow $A_-$ (Step SJ39) and the gripper $75_B$ is closed (Step SJ40). In a similar way to the case of storage of the old chuck jaw $116_U$, which was held with the above-mentioned gripper $75_B$, in the stocker 41, the old chuck jaw $116_U$, held with the gripper $75_C$, is inserted in the slot 45b of a predetermined place 45a of the stocker 41 so as to put Furthermore, the old chuck jaw $116_U$, held with the gripper $75_D$, is inserted in the slot 45b of a predetermined place 45a of the stocker 41 so as to put, and the three old chuck jaws $116_U$, which were held with the chuck jaw hand 72, are stored in the stocker 41 (Step SJ41). Then the chuck jaw exchange program TJCP finishes. On this occasion, the exchange of the chuck jaws 116 of the chuck 9 of the first headstock 6 side and the exchange of the chuck jaws 116 of the chuck 19 of the second headstock 16 side can be performed together in such a manner that six chuck jaws 116 are together carried between the stocker 41 and the main machine 2 by providing the chuck jaw hand 72 with., for example, eight grippers 75 so as to hold six or more than six chuck jaws 116 with the chuck jaw hand 72, simultaneously (In case where each of the chucks 9, 19 has three jaws.).

In case of the exchange of the chuck jaws 116, the system data $SD_C$ concerning the chucks 9, 19, stored in the system data memories 84, 99, and the system data $SD_{SC}$ concerning the chuck jaw storing portions 45, 46 are exchanged for each other transferring the chuck jaw ID data TJIDD concerning the exchanged chuck jaws 116 between the cell control portion 82 and the main machine control portion 97. When the whole exchange of the old chuck jaws $116_U$ for the new chuck jaws $116_S$ to the chuck 9 of the first headstock 6 side and the chuck 19 of the second headstock 16 side finishes, the cell control portion 82 writes the newest chuck jaw ID data TJIDD concerning each old chuck jaw $116_U$, stored in the system data memories 84, 99, in the chuck jaw ID 116a of each of the old chuck jaws $116_U$, stored in the stocker 41, through the pallet fork control portion 92, the ID data input/output control portion 90 and the R/W heads 55 so as to update the chuck jaw ID data TJIDD in the chuck jaw ID 116a of each old chuck jaw $116_U$ in a similar way to readout of the chuck jaw ID data TJIDD out of the chuck jaw ID 116a of the chuck jaws 116, as mentioned hereinbefore.

In this way, when the exchange of the tools 117 finishes and the exchange of the chuck jaws 116 finishes, the program proceeds to the hand exchange program HCP from the Steps SA6, SA5 of FIG.33(a) or (b). In a similar way to the exchange to the tool hand 69, as mentioned hereinbefore, the chuck jaw hand 72, installed on the gantry robot 61 is exchanged for the workpiece hand 76, suitable for the holding of the workpiece 120. On this occasion, in case where a plurality of workpiece hands 76 are provided in the stocker 41, the chuck jaw hand 72 is exchanged for the workpiece hand 76 of a predetermined hand number HNO corresponding to the kind of the hand jaw 79, as mentioned hereinafter.

Figure 56B:
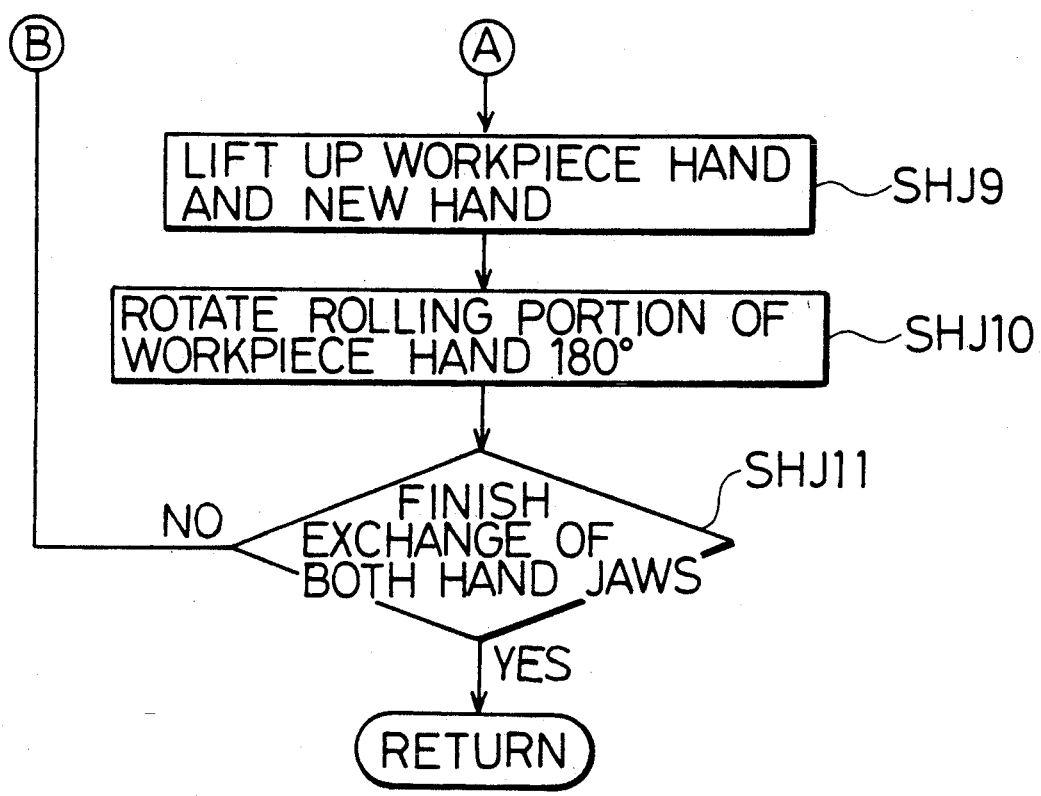
FIG. 56 is a flowchart showing a hand jaw exchange program.

When the workpiece hand 76 has been installed on the gantry robot 61, the program proceeds to a hand jaw exchange program HJCP, as shown in FIG.56, from Steps SA6, SA5. The cell control portion 82, on the basis of the hand jaw exchange program HJCP, drives and controls the stocker 41 through the pallet fork control portion 92 and drives and controls the gantry robot 61 through the gantry robot control portion 94 so as to exchange the hand jaws 79 of the workpiece hand 76. At first, the workpiece hand 76 of the gantry robot 61 is positioned on the upper hand of FIG.1 of the hand jaw storing portion 42 of the stocker 41 and the rolling portion 77 of the workpiece hand 76 is turned in the directions of the arrows $H_{2+}$ and $H_{2-}$ of FIG.28 so as to position and fix one of two hand jaws $79_U$ ("the old hand jaw" hereinafter) of a predetermined hand jaw number HJNO, unsuitable for holding of the workpieces 120 to be machined this time, installed on the rolling portion 77 of the workpiece hand 76, on the lower hand of FIG.1 (Step SHJ1 of FIG.56(a)). The stocker 41 is properly moved in the directions of the arrows $X_{4+}$ and $X_{4-}$ of FIG.8 so as to position a predetermined place 42a to be stored the old hand jaw $79_U$ at the delivery position GTP (Step SHJ2). Next, the workpiece hand 76 and the old hand jaw $79_U$ of the gantry robot 61 are lowered in the direction of the arrow $A_+$ of FIG.1 so as to put the old hand jaw $79_U$ on the hand jaw storing portion 42 of the stocker 41 (Step SHJ3). The hooks 77e, 77e of the gripper 77d of the workpiece hand 76 side are opened in the direction of the arrow $I_+$ of FIG.29 so as to release the engagement with the held pins 79d of the hand jaw 79 side. Then, the workpiece hand 76 and the old chuck jaw $79_U$ are separated from each other (Step SHJ4). Only the workpiece hand 76 of the gantry robot 61 is lifted up in the direction of the arrow $A_-$ of FIG. 1 so as to recede out of the movement area of the stocker 41 (Step SHJ5). On this occasion, the workpiece hand 76, from which the old chuck jaw $79_U$ is removed, appears facing the hand jaw installation face 77b, as shown in FIG.27, to the stocker 41 (on the lower hand of FIG.1). Thereafter, the stocker 41 is properly moved in the directions of the arrows $X_{4+}$ and $X_{4-}$ of FIG.8 so as to position a hand jaw $79_S$ ("the new hand jaw" hereinafter) of a predetermined hand jaw number HJNO, to be installed on the workpiece hand 76, put on a predetermined place 42a, at the delivery position GTP (Step SHJ6). The workpiece hand 76 is again lowered in the direction of the arrow $A_+$ of FIG.1 such that the hand jaw installation face 77b, as shown in FIG.27, abuts against the hand contacting face 79f of the new chuck jaw $79_S$, as shown in FIG.30, positioned at the delivery position GTP (Step SHJ7). On this occasion, the engagement pins 79c of the three jaws 79b, projecting from the hand contacting face 79f of the new chuck jaw $79_S$, as shown in FIG.30, are inserted in the operation slots 77c' of the jaw closing and opening operation plates 77c of the workpiece hand 76, as shown in FIG.27 and the held pins 79d, projecting from the hand contacting face 79f of the new chuck jaw $79_S$, are inserted between the open hooks 77e, 77e of the workpiece hand 76. Thereafter, the hooks 77e, 77e of the workpiece hand 76 side are closed in the direction of the arrow $I_-$ of FIG.29 so workpiece hand 76 (Step SHJ8). The workpiece hand 76 and the new hand jaw $79_S$ are lifted up in the direction of the arrow $A_-$ of FIG.1 (Step SHJ9 of FIG.56(b)) and the rolling portion 77 of the workpiece hand 76 is rotated 80 degrees in the direction of the arrow $H_{2+}$ of FIG.28 so as to position and fix the remaining old hand jaw $79_U$, installed on the rolling portion 77, facing the lower hand of FIG.1 (Step SHJ10). In a similar way to the above case, the old hand jaw $79_U$ is exchanged for the jaw $79_S$ and two new hand jaws $79_S$ are installed on the workpiece hand 76 (Step SHJ11). Then, the hand jaw exchange program HJCP finishes.

In this way, when the exchange of the hand jaw 79 of the workpiece hand 76 finishes, the program proceeds to Step SA7 from Step SA6 of FIG.33(b). The cell control portion 82 moves the stocker 41 to the control axis origin in the directions of the arrows $X_{4+}$ and $X_{4-}$ of FIG.8 through the pallet fork control portion 92 and projects the origin holding pin 51 of the stocker 41 in the direction of the arrow $V_+$ of FIG.7 through the stocker control portion 93 so as to fix the stocker 41 with respect to the bed 31. Then, the connecting pin 50 is retracted in the direction of the arrow $U_-$ so as to release the connecting state between the stocker 41 and the driving unit 35.

Figure 68:
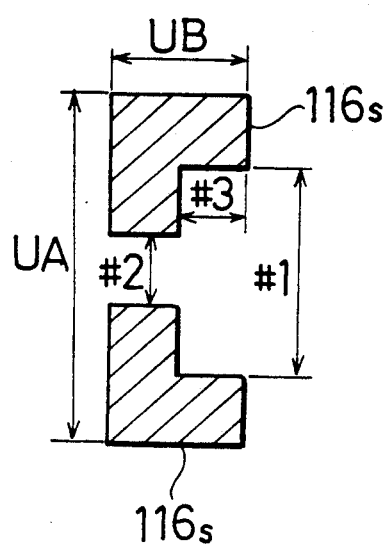
FIG. 68 is a view showing a chuck jaw on which soft-jaw forming is performed according to the soft-jaw forming program as shown in FIG. 67.

In Step SA8 of FIG.33(b), the main machine control portion 97 performs forming, of soft-jaws of the new chuck jaw $116_S$ on the basis of the chuck jaw ID data TJIDD concerning the exchanged new chuck jaw 116S, installed on the chucks 9, 19, transferred from the cell control portion 82. As a softjaw forming program number SJFPN, as shown in FIG.63, is stored in the chuck jaw ID data TJIDD, the main machine control portion 97 reads a soft-jaw forming program SJFP of the soft-jaw forming program number SJFPN, as shown in FIG.67, out of the soft-jaw forming program memory 101. Forming of soft-jaws of the new chuck jaws $116_S$, installed on the chucks 9, 19, as shown in FIG.68, is performed on the basis of the soft-jaw forming program SJFP corresponding to the workpiece 120 of a predetermined workpiece number WNO, to be machined, with dimension of each portion SFDD, stored in the chuck jaw ID data TJIDD, as parameters, as shown in FIG.63.

Figure 69:
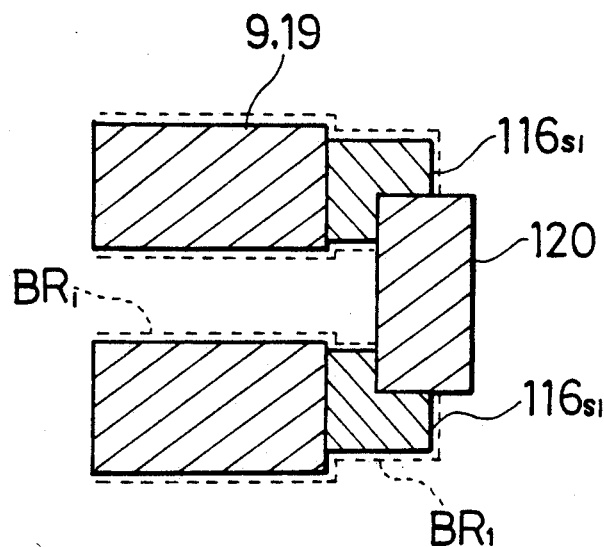
FIGS. 69 and 70 illustrate an example of barrier setting corresponding to a form of the chuck jaw.
Figure 70:
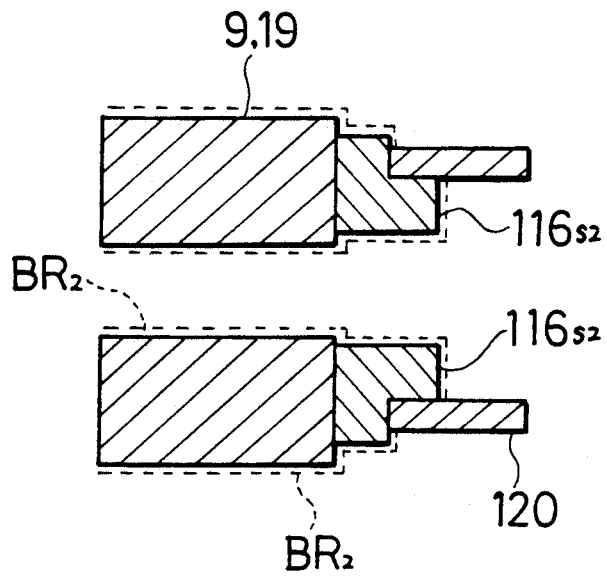

In Step SA9 of FIG.33(a), the main machine control portion 97 sets barrier BR (approach prohibition area of the tool 117 and the like in case of machining) for each of the chucks 9, 19 through the barrier set portion 103 on the basis of the chuck jaw ID data TJIDD concerning the exchanged new chuck jaw 116$_S$, installed on the chucks 9, 19, transferred from the cell control portion 82, corresponding to the form of the new chuck jaw 116$_S$ and the workpiece 120 of a predetermined workpiece number WNO to be machined, as shown in FIG.69 or FIG.70.

Figure 57:
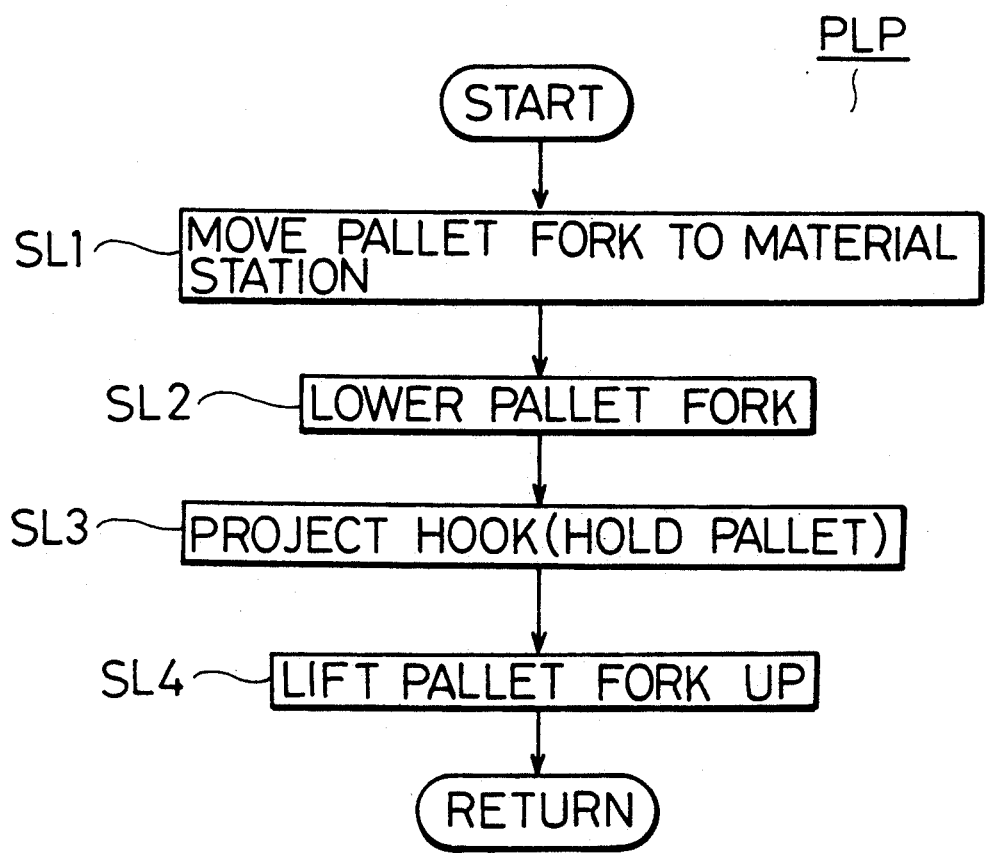
FIG. 57 is a flowchart showing a pallet loading program.

The cell control portion 82 removes the pallet 119 of the top position of FIG.7, on which the workpieces 120 of a predetermined workpiece number WNO are put, from the material station 32 through the pallet fork control portion 92 on the basis of a pallet loading program PLP, as shown in FIG.57. At first, the pallet fork 36 is moved to the material station 32 in the direction of the arrow X$_{3+}$ of FIG.8 (Step SL1). The pallet fork 36 is lowered to a position, from which the pallet 119 is picked out in the direction of the arrow Y$_+$ of FIG.7 (Step SL2). On this occasion, the lowering speed of the pallet fork 36 can be properly controlled according to the distance between the pallet 119 and the pallet fork 36 by computing, in advance, the position (height) of the pallet 119 to be picked out on the basis of the height PPHT of the pallet pins 119$p$ in the pallet ID data PIDD concerning each pallet 119. Thereafter, the hooks 37a of the arms 37 of the pallet fork 36 are projected in the direction of the arrow F$_+$ of FIG.10 and the pallet 119 is held with the hooks 37a from the lower hand of FIG.7 (Step SL3). The pallet fork 36 is lifted up to the Y-axis origin position Y0 together with the held pallet 119 in the direction of the arrow Y$_-$ (Step SL4). Then, the pallet loading program PLP finishes.

In Step SA10 of FIG.33(b), the main machine control portion 97 measures whether or not the cutting edge of a tool is damaged with respect to the tools 117, installed on the turret tool rests 21, 22, to be used for machining of the workpiece 120 of a predetermined workpiece number WNO, through the tool measurement portion 110 and a known tool measuring unit (not shown). If necessary, the program proceeds to Step SA12 from. Step SA11. In a similar way to the case of the exchange of the old tool 117$_U$ and the new tool 117$_N$, as mentioned hereinbefore, the tools 117, installed on the turret tool rests 21, 22, are exchanged for spare tools 117 of the same tool number TNO, stored in the stocker 41 by using the gantry robot 61 having tool hand 69, respectively.

In this way, when preparation of the machining on the workpieces 120 of a predetermined workpiece number WNO finishes, the workpieces 120, put on the pallet 119, picked out of the material station 32, are picked out and carried to the main machine 2 in Step SA13 of FIG.33(b) so as to hold the workpieces 120 with the chucks 9, 19. When a predetermined workpiece 120 is picked out of the pallet 119, the cell control portion 82 properly moves and drives the pallet fork 36 together with the pallet 119 in the directions of the arrows X$_{3+}$ and X$_{3-}$ of FIG.8 through the pallet fork control portion 92 on the basis of a workpiece putting situation information WPI in the pallet ID data PIDD, such as workpiece interval data, as shown in FIG.66, concerning the pallet 119, so as to position a predetermined workpiece 120 of a plurality of workpieces 120, put and ranged on the pallet 119, at the delivery position GTP. Besides, the gantry robot 61 is properly moved in the directions of the arrows B$_+$ and B$_-$ of FIG.7 through the gantry robot control portion 94 so as to position the workpiece hand 76 on the upper hand of a predetermined workpiece 120 in the figure. Then, the workpiece hand 76 is lowered in the direction of the arrow A$_+$ so as to hold the workpiece 120. In this way, the workpiece 120 is picked out by the joint operation of the pallet fork 36 and the gantry robot 61.

When the gantry robot 61 is driven and controlled, the carrier program of a predetermined carrier program number, designated in the pallet ID data PIDD concerning the workpiece 120 is selected in a plurality of carrier control programs and the driving and controlling of the gantry robot 61 are performed on the basis of the selected carrier program.

In Step SA14, the main machine control portion 97 makes the workpiece spindles 7, 17 rotated in the directions of the arrows C$_+$ and C$_-$ of FIG.1 through the spindle control portion 106, and makes the turret tool rests 21, 22 moved in the directions of the arrows X$_+$ and X$_-$ of FIG.2 through the tool rest control portion 108 and makes the headstocks 6, 16 moved in the directions of the arrows Z$_+$ and Z$_-$ of FIG.1 through the headstock control portion 107 according to a predetermined machining program PRO, selected on the basis of the pallet ID data PIDD so as to machine on the workpieces 120, held with the chucks 9, 19.

Figure 33C:
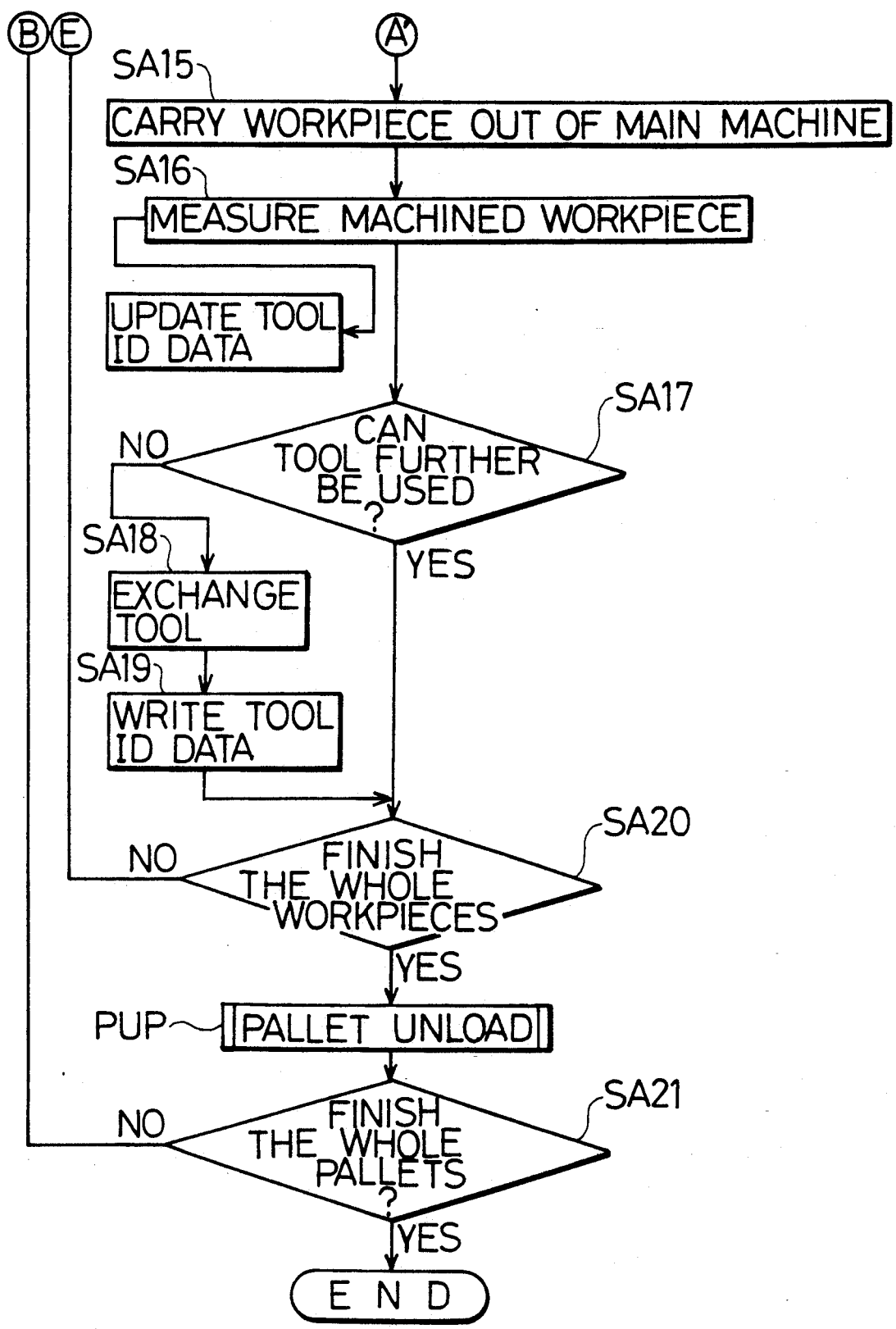

In this way, when the machining on the workpiece 120 finishes, the cell control portion 82 makes the machined workpiece 120 carried to the workpiece measuring unit (not shown) through the gantry robot control portion 94 and the gantry robot 61 and judges abrasion loss of the tools 117, which were used for machining by measuring the machining dimension of the machined workpiece 120 through the workpiece measurement portion 91, and updates the tool ID data TIDD of the tools 117 in the system data memories 84, 99 on the basis of the judged abrasion loss, in Step SA15 of FIG.33(c). The updated tool ID data TIDD are used as compensation data after next machining by the tools 117. On this occasion, as in this stage the tool ID data TIDD in the tool IDs 117a of the tools 117 aren't updated, the tool ID data TIDD in the system data memories 84, 99 and the tool ID data TIDD in the tool IDs 117a don't correspond with each other. Therefore, the difference between both becomes bigger as the tools 117 are used. The machined workpiece 120, finished measurement, is put on a predetermined position on the original pallet 119 by joint operation of the gantry robot 61 and the pallet fork 36, in a similar way to the picking the workpiece 120 out of the pallet 119, as mentioned hereinbefore.

In case where the judgement of the result of measurement of the machined workpiece 120 is that the abrasion loss of the tools 117 reaches a predetermined value and the tools 117 cannot be further used or using time and the like of the tools 117 reach tool life, the program proceeds to Step SA18 from Step SA17. The cell control portion 82 exchanges the tools 117 installed on the turret tool rest 21 or 22, which cannot be further used, for the spare tools 117 of the same tool number TNO, stored in the stocker 41, by using the gantry robot 61 having the exchanged tool hand 69, in a similar way to the case of the exchange of the old tool 117$_U$ and the new tool 117$_N$, as mentioned hereinbefore. When the tools 117, which can't be further used, are stored in the stocker 41, the cell control portion 82 writes so as to change the old tool ID data TIDD in the tool IDs 117a of the tools 117, which can't be further used, for the newest tool ID data TIDD concerning the tools 117 in the system data memories 84, 99 through the pallet fork control portion 92, the ID data input/output control portion 90 and the R/W head 56, in a similar way to the above-mentioned readout of the tool ID data TIDD out of the tool ID 117a of the tool 117. That is, in case of the management of the tool ID data TIDD concerning each tool 117, only the tool ID data TIDD in the system data memories 84, 99 are managed while the tools 117 are installed on the turret tool rest 21 or 22 of the main machine 2, the tool ID data TIDD in the tool IDs 117a or in the system data memory 84 are managed while the tools 117 are stored in the stocker 41, and only the tool ID data TIDD in the tool IDs 117a are managed while the tools 117 are outside of the turning cell 1. Accordingly, the tool ID data TIDD of a plurality of tools 117 can be properly managed without mistakes and flexibility of machining in the turning cell 1 increases.

Figure 58:
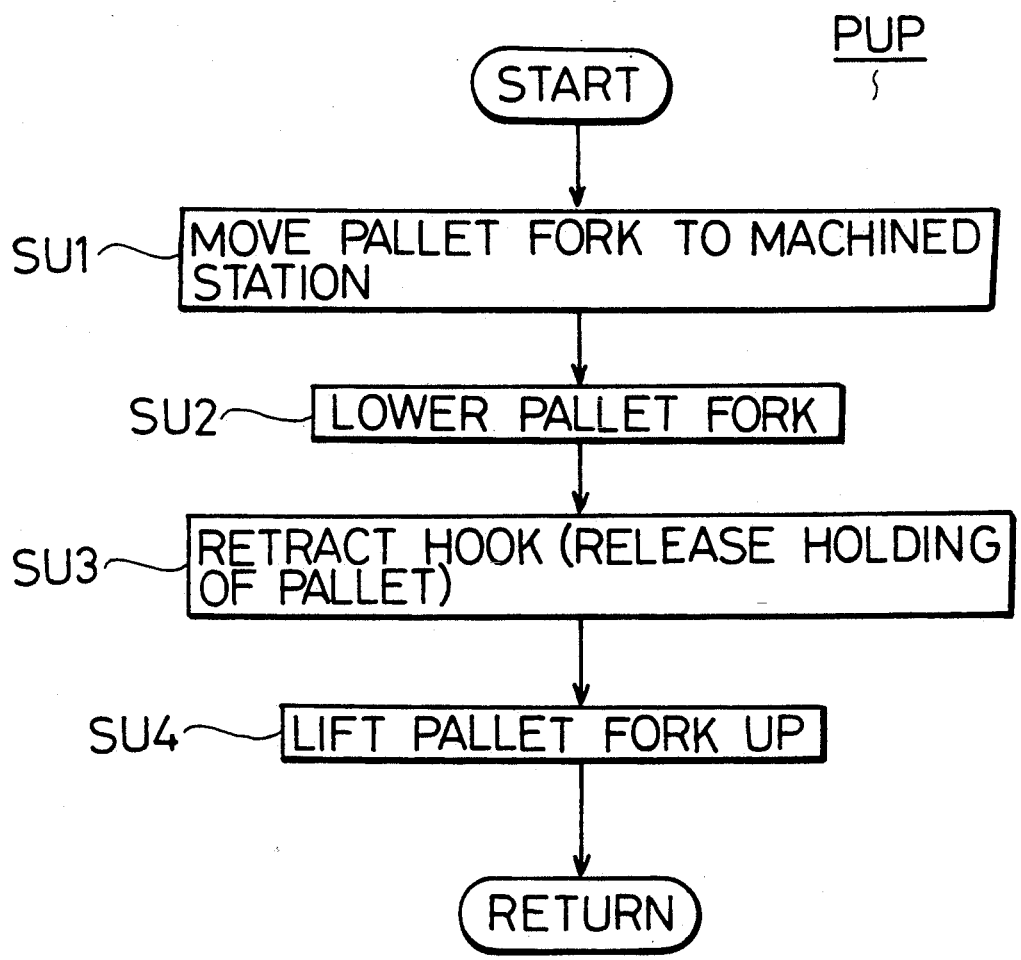
FIG. 58 is a flowchart showing a pallet unloading program.

The program proceeds to a pallet unloading program PUP, as shown in FIG.58, from Step SA20 of FIG.33(c), when machining is performed in such a manner that the tools 117 are properly exchanged if the cutting edge of each tool 117 is damaged or the tools 117 can't be further used, with respect to each workpiece 120 put on one pallet 119, and the whole machining on the predetermined numbers of the workpieces 120, put on the pallet 119, finishes and only the machined workpieces 120 are put on the pallet 119. Then, the cell control portion 82 makes the pallet 119, on which the machined workpieces 120 are put, moved to the machined station 33 through the pallet fork control portion 92. At first, the pallet fork 36 is moved together with the pallet 119 to the machined station 33 in the direction of the arrow $X_{3-}$ of FIG.8 (Step SU1) and lowered in the direction of the arrow $Y_+$ of FIG.7 so as to stack up the pallet 119, held with the pallet fork 36, on the pallet 119 of the top position, already put on the machined station 33 (Step SU2). On this occasion, the position (height) of the pallet 119 of the top position, already put on the machined station 33, can be computed in advance on the basis of the height PPHT of the pallet pins 119p in the pallet ID data PIDD concerning each pallet 119. Therefore, the lowering speed of the pallet fork 36 and the pallet 119, held with the pallet fork 36, can be properly controlled according to the distance between the held pallet 119 and another pallet 119 of the top position. Thereafter, the hooks 37a of the arms 37 of the pallet fork 36 are retracted in the direction of the arrow $F_-$ of FIG.10 so as to release the holding of the pallet 119 with the hooks 37a (Step SU3). The pallet fork 36 is lifted up to the Y-axis origin position Y0 in the direction of the arrow $Y_-$ of FIG.7 (Step SU4). Then, the pallet unloading program PUP finishes. On this occasion, the cell control portion 82 writes the measurement result of the machined workpieces 120 in the pallet ID 119a of the pallet 119, on which the machined workpieces 120 are put, as the pallet ID data PIDD through the ID data input/output control portion 90 and the R/W head 39.

Steps SA3 through SA21 of FIG.33 (a), (b) and (c) are repeated until machining on the workpieces 120 finishes with respect to the whole pallets 119, which are set in the machining schedule MSC, that is, until all the pallets 119 are moved to the machined station 33 from the material station 32. Concerning the different kinds (different workpiece numbers WNO) of workpieces 120, put on a plurality of pallets 119, machining is performed in such a manner that the tools 117 and the chuck jaws 116 of the main machine 2 are properly exchanged according to the machining contents of the workpieces 120 and the workpiece hands 76 and the hand jaws 79 of the gantry robot 61 are properly exchanged according to the forms of the workpieces 120. That is, if the kind of the workpiece 120, to be machined, is different from the kind of the workpiece 120 of a prior machining, it isn't necessary for an operator to manually arrange the chuck jaws 116, the tools 117 and the like in the main machine 2 prior to the machining on the different kind of workpiece 120. Therefore, so many mans are not necessary for machining.

In the above-described embodiment, it was mentioned that the R/W head 55, with which the chuck jaw ID data TJIDD were read out and written in the chuck jaw ID 116a of the chuck jaws 116, stored in the chuck jaw storing portions 45, of the stocker 41, and the R/W head 56, with which the tool ID data TIDD were read out and written in the tool ID 117a of the tools 117, stored in the tool storing portions 47, 48 were respectively provided. However, the group of the first chuck jaw storing portion 45 and the first tool storing portion 47 and the group of the second chuck jaw storing portion 46 and the second tool storing portion 48 are provided so as to be close to each other. Therefore, reading and writing of the chuck jaw ID data TJIDD and reading and writing of the tool ID data TIDD can be performed with common R/W heads. That is, in the above-described embodiment, it was mentioned that the R/W head 55, provided so as to face the chuck jaw IDs 116a, was turned in the direction of the arrow $E_-$ when the collision between the shanks 117c of the tools 117 and the R/W head 55 was saved, as shown in FIG.11. However, on this occasion, both of reading and writing of the chuck jaw ID data TJIDD to the chuck jaw IDs 116a and reading and writing of the tool ID data TIDD to the tool IDs 117a can be performed with the R/W head 55 in such a manner that the R/W head 55 is turned in the direction of the arrow $E_+$ so as to face the tool ID 117a. (That is, in this case the R/W heads 56 are unnecessary.)

In the above-described embodiment, it was mentioned that the judgement whether or not the stocker 41 is supplied with necessities of machining by indirectly comparing the tool ID data TIDD, the chuck jaw data TJIDD, the hand ID data, the hand jaw ID data HJIDD, respectively read out of ID 117a, 116a, 69a, 72a, 76a, 79a of each tool 117, each chuck jaw 116, each of the hands 69, 72, 76, each hand jaw 79, stored in the stocker 41, with the pallet ID data PIDD through the system operation data SOD, composed by an operator, was performed. However, the tool number TNO, the chuck jaw number TJNO, the hand number HNO, and the hand jaw number HJNO of the tool 117, the chuck jaw 116, the hands 69, 72, 76 and the hand jaw 79, each corresponding to the workpiece 120 put on the pallet 119, are stored in the pallet ID data PIDD, as shown in FIG.66. Therefore, the judgement whether or not the stocker 41 is supplied with necessities of machining by directly comparing the tool ID data TIDD, the chuck jaw data TJIDD, the hand ID data HIDD and the hand jaw ID data HJIDD, respectively read out of the ID 117a, 116a, 69a, 72a, 76a, 79a of each tool 117, each chuck jaw 116, each of hands 69, 72, 76, and each hand jaw 79, stored in the stocker 41, with the pallet ID data PIDD, read out of the pallet ID 119a of each pallet 119, stacked on the material station 32, may be performed.

Figure 71:
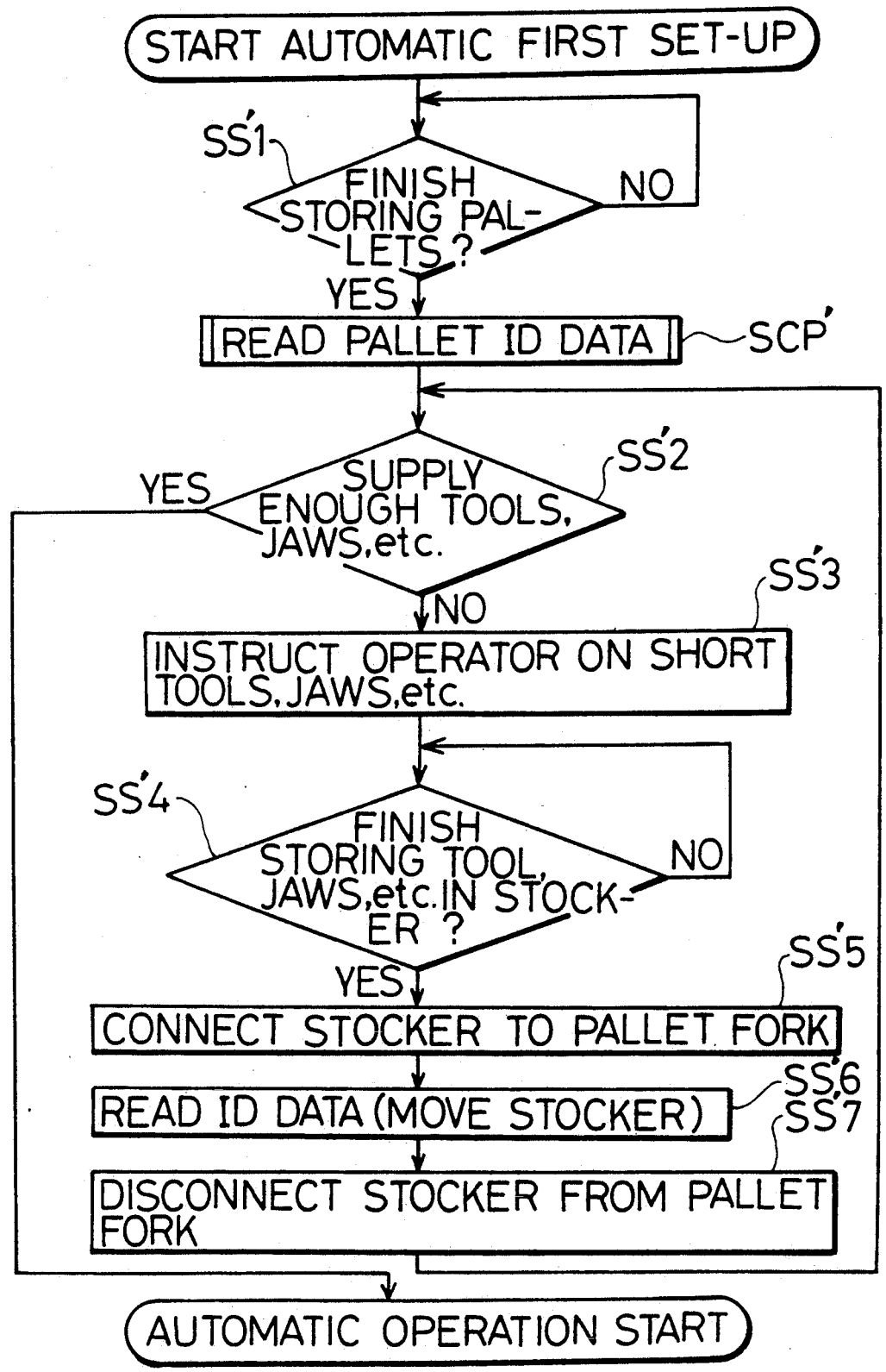
FIG. 71 is a flowchart showing another example of presetup program.
Figure 72A:
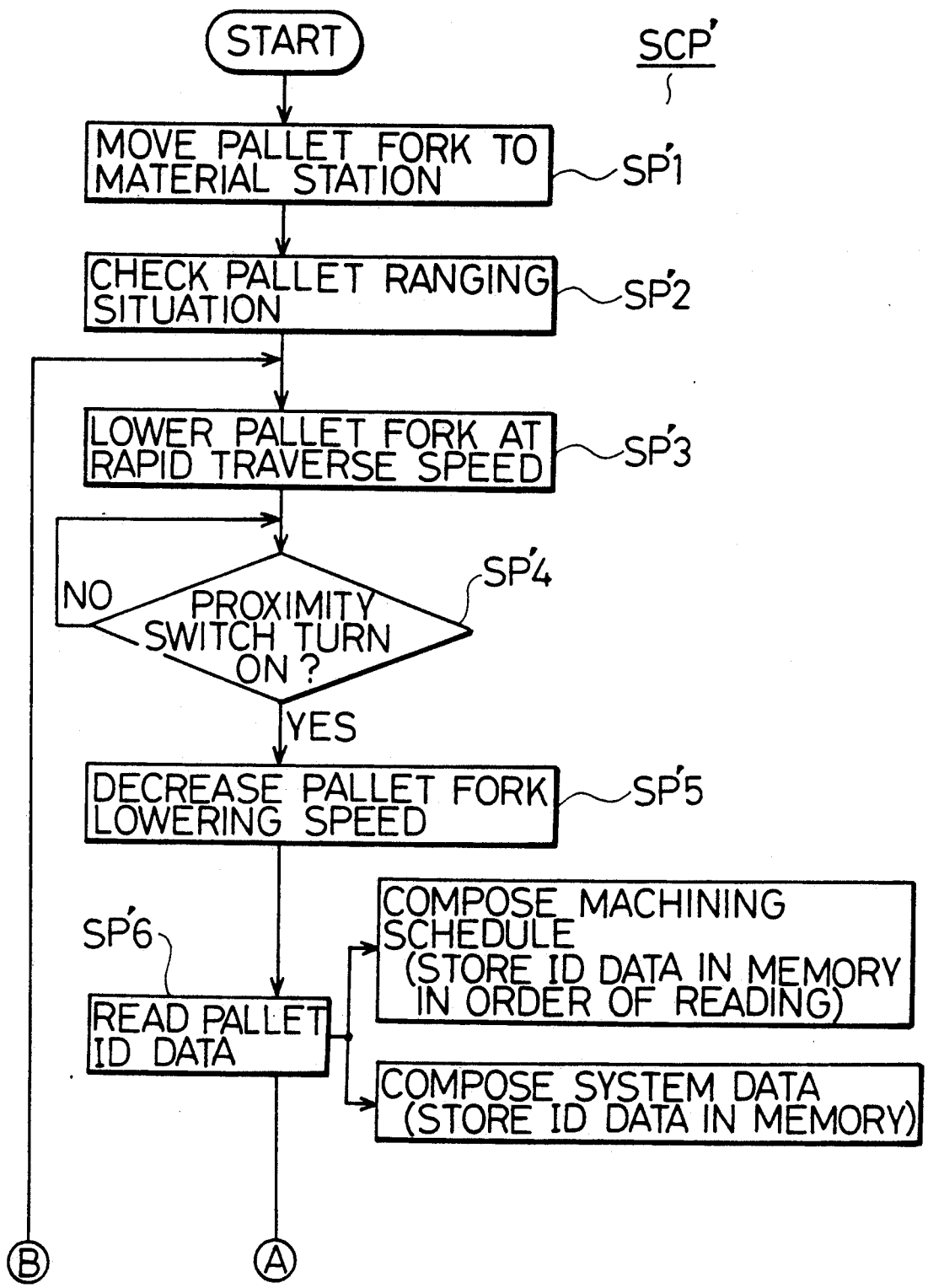
FIG. 72 is a flowchart showing another example of the schedule composition program.
Figure 72B:
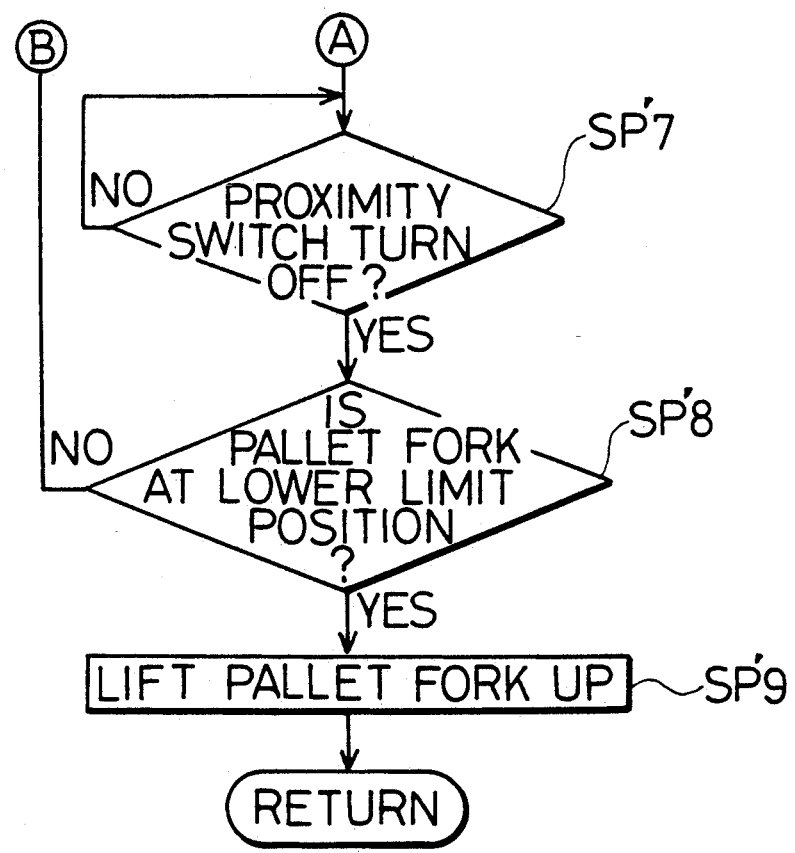
Figure 73:
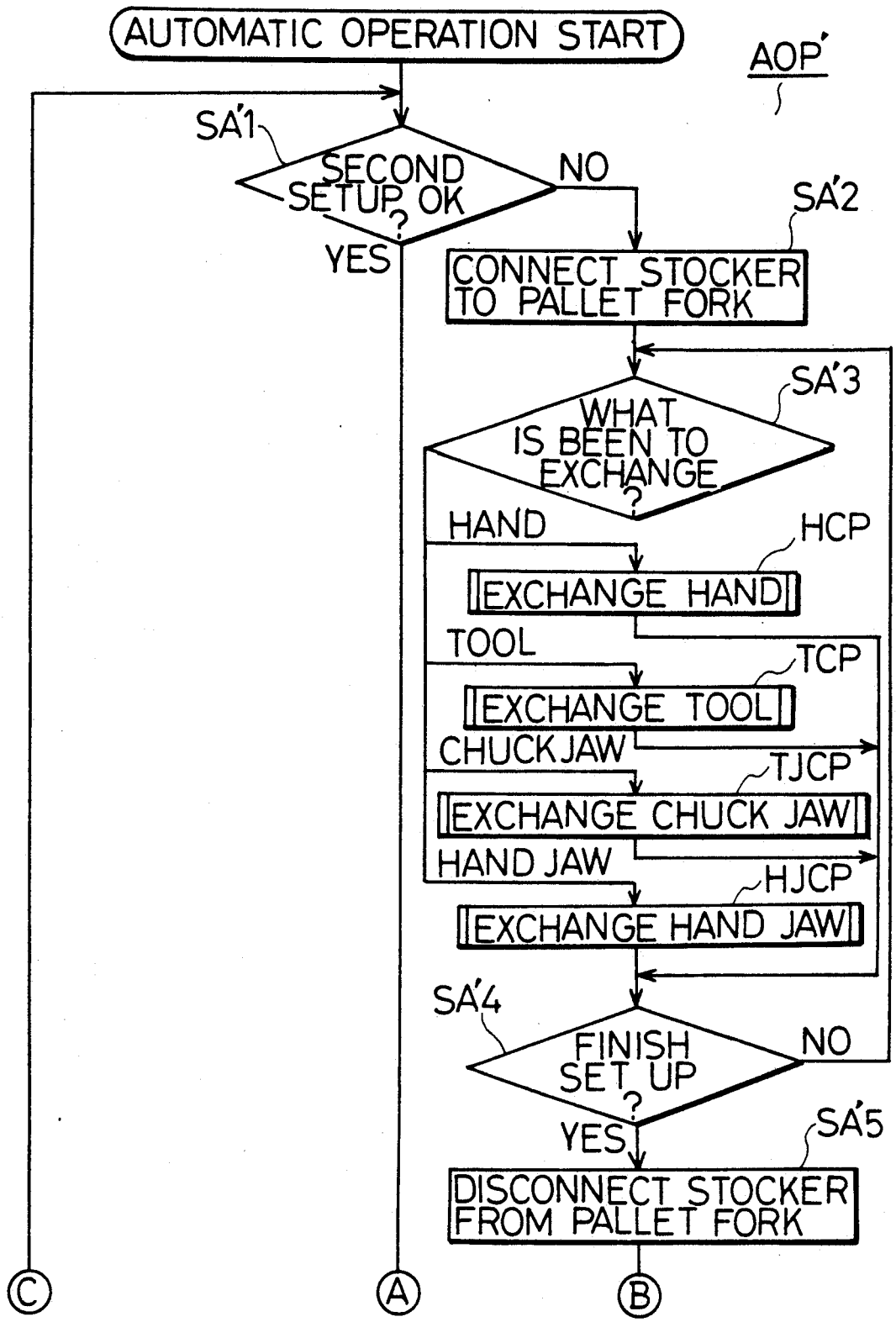
FIG. 73 is a flowchart showing another example of the automatic operation program.
Figure 73:
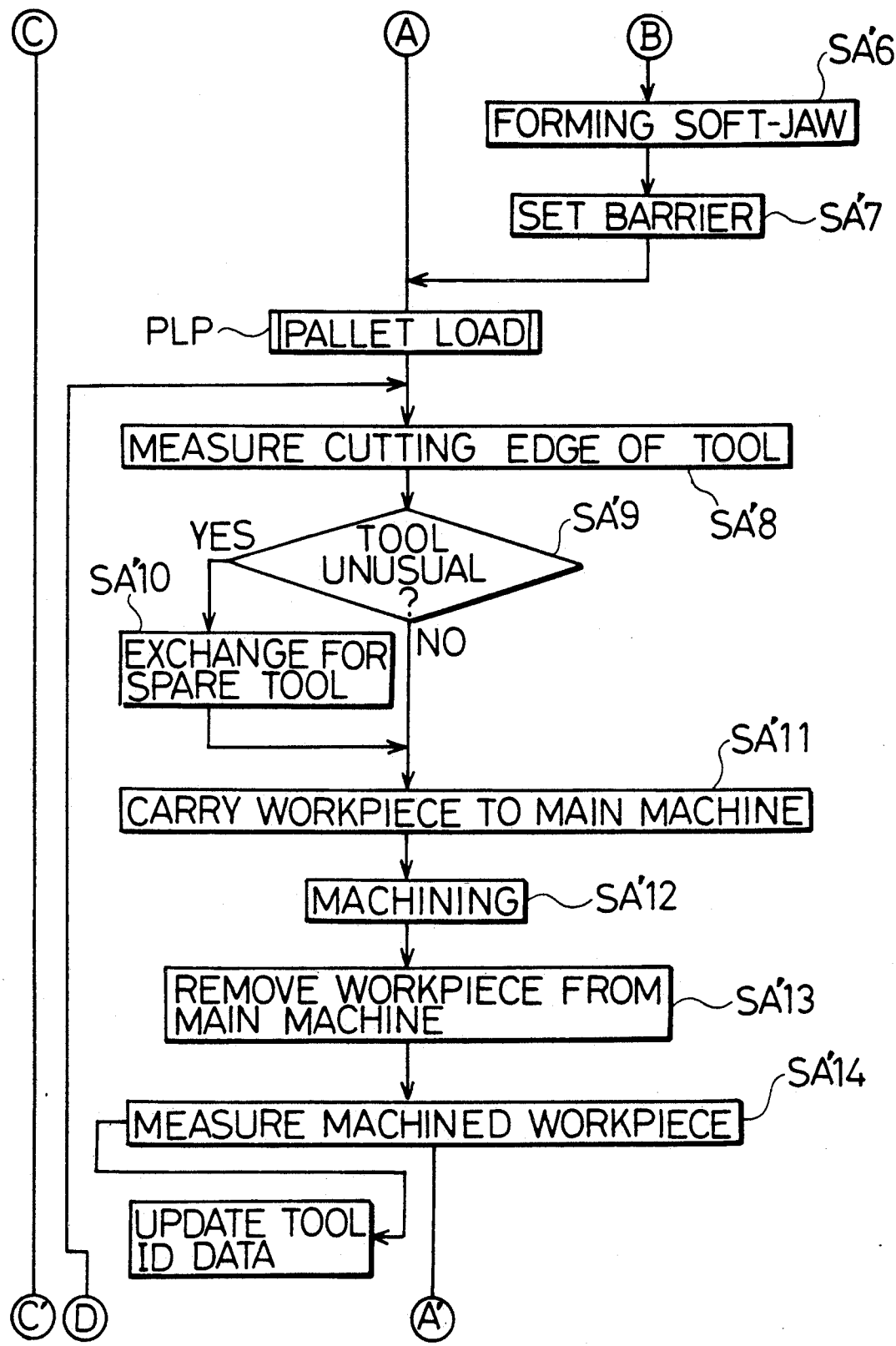
Figure 73C:
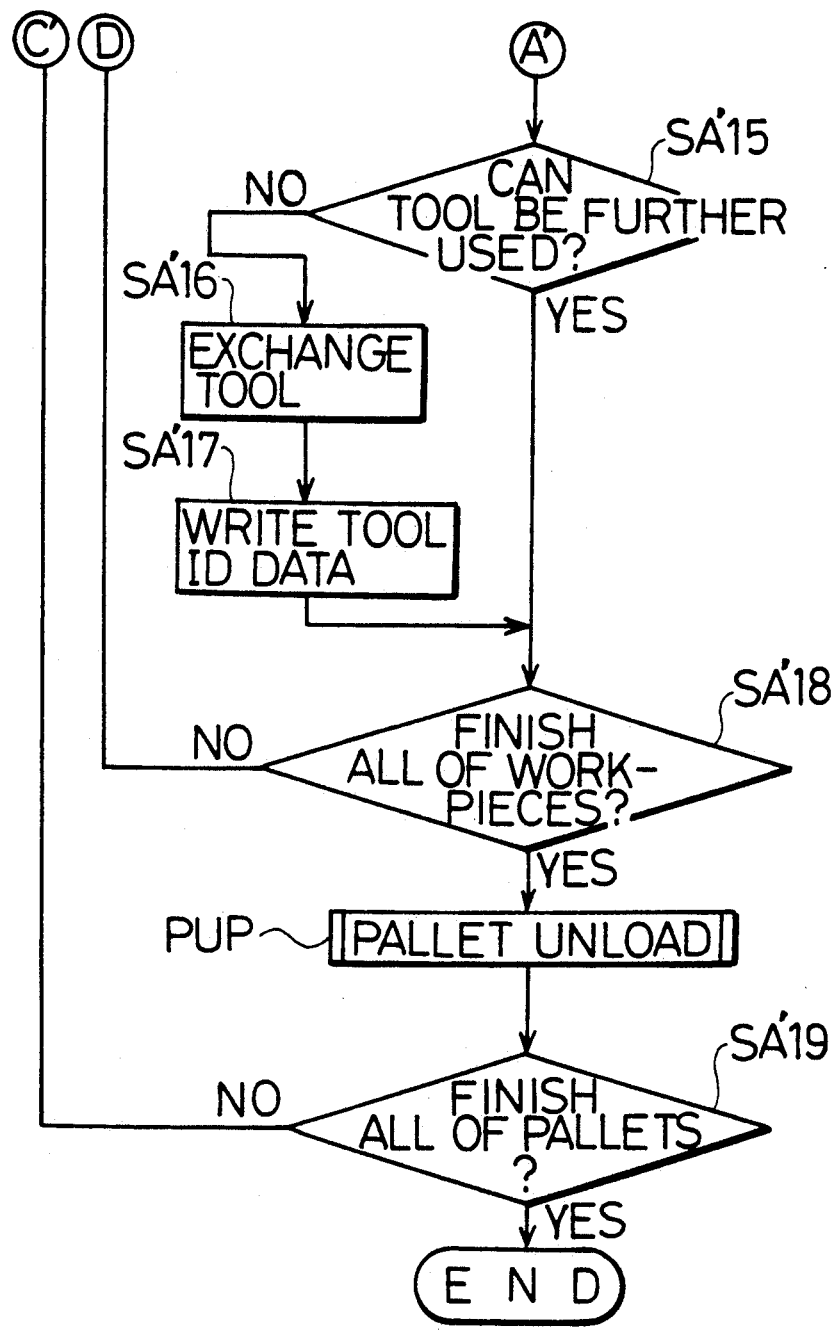

That is, the direct comparison of the tool ID data TIDD, the chuck jaw data TJIDD, the hand ID data HIDD and the hand jaw ID data HJIDD with the pallet ID data PIDD is performed formed on the basis of the pre-setup program PPR', the schedule composition program SCP' and the automatic operation program AOP', as shown in FIGS. 71 through 73. On this occasion, as the pre-setup program PPR', the schedule composition program SCP' and the automatic operation program ACP' are almost the same as the pre-setup program PPR, as shown in FIG. 32, the schedule composition program SCP, as shown in FIG. 34 and the automatic operation program AOP, as shown in FIG. 33, respectively, its detailed explanation will be omitted.

When putting the pallets 119, having the workpieces 120 thereon, in the material station 32, and the storage of the tools 117, the chuck jaws 116, the hands 69, 72, 76 and the hand jaws 79 in the stocker 41, finish and the operator depresses a start button of the input unit 89a, the program proceeds to the schedule composition program SCP', as shown in FIG. 72 from Step SS'1 of the pre-setup program PPR', as shown in FIG. 71.

In the schedule composition program SCP', the pallet ID data PIDD are read out of the pallet ID 119a of each pallet 119, stacked on the material station 32, successively, in a similar way to the above-described schedule composition program SCP of FIG. 34, and the read out pallet ID data PIDD are stored in the machining schedule memory 86 as a machining schedule. At the same time, the above-described pallet ID data PIDD read are stored in the system operation data memory 85 as the system operation data. (Accordingly, it is unnecessary for an operator to compose the system operation data SOD.)

Thereafter, in Steps SS'2 through SS'7 of FIG. 71, the tool ID data TIDD are read out of the tool ID 117a of each tool 117, stored in the stocker 41, the chuck jaw ID data TJIDD are read out of the chuck jaw ID 116a of each chuck jaw 116, the hand ID data HIDD are read out of the tool ID 69a, 72a, 76a of each of hands 69, 72, 76 and the hand jaw ID data HJIDD are read out of the hand jaw ID 79a of each hand jaw 79, in a similar way to the pre-setup program PPR of FIG. 32, as described hereinbefore. The read out tool ID data TIDD, the chuck jaw data TJIDD, the hand ID data HIDD and the hand jaw ID data HJIDD are compared with the pallet ID data PIDD, stored in the system operation data memory 85 as the above-described system operation data, in Step SS'2 of FIG. 71 and the judgement whether or not the necessities of machining are supplied is performed.

When the turning cell 1 is supplied with all of the tools 117, the chuck jaws 116, the hands 69, 72, 76 and the hand jaws 79, necessary for machining with respect to the various kinds of workpieces 120, put on each pallet 119, stacked in the material station 32, the program proceeds to the automatic operation program AOP' of FIG. 73 from Step SS'2 of FIG. 71. Then, machining is performed changing setup with respect to the workpieces 120 of each pallet 119, in a similar way to the automatic operation program AOP of FIG. 33, as described hereinbefore.

In the above-described embodiment, it was mentioned that the first headstock 6 and the second headstock 16 were respectively provided being movable in the direction of the central axes of these spindles. However, one of the two headstocks 6, 16 may be fixed on the machine body 3 as long as the both headstocks 6, 16 are provided so as to relatively approach and depart from each other.

Besides, as long as the first and second tool rests are provided free to move in a direction perpendicular to the central axes of the spindles, both tool rests may be optionally disposed.

The present invention has been explained on the basis of the embodiments presented herein. However, the embodiments which are described in the present specification are illustrative and not limiting. The scope of the invention is designated by the accompanying claims and is not restricted by the description of the specific embodiments. Accordingly, all the transformations and changes belonging to the claims are included in the scope of the present invention.

We claim:

1. An automatic setup apparatus in a numerical control machine tool having an arranged apparatus on which setup change members are exchangeably installed, said automatic setup apparatus comprising:

a workpiece storing means for storing workpieces;

a workpiece information storing means for storing workpiece information concerning said workpiece stored in said workpiece storing means provided at said workpiece storing means;

a workpiece information reading means for reading said workpiece information out of said workpiece information storing means;

a workpiece carrying means for picking said workpiece out of said workpiece storing means and carrying, provided being free to move from said numerical control machine tool to a position of said workpiece storing means;

a setup change member storing means for storing a plurality of kinds of said setup change members;

a setup change member information storing means for storing setup change member information concerning said setup change member, provided at each said setup change members;

a setup change member information reading means for reading said setup change member information out of said setup change member information storing means;

a setup change member decision means for deciding said setup change member to be set up to said arranged apparatus on the basis of said workpiece information read out with said workpiece information reading means;

a setup change member carrying means for selecting said setup change member decided with said setup change member decision means from said setup change member storing means on the basis of said setup change member information read out with said setup change member information reading means and carrying, provided being free to move between a position of said setup change member storing means and a position of said arranged apparatus;

a holding apparatus storing means for storing a plurality of kinds of holding apparatus capable of holding said workpieces or said setup change members;

a holding apparatus information storing means for storing holding apparatus information concerning said holding apparatus provided at each of said holding apparatus;

a holding apparatus information reading means for reading said holding apparatus information out of said holding apparatus information storing means;

a common carrying means being free to move to a position of said holding apparatus storing means so as to exchange said holding apparatus by selecting from said holding apparatus storing means on the basis of said holding apparatus information read out with said holding apparatus information reading means according to kinds of said workpieces or said setup change members to be carried, provided as said workpiece carrying means and said setup change member carrying means;

a carrying control program decision means for deciding a carrier control program to be used on the basis of said workpiece information read out with said workpiece information reading means; and a carrier control means for driving and controlling said common carrying means on the basis of said carrier control program decided with said carrier control program decision means.

2. The automatic setup apparatus in a numerical control lathe as set forth in claim 1, wherein:
said numerical control machine tool is a lathe;
said arranged apparatus is a spindle chuck; and said setup change members are chuck jaws.

3. The automatic setup apparatus as set forth in claim 1, wherein:
a machining program decision means for deciding a machining program to be used for machining on the basis of said workpiece information read out with said workpiece information reading means is provided; and
a machining operation control means for controlling machining operations on the basis of said machining program decided with said machining program decision means is provided.

4. The automatic setup apparatus as set forth in claim 1, wherein:
a setup change member sufficiency judgement means for judging whether or not said setup change members necessary for machining on workpieces stored in said workpiece storing means are stored in said setup change member storing means by comparing said workpiece information concerning said workpiece read out with said workpiece information reading means with said setup change member information read out with said setup change member information reading means is provided.

5. The automatic setup apparatus in a numerical control lathe as set forth in claim 1 wherein:
said numerical control machine tool is a lathe;
said arranged apparatus is a tool rest; and
said setup change members are tools.

6. The automatic setup apparatus as set forth in claim 1, wherein:
said numerical control machine tool is a lathe;
said arranged apparatus is a spindle chuck;
said setup change members are chuck jaws;
a soft-jaw forming program decision means for deciding a soft-jaw forming program to be used for soft-jaw forming of said chuck jaw installed on said spindle chuck on the basis of said workpiece information read out with said workpiece information reading means and said setup change member information read out with said setup change member information reading means is provided; and a soft-jaw forming operation control means for controlling soft-jaw forming operations on the basis of said soft-jaw forming program, decided with said soft-jaw forming program decision means is provided.

7. The automatic setup apparatus as set forth in claim 1, wherein:
said numerical control machine tool is a lathe;
said arranged apparatus is a spindle chuck;
said setup change members are chuck jaws; and
a barrier setting means for setting barriers on peripheral faces of said spindle chuck and said chuck jaw installed on said spindle chuck on the basis of said workpiece information read out with said workpiece information reading means and said setup change member information read out with said setup change member information reading means is provided.

8. An automatic setup apparatus in a numerical control machine tool having first and second spindles mounted for relative motion in a direction of central axes of said spindles and disposed so as to face each other, and having first and second tool rests associated with first and second spindles respectively, said first and second tool rests exchangeably installing tools thereon, said automatic setup apparatus comprising:
tool storing means for storing a plurality of kinds of said tools;
a tool carrying means being free to move between a position of said tool storing means and a position of said first tool rest and between said position of said tool storing means and a position of said second tool rest;
a tool holding apparatus provided at said tool carrying means;
a rolling member being free to rotate provided at said tool holding apparatus;
a plurality of said first grippers provided at said rolling member so as to selectively face said first tool rest by rotation of said rolling member; and
a plurality of said second grippers provided at said rolling member so as to selectively face said second tool rest by rotation of said rolling member; and
a plurality of said second grippers provided at said rolling member so as to selectively face said second tool rest by rotation of said rolling member.

9. The automatic setup apparatus as set forth in claim 8, wherein:
said tool carrying means is provided being free to move in a first direction;
an arm free to move in a second direction provided at said tool carrying means;
said tool holding apparatus is provided on said arm so as to face said first gripper to said first tool rest and so as to face said second gripper to said second tool rest by movement of said arm; and
a holding apparatus fixing means for fixing said tool holding apparatus on a machine body of said machine tool in such a state that said arm moves to a position, at which said first gripper can face said first tool rest or said second gripper can face said second tool rest, is provided on said machine body so as to engage with and remove out of said tool holding apparatus.

* * * * *